(12) United States Patent
Park et al.

(10) Patent No.: US 12,143,998 B2
(45) Date of Patent: Nov. 12, 2024

(54) RESOURCE CONFIGURATION FOR INTEGRATED ACCESS AND BACKHAUL NODES

(71) Applicant: Ofinno, LLC, Reston, VA (US)

(72) Inventors: Kyungmin Park, Vienna, VA (US); Esmael Hejazi Dinan, McLean, VA (US); Hua Zhou, Herndon, VA (US); Ali Cagatay Cirik, Herndon, VA (US); Hyoungsuk Jeon, Centreville, VA (US); Alireza Babaei, Fairfax, VA (US); Kai Xu, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 588 days.

(21) Appl. No.: 17/335,769

(22) Filed: Jun. 1, 2021

(65) Prior Publication Data

US 2021/0298000 A1   Sep. 23, 2021

Related U.S. Application Data

(63) Continuation of application No. PCT/US2020/012932, filed on Jan. 9, 2020.
(Continued)

(51) Int. Cl.
*H04W 72/23* (2023.01)
*H04B 7/0408* (2017.01)
(Continued)

(52) U.S. Cl.
CPC ......... *H04W 72/23* (2023.01); *H04W 56/001* (2013.01); *H04W 72/046* (2013.01)

(58) Field of Classification Search
CPC . H04W 56/001; H04W 72/23; H04W 72/046; H04W 16/28; H04B 7/0695; H04B 7/088
See application file for complete search history.

(56) References Cited

U.S. PATENT DOCUMENTS

| | | | |
|---|---|---|---|
| 11,265,801 B2* | 3/2022 | Centonza | H04W 48/00 |
| 2009/0122733 A1* | 5/2009 | Ruy | H04W 72/02 370/310 |

(Continued)

FOREIGN PATENT DOCUMENTS

WO   2019042175   7/2019

OTHER PUBLICATIONS

3GPP TR 38.874 1.0.0 (Dec. 2018); Technical Report; 3rd Generation Partnership Project; Technical Specification Group Radio Access Network; Study on Integrated Access and Backhaul; (Release 15).
(Continued)

*Primary Examiner* — Jenee Holland
(74) *Attorney, Agent, or Firm* — Sachin Kandhari; Kavon Nasabzadeh; Jacob L. Mangan

(57) ABSTRACT

A first child access node receives, from a second access node, a first message comprising configuration parameters indicating radio resources for a cell served by the first child access node. The first child access node receives the first message from the second access node via a first parent access node of the first child access node. The first child access node receives, from the first parent access node, a downlink control information comprising an activation indication of the radio resources for the cell. The first child access node communicates, with a wireless device, transport blocks via the radio resources of the cell based on the activation indication and the first message.

20 Claims, 54 Drawing Sheets

Related U.S. Application Data

(60) Provisional application No. 62/790,994, filed on Jan. 10, 2019, provisional application No. 62/790,424, filed on Jan. 9, 2019.

(51) Int. Cl.

| | | |
|---|---|---|
| *H04B 7/155* | (2006.01) | |
| *H04L 5/00* | (2006.01) | |
| *H04W 16/32* | (2009.01) | |
| *H04W 56/00* | (2009.01) | |
| *H04W 72/044* | (2023.01) | |
| *H04W 72/27* | (2023.01) | |

(56) References Cited

U.S. PATENT DOCUMENTS

| | | | | |
|---|---|---|---|---|
| 2011/0075684 | A1* | 3/2011 | Zeng | H04L 1/1861 370/475 |
| 2012/0147815 | A1* | 6/2012 | Meyer | H04L 1/1829 370/328 |
| 2013/0337860 | A1* | 12/2013 | Xu | H04L 67/55 455/518 |
| 2014/0011527 | A1* | 1/2014 | Xu | H04W 4/08 455/466 |
| 2016/0037540 | A1* | 2/2016 | Johansson | H04L 1/00 370/329 |
| 2016/0174259 | A1* | 6/2016 | Mukherjee | H04L 1/08 370/280 |
| 2018/0042016 | A1 | 2/2018 | Babaei et al. | |
| 2018/0192412 | A1 | 7/2018 | Novlan et al. | |
| 2018/0279229 | A1 | 9/2018 | Dinan et al. | |
| 2018/0367273 | A1 | 12/2018 | Park et al. | |
| 2019/0059027 | A1* | 2/2019 | Yang | H04W 36/0066 |
| 2019/0159277 | A1 | 5/2019 | Zhu et al. | |
| 2019/0215820 | A1 | 7/2019 | Cirik et al. | |
| 2019/0223078 | A1 | 7/2019 | Sirotkin et al. | |
| 2019/0268936 | A1 | 8/2019 | Sun et al. | |
| 2019/0342904 | A1* | 11/2019 | Islam | H04B 7/15507 |
| 2020/0015316 | A1* | 1/2020 | Islam | H04W 56/0045 |
| 2020/0077287 | A1* | 3/2020 | Prasad | H04W 72/30 |
| 2020/0092268 | A1* | 3/2020 | Wu | H04W 80/06 |
| 2020/0145860 | A1* | 5/2020 | Koskela | H04W 76/14 |
| 2020/0145965 | A1* | 5/2020 | Luo | H04W 72/21 |
| 2020/0145967 | A1* | 5/2020 | Park | H04W 72/23 |
| 2020/0145997 | A1* | 5/2020 | Luo | H04W 16/02 |
| 2020/0170010 | A1* | 5/2020 | Luo | H04W 72/0446 |
| 2020/0374871 | A1* | 11/2020 | Liu | H04W 56/0015 |
| 2021/0058826 | A1* | 2/2021 | Mao | H04W 28/088 |
| 2021/0105622 | A1* | 4/2021 | Rajadurai | H04W 8/26 |
| 2021/0153189 | A1* | 5/2021 | Jo | H04B 7/15542 |
| 2021/0218620 | A1* | 7/2021 | Yuan | H04W 56/0045 |
| 2021/0226696 | A1* | 7/2021 | Shimezawa | H04L 5/0092 |
| 2021/0315043 | A1* | 10/2021 | Luo | H04W 76/19 |
| 2021/0345303 | A1* | 11/2021 | Ying | H04W 72/04 |
| 2021/0352523 | A1* | 11/2021 | Wei | H04W 40/34 |
| 2021/0360482 | A1* | 11/2021 | Lin | H04W 56/0045 |
| 2021/0360562 | A1* | 11/2021 | Lin | H04W 40/22 |
| 2021/0367660 | A1* | 11/2021 | Jo | H04W 72/53 |
| 2021/0368481 | A1* | 11/2021 | Jo | H04W 72/21 |
| 2022/0015093 | A1* | 1/2022 | Ying | H04B 7/15542 |
| 2022/0201513 | A1* | 6/2022 | Wei | H04W 40/24 |

OTHER PUBLICATIONS

R1-1812198; 3GPP TSG RAN WG1 Meeting #95; Spokane, USA, Nov. 12-16, 2018; ; Agenda Item:7.2.3.1; Source:Huawei, HiSilicon; Title:Physical layer design for NR IAB.

R1-1812201; 3GPP TSG RAN WG1 Meeting #95; Spokane, USA, Nov. 12-16, 2018; ; Agenda Item:7.2.3.3; Source:Huawei, HiSilicon; Title:On resource coordination and dynamic scheduling in IAB.

R1-1812203; 3GPP TSG RAN WG1 Meeting #95; Spokane, USA, Nov. 12-16, 2018; Agenda Item:7.2.3.3; Source:Huawei, HiSilicon; Title:Consideration on cross-link interference in IAB.

R1-1812305 Enhancements to support NR backhaul link-final; 3GPP TSG RAN WG1 Meeting #95; Spokane, USA, Nov. 12-16, 2018; ; Source:vivo; Title:Enhancements to support NR backhaul link; Agenda Item:7.2.3.1.

R1-1812486; 3GPP TSG RAN WG1 #95; Nov. 12-Nov. 16, 2018; Spokane, USA; Agenda item:7.2.3.1; Source: Intel Corporation.

R1-1812564 Discussions on mechanisms to support NR IAB scenarios Final; 3GPP TSG RAN WG1 Meeting #95 ; Spokane, USA, Nov. 12-16, 2018; Agenda Item:7.2.3.1; Source: LG Electronics; Title: Discussions on mechanisms to support NR IAB scenarios.

R1-1812675; 3GPP TSG RAN WG1 Meeting #95; Spokane, USA, Nov. 12-16, 2018; Agenda Item:7.2.3.3; Source:Huawei, HiSilicon; Title:Text Proposal for sections 7 of TR 38.874.

R1-1812700_NR enhancements to support IAB; 3GPP TSG RAN WG1 Meeting #95; Spokane, WA, USA, Nov. 12-16, 2018; Agenda item:7.2.3.1; Source: Nokia, Nokia Shanghai Bell; Title:NR enhancements to support IAB.

R1-1812702_IAB Resource Allocation; 3GPP TSG RAN WG1 Meeting #95; Spokane, USA, Nov. 12-16, 2018; Agenda item:7.2.3.3; Source:Nokia, Nokia Shanghai Bell; Title:Resource allocation/coordination between Parent BH and Child links.

R1-1812707_IAB Cross link interference; 3GPP TSG RAN WG1 Meeting #95; Spokane, USA, Nov. 12-16, 2018; Agenda item:7.2.3.3; Source: Nokia, Nokia Shanghai Bell; Title:On Cross-link Interference Management.

R1-1812729 Discussion on physical layer enhancements for NR IAB; 3GPP TSG RAN WG1 Meeting #95; Spokane, USA, Nov. 12-16, 2018 ; Source:ZTE, Sanechips; Title:Discussion on physical layer enhancements for NR IAB; Agenda item:7.2.3.1.

R1-1812786; 3GPP TSG RAN WG1 Meeting #95; Spokane, USA, Nov. 12-16, 2018 ; Agenda Item:7.2.3.1; Source:Lenovo, Motorola Mobility; Title:Discussion on resource partitioning for IAB network.

R1-1812983_IAB_CLI; 3GPP TSG RAN WG1 Meeting #95; Spokane, USA, Oct. 12-16, 2018; Agenda tem:7.2.3.3; Source: Samsung; Title: CLI management in IAB; Document for: Discussion.

R1-1813224; 3GPP TSG RAN WG1 Meeting #95; Spokane, USA, Nov. 12-16, 2018 ; Agenda Item:7.2.3.1; Source: InterDigital Inc.; Title: Discussion on Integrated Access and Backhaul Links in NR.

R1-1813225; 3GPP TSG RAN WG1 Meeting #95; Spokane, USA, Nov. 12-16, 2018 ; Agenda Item:7.2.3.3; Source: InterDigital Inc.; Title:On Integrated Access and Backhaul Enhancements in NR.

R1-1813316_Discussion on enhancements to support NR backhaul links_final; 3GPP TSG RAN WG1 Meeting #95 ; Spokane, USA, Nov. 12-16, 2018; Source:NTT DOCOMO, INC.; Title:Discussion on enhancements to support NR backhaul links; Agenda Item:7.2.3.1.

R1-1813417; 3GPP TSG RAN WG1 Meeting #95; Spokane, USA, Nov. 12-Nov. 16, 2018; Agenda item:7.2.3.1; Source: Qualcomm Incorporated; Title: Enhancements to support NR backhaul links.

R1-1813418; 3GPP TSG-RAN WG1 Meeting RAN1 95; Spokane, USA; Nov. 12-Nov. 16, 2018.; Agenda item: 7.2.3.2; Source:Qualcomm Incorporated.

R1-1813419; 3GPP TSG RAN WG1 Meeting #95; Spokane, US, Nov. 12-16, 2018; ; Agenda Item:7.2.3.3; Source: Qualcomm Incorporated; Title: Resource Management in IAB Network.

R1-1813504; 3GPP TSG RAN WG1 Meeting #95; Spokane, USA, Nov. 12-16, 2018 ; Agenda Item:7.2.3.1; Source: CAICT; Title:Discussion on enhancement of IAB discovery and Resource allocation ; Document for:Discussion and Decision.

R1-1813566—Resource allocation; 3GPP TSG-RAN WG1 Meeting #95; Spokane, U.S., Nov. 12-16, 2018; Agenda Item:7.2.3.3; Source:Ericsson; Title:IAB resource allocation and multiplexing.

R1-1813570—Multiple parents; 3GPP TSG-RAN WG1 Meeting #95; Spokane, US, Nov. 12-16, 2018; Agenda Item: 7.2.3.3; Source: Ericsson; Title: Deriving Child Node Timing from Multiple Parent IAB Nodes.

R1-1813572—Physical layer enhancements; 3GPP TSG-RAN WG1 Meeting #95; Spokane, US, Nov. 12-16, 2018; Agenda Item:7.2.3.1; Source:Ericsson; Title:IAB—Physical layer enhancements.

R1-1813975; 3GPP TSG RAN WG1 Meeting #95; Spokane, USA, Nov. 12-16, 2018; Agenda Item:7.2.3.1; Source:AT&T; Title:Summary of 7.2.3.1 Enhancements to support NR backhaul links.

(56) References Cited

OTHER PUBLICATIONS

R1-1814090—Resource allocation; 3GPP TSG-RAN WG1 Meeting #95; Spokane, U.S., Nov. 12-16, 2018;; Agenda Item:7.2.3.3; Source:Ericsson; Title:IAB resource allocation and multiplexing (revision of R1-1813566).
R1-1814091—Physical layer enhancements; 3GPP TSG-RAN WG1 Meeting #95; Spokane, US, Nov. 12-16, 2018; Agenda Item:7.2.3.1; Source:Ericsson; Title: IAB—Physical layer enhancements (revision of R1-1813572).
R1-1814190; 3GPP TSG RAN WG1 Meeting #95; Spokane, USA, Nov. 12-16, 2018; Agenda Item:7.2.3; Source:AT&T Title:TP for 38.874 on PHY Enhancements for NR IAB.
R2-1817072; 3GPP TSG RAN WG2 Meeting #104; Spokane, USA, Nov. 12-16, 2018(Resubmission of R2-1814733); Agenda Item:11.1.2; Source: Sony; Title:Resource allocation in IAB; Document for Discussion.
R2-1817617_IAB_resource allocation_v3; 3GPP TSG RAN WG2 Meeting #104; Spokane, USA, Nov. 12-16, 2018; Agenda item:11.1.3; Source:Nokia, Nokia Shanghai Bell; Title:Resource allocation and coordination for IAB.
International Search Report of International Application No. PCT/US2020/012932, mailed Jun. 7, 2020.
R1-1808398; 3GPP TSG RAN WG1 Meeting #94; Gothenburg, Sweden, Aug. 20-24, 2018; Agenda Item: 7.2.3.1 Source: CATT; Title: NR Physical Layer design for IAB backhaul link.
R1-1812566; 3GPP TSG RAN WG1 Meeting #95; Spokane, US, Nov. 12-16, 2018; Agenda Item: 7.2.3.3 Source: LG Electronics; Title: Discussions on access and backhaul link multiplexing and timing.
Extended European Search Report, mailed Sep. 22, 2023, in EP Patent Application No. 23164449.3.

* cited by examiner

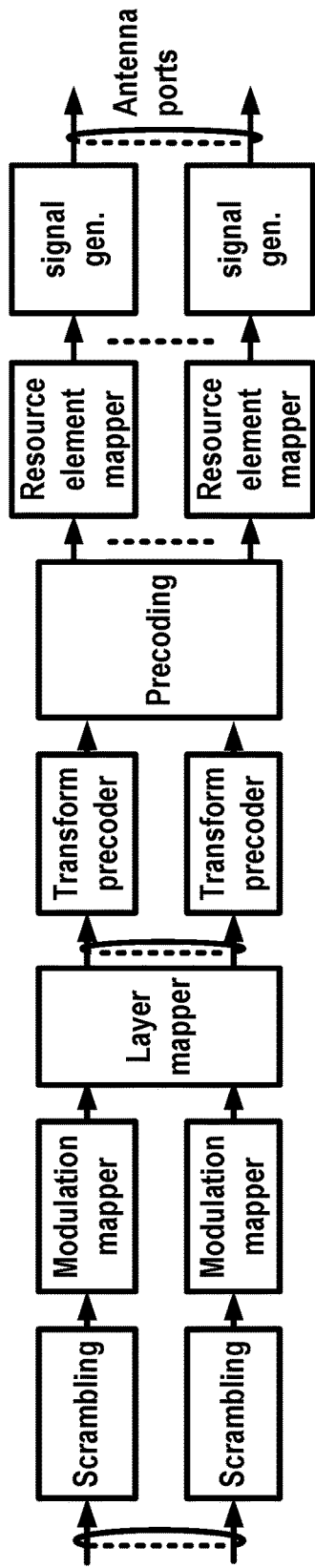
FIG. 4A
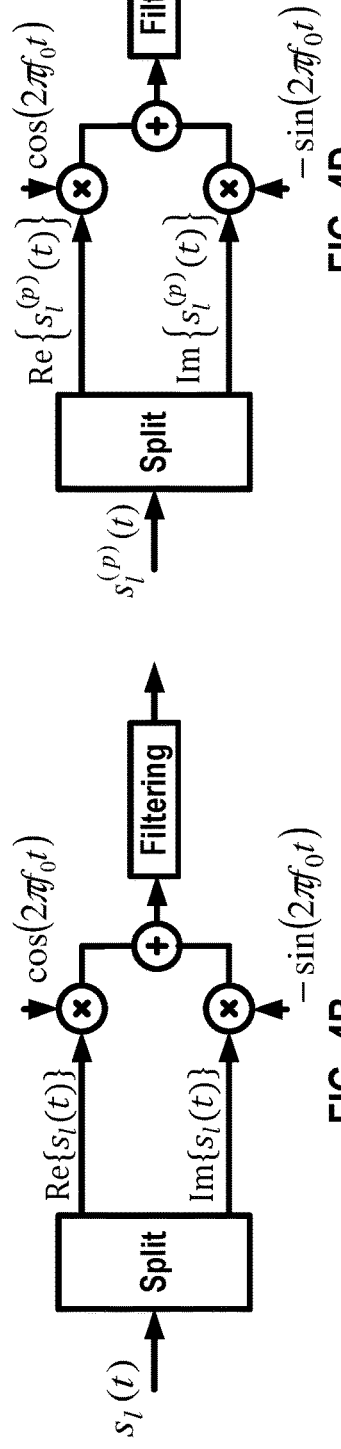
FIG. 4B
FIG. 4D
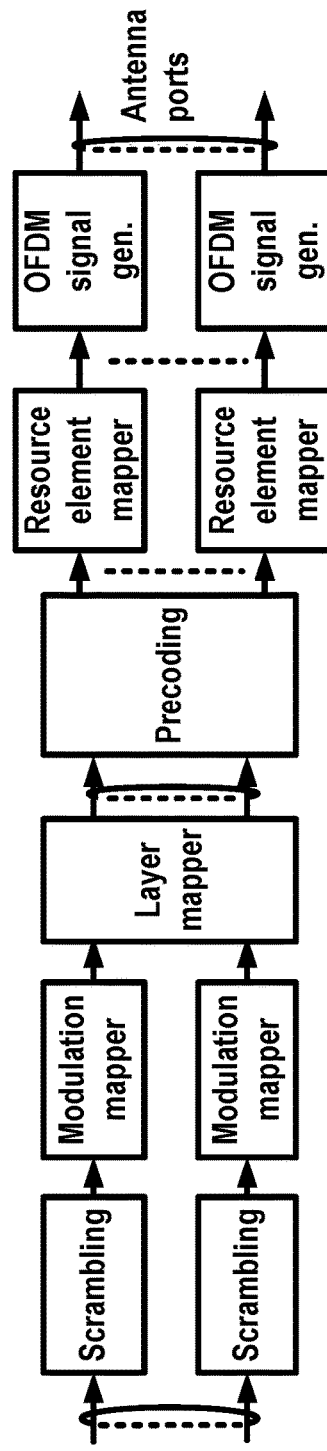
FIG. 4C

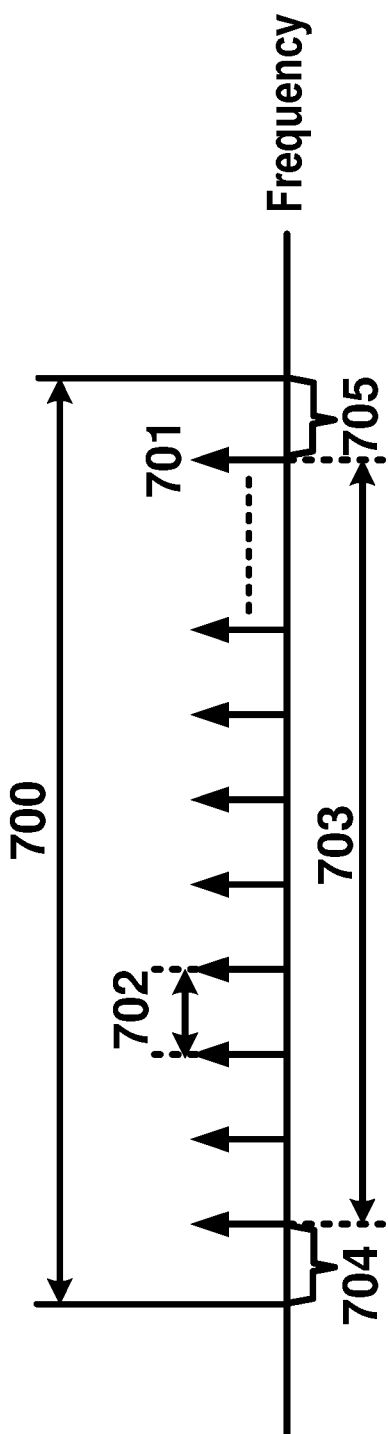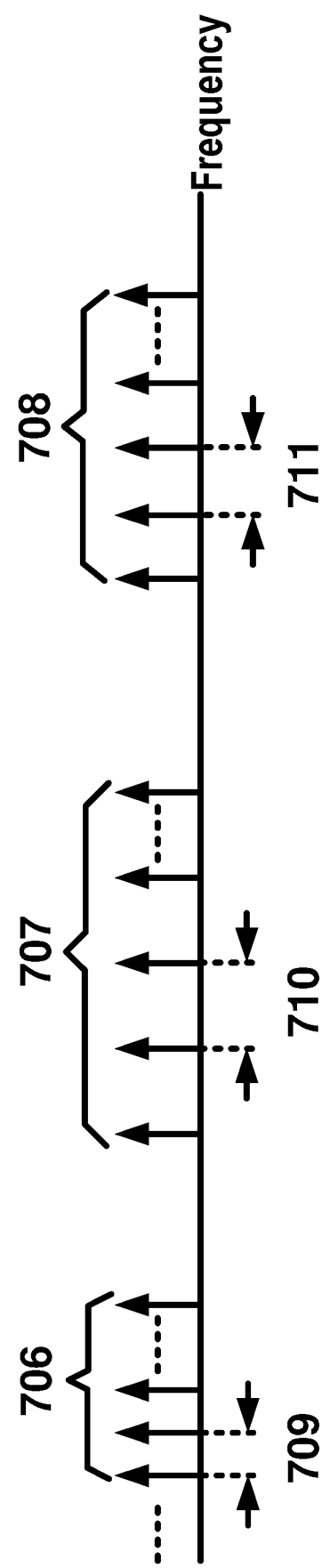

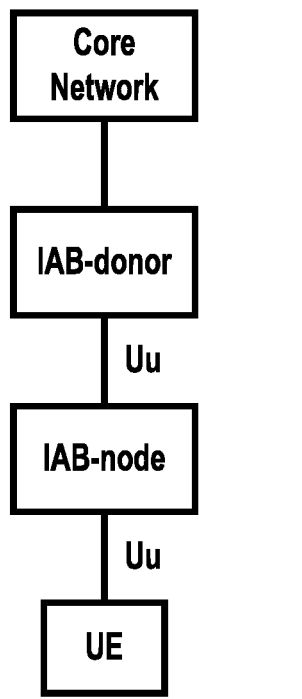
UE and IAB-node operate in SA
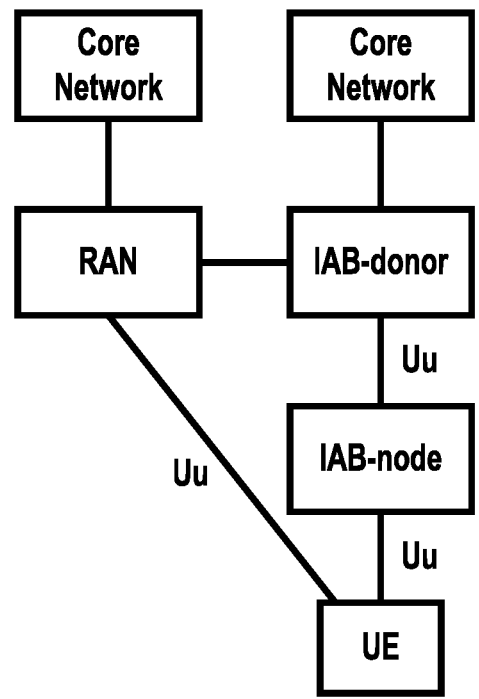
UE operates in NSA while IAB-node operates in SA
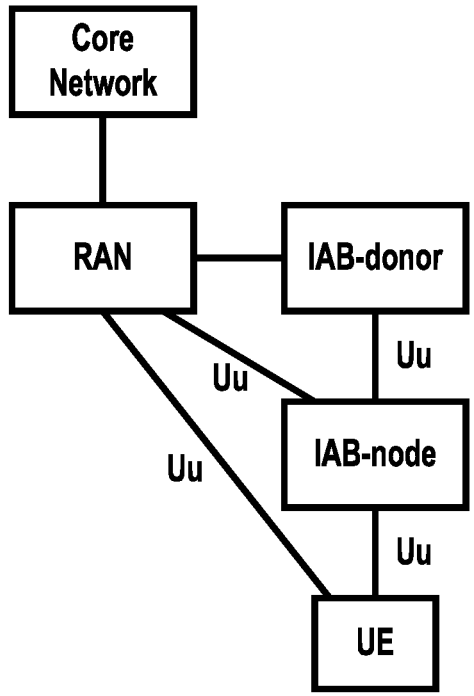
UE and IAB-node operate in NSA
FIG. 17

Example of architecture 1a

Example of architecture 1b

Example of architecture 2a

Example of architecture 2b

Example of architecture 2c alternative 1 of architecture 1a alternative 2 of architecture 1a alternative 3 of architecture 1a alternative 4 of architecture 1a alternative of architecture 1b architecture group 2

CrossCarrierSchedulingConfig information elements (example of cross carrier scheduling among parent cells)

```
-- ASN1START
CrossCarrierSchedulingConfig ::=    SEQUENCE {
    schedulingCellInfo              CHOICE {
        own                         SEQUENCE {                     -- No cross carrier scheduling
            cif-Presence            BOOLEAN
        },
        other                       SEQUENCE {                     -- Cross carrier scheduling
            schedulingCellId        ServCellIndex,
            cif-InSchedulingCell    INTEGER (1..7)
        }
    },
    ...
}
-- ASN1STOP
```

| CrossCarrierSchedulingConfig field descriptions |
|---|
| cif-Presence |
| The field is used to indicate whether carrier indicator field is present (value TRUE) or not (value FALSE) in PDCCH DCI formats. |
| other |
| Parameters for cross-carrier scheduling, i.e., a serving cell is scheduled by a PDCCH on another (scheduling) cell. The network configures this field for SCells. |
| own |
| Parameters for self-scheduling, i.e., a serving cell is scheduled by its own PDCCH. |
| schedulingCellId |
| Indicates which cell signals the downlink allocations and uplink grants, if applicable, for the concerned SCell. In case the UE is configured with DC, the scheduling cell is part of the same cell group (i.e. MCG or SCG) as the scheduled cell. |

FIG. 49

First access node receives, from second access node, configuration parameters indicating whether radio resources are allowed to be activated for first area of first child access node and second area of second child access node in overlapping time duration
5310

First access node transmit, to at least one of the first child access node and the second child access node and based on the configuration parameters, activation indication of the radio resources for the first area or the second area.
5320

FIG. 53

RESOURCE CONFIGURATION FOR INTEGRATED ACCESS AND BACKHAUL NODES

CROSS-REFERENCE TO RELATED APPLICATIONS

This application is a continuation of International Application No. PCT/US2020/012932, filed Jan. 9, 2020, which claims the benefit of U.S. Provisional Application No. 62/790,424, filed Jan. 9, 2019, and U.S. Provisional Application No. 62/790,994, filed Jan. 10, 2019, which are hereby incorporated by reference in their entirety.

BRIEF DESCRIPTION OF THE SEVERAL VIEWS OF THE DRAWINGS

Examples of several of the various embodiments of the present disclosure are described herein with reference to the drawings.

FIG. 4A, FIG. 4B, FIG. 4C and FIG. 4D are example diagrams for uplink and downlink signal transmission as per an aspect of an embodiment of the present disclosure.

FIG. 7A and FIG. 7B are diagrams depicting example sets of OFDM subcarriers as per an aspect of an embodiment of the present disclosure.

FIG. 17 is an example diagram of an aspect of an embodiment of the present disclosure.

FIG. 49 is an example diagram of an aspect of an embodiment of the present disclosure.

FIG. 53 is an example diagram of an aspect of an embodiment of the present disclosure.

DETAILED DESCRIPTION OF EMBODIMENTS

Figure 1:
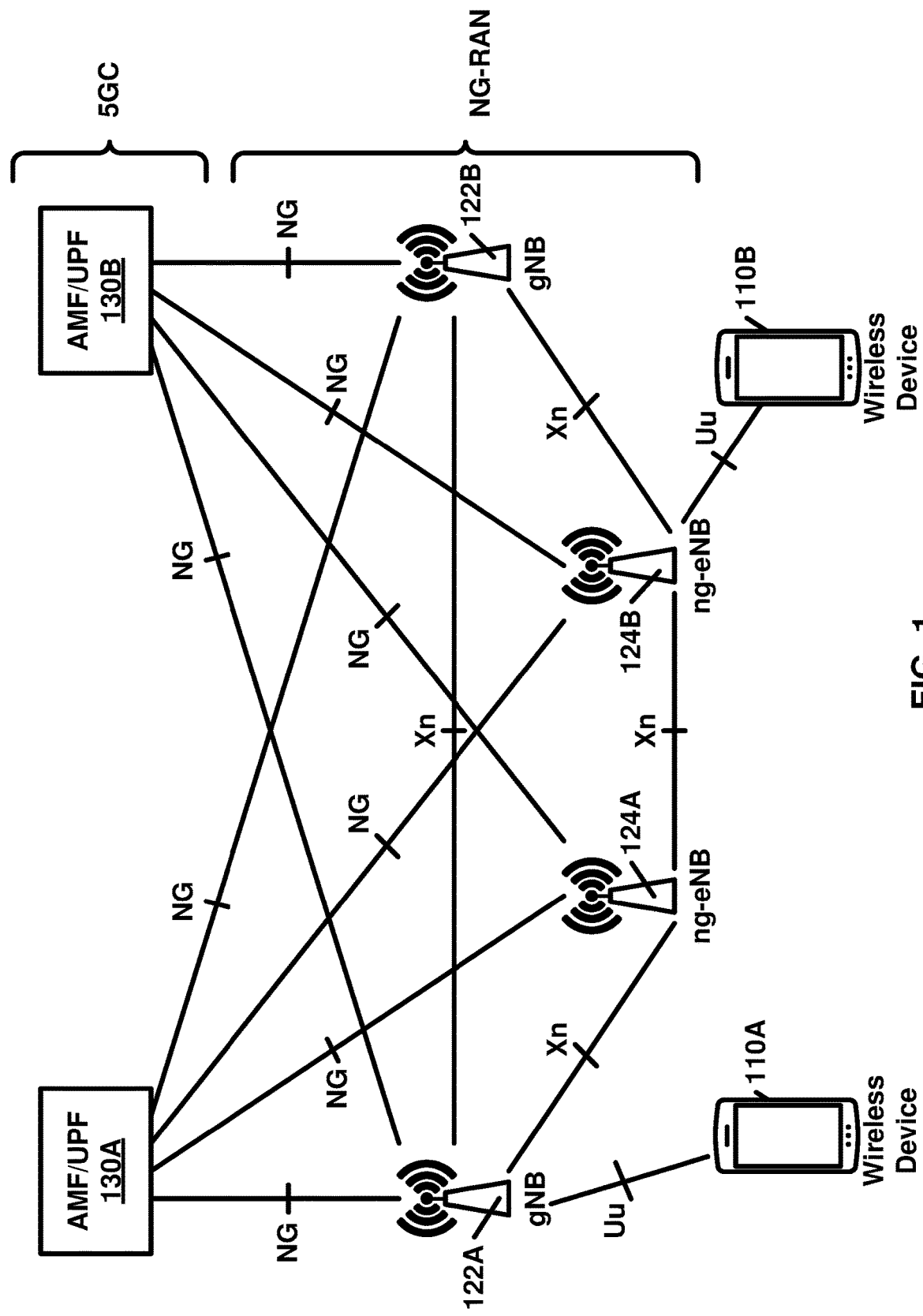
FIG. 1 is a diagram of an example RAN architecture as per an aspect of an embodiment of the present disclosure.

Example embodiments of the present disclosure enable operation of wireless communication systems. Embodiments of the technology disclosed herein may be employed in the technical field of multicarrier communication systems. More particularly, the embodiments of the technology disclosed herein may relate to radio access networks in multi-carrier communication systems.

The following Acronyms are used throughout the present disclosure:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel Identifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups RI Rank indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
STAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Example embodiments of the disclosure may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 120C, 120D), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface.

A gNB or an ng-eNB may host functions such as radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide functions such as NG interface management, UE context management, UE mobility management, transport of NAS messages, paging, PDU session management, configuration transfer or warning message transmission.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between 3rd Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
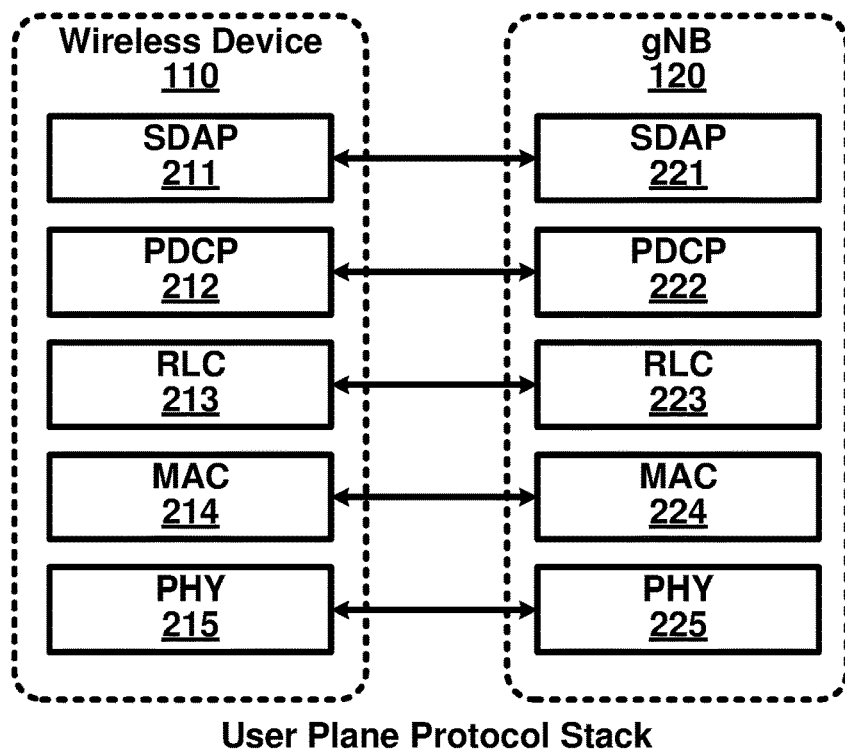
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TBs) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
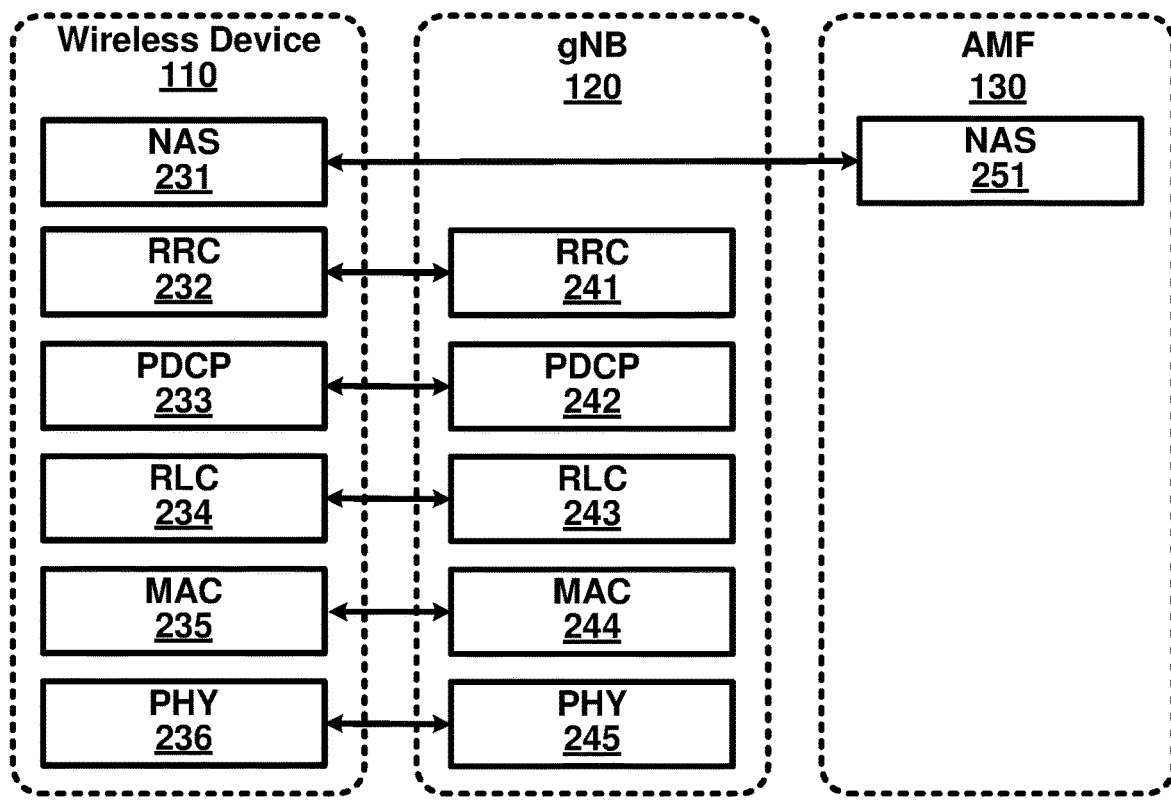
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
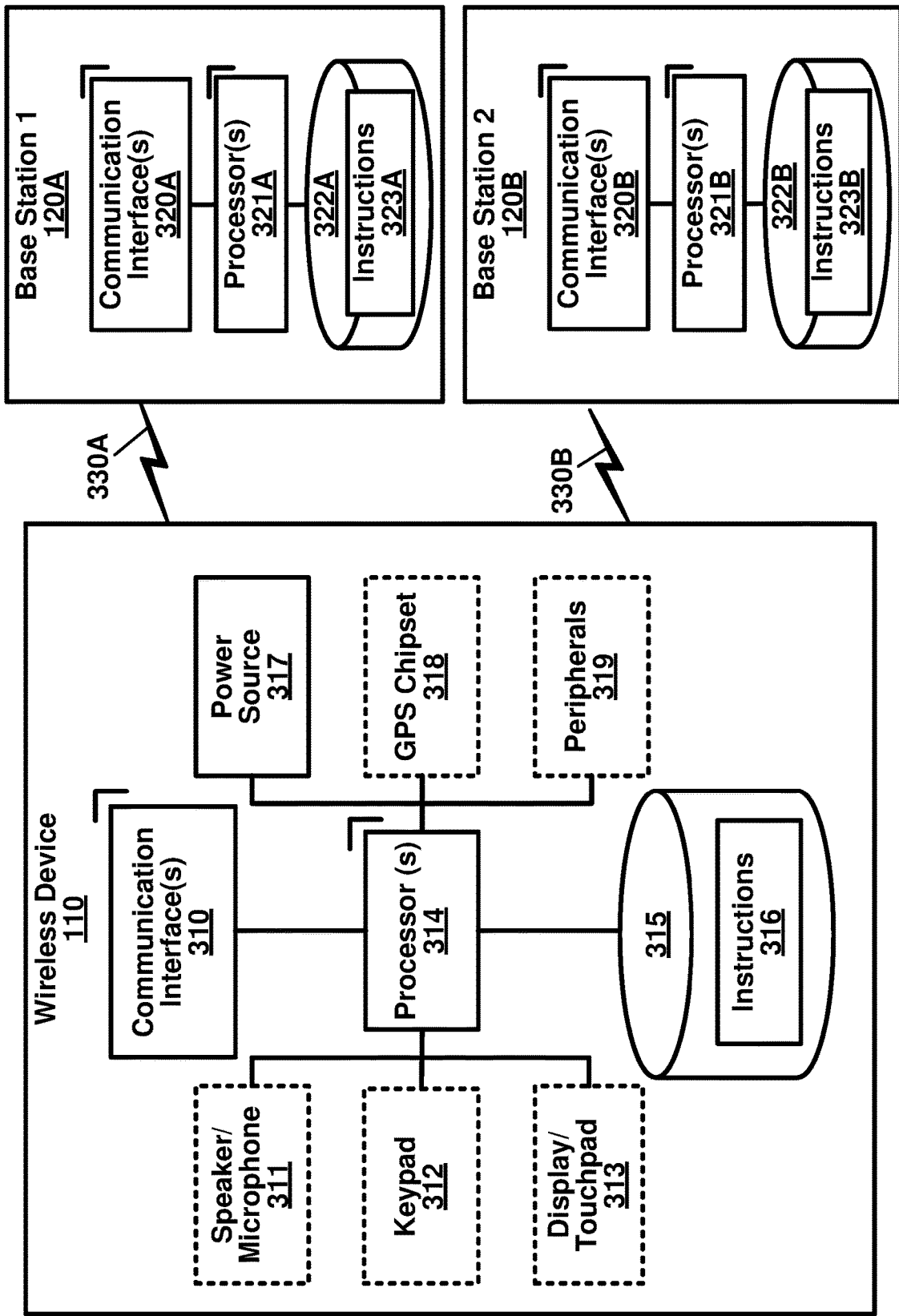
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., only static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signaling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to reestablish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1. 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
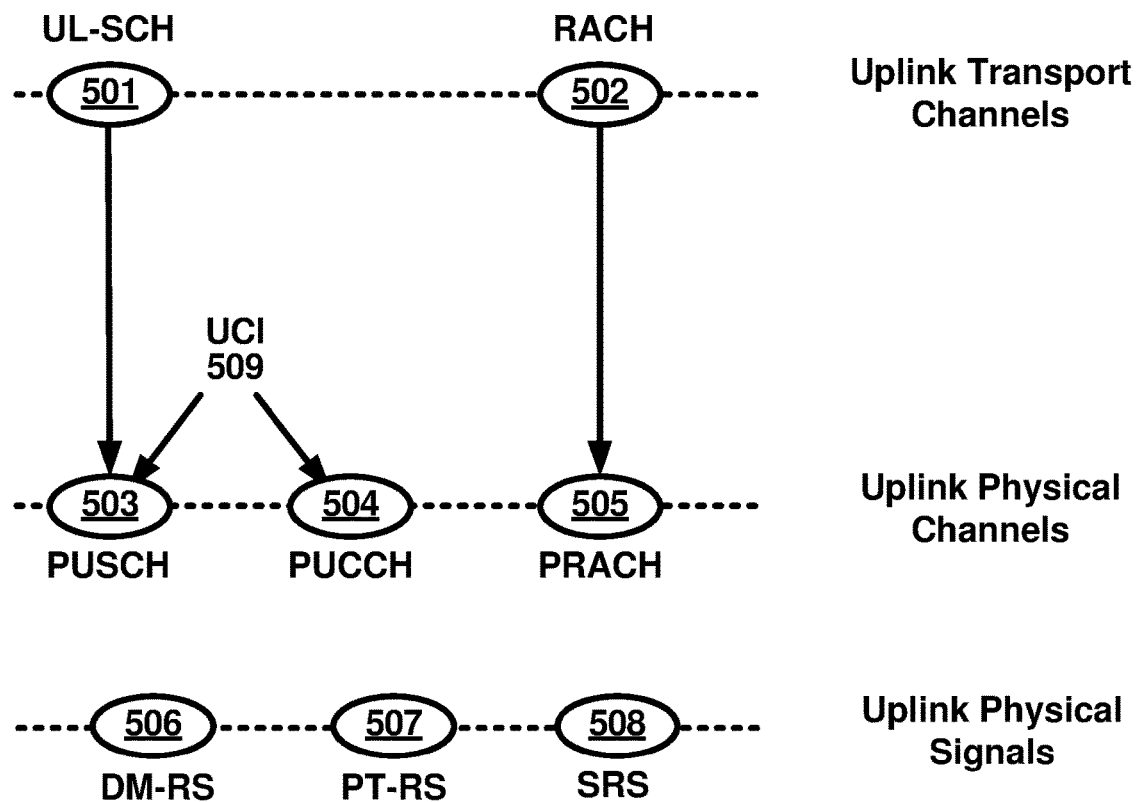
FIG. 5A is a diagram of an example uplink channel mapping and example uplink physical signals as per an aspect of an embodiment of the present disclosure.
Figure 5B:
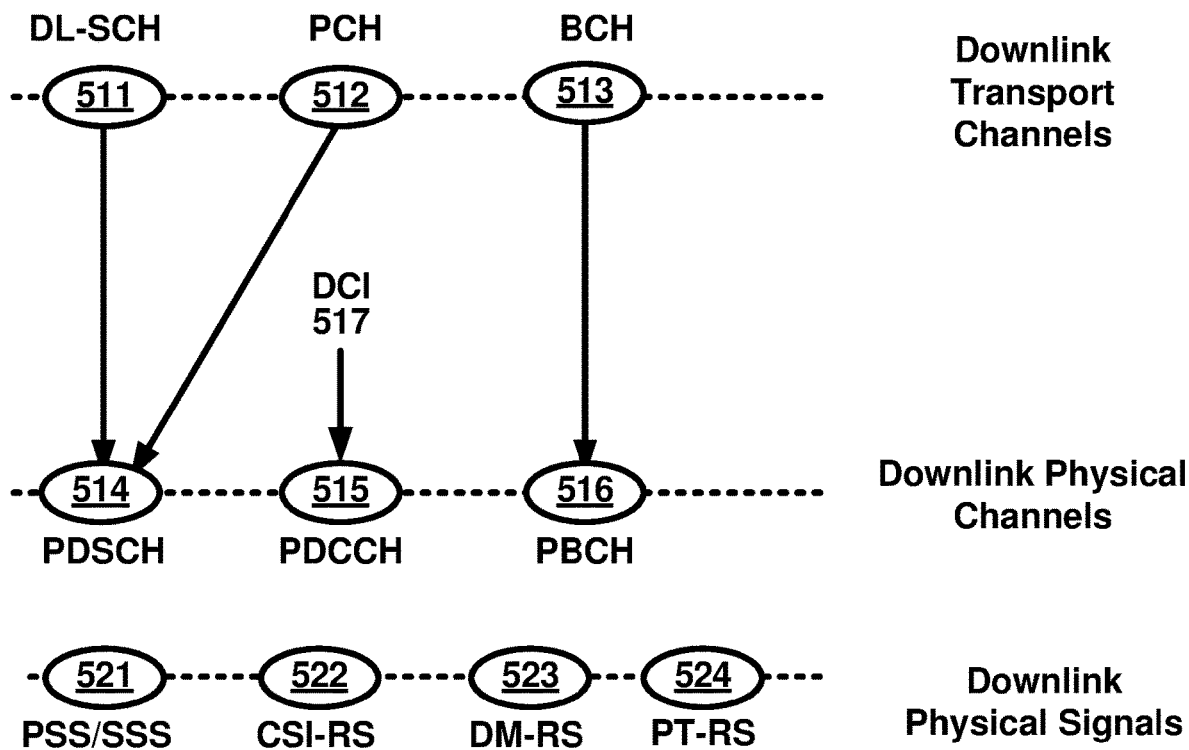
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and Control Resource Set (CORESET) when the downlink CSI-RS 522 and CORESET are spatially quasi co-located and resource elements associated with the downlink CSI-RS 522 are the outside of PRBs configured for CORESET. In an example, a UE may be configured to employ a same OFDM symbols for downlink CSI-RS 522 and SSB/PBCH when the downlink CSI-RS 522 and SSB/PBCH are spatially quasi co-located and resource elements associated with the downlink CSI-RS 522 are the outside of PRBs configured for SSB/PBCH.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
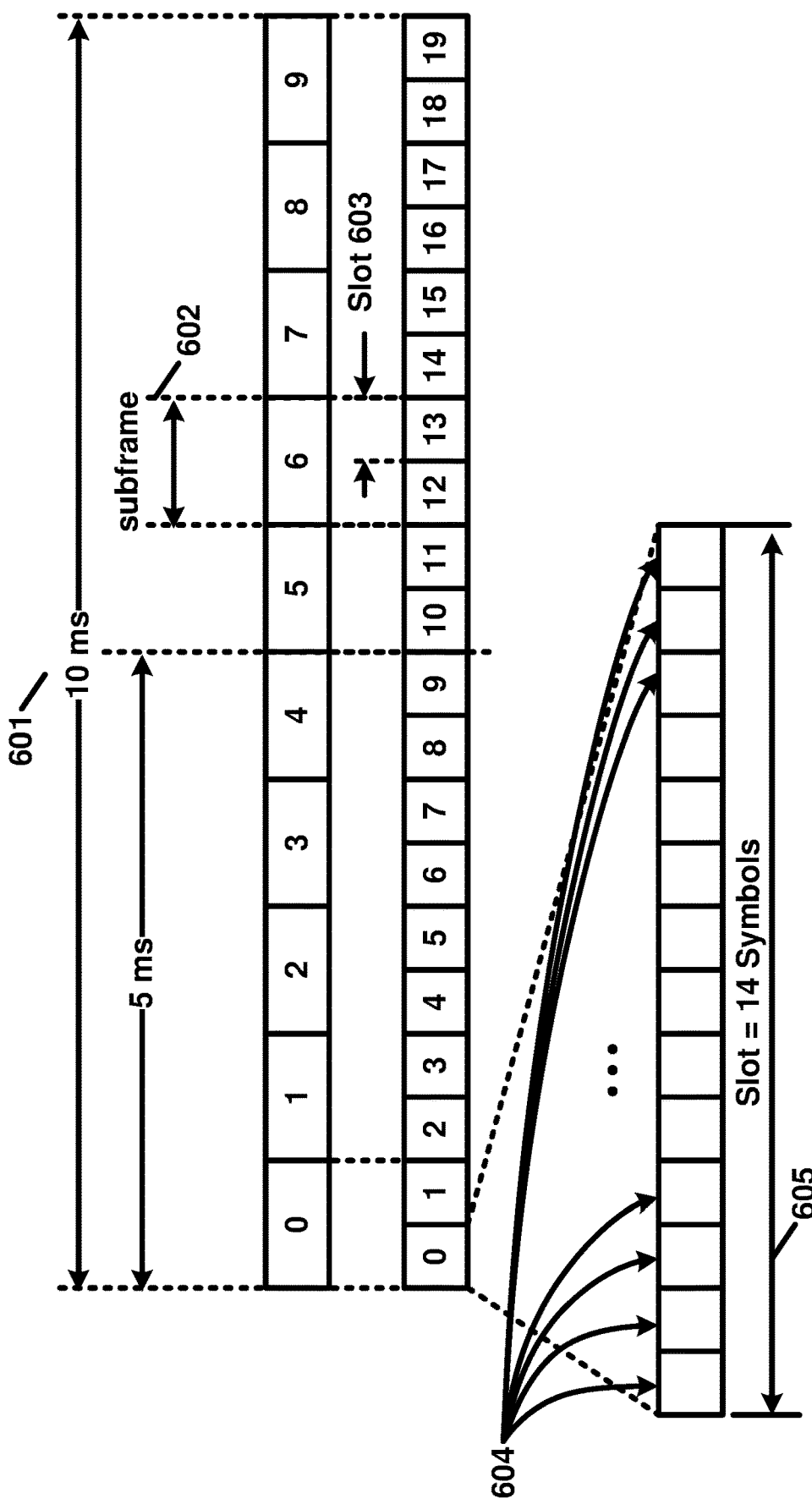
FIG. 6 is a diagram depicting an example transmission time or reception time for a carrier as per an aspect of an embodiment of the present disclosure.

FIG. 6 is a diagram depicting an example transmission time and reception time for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame timing. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 KHz with extended CP. A slot may contain downlink, uplink, or a downlink part and an uplink part and/or alike.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
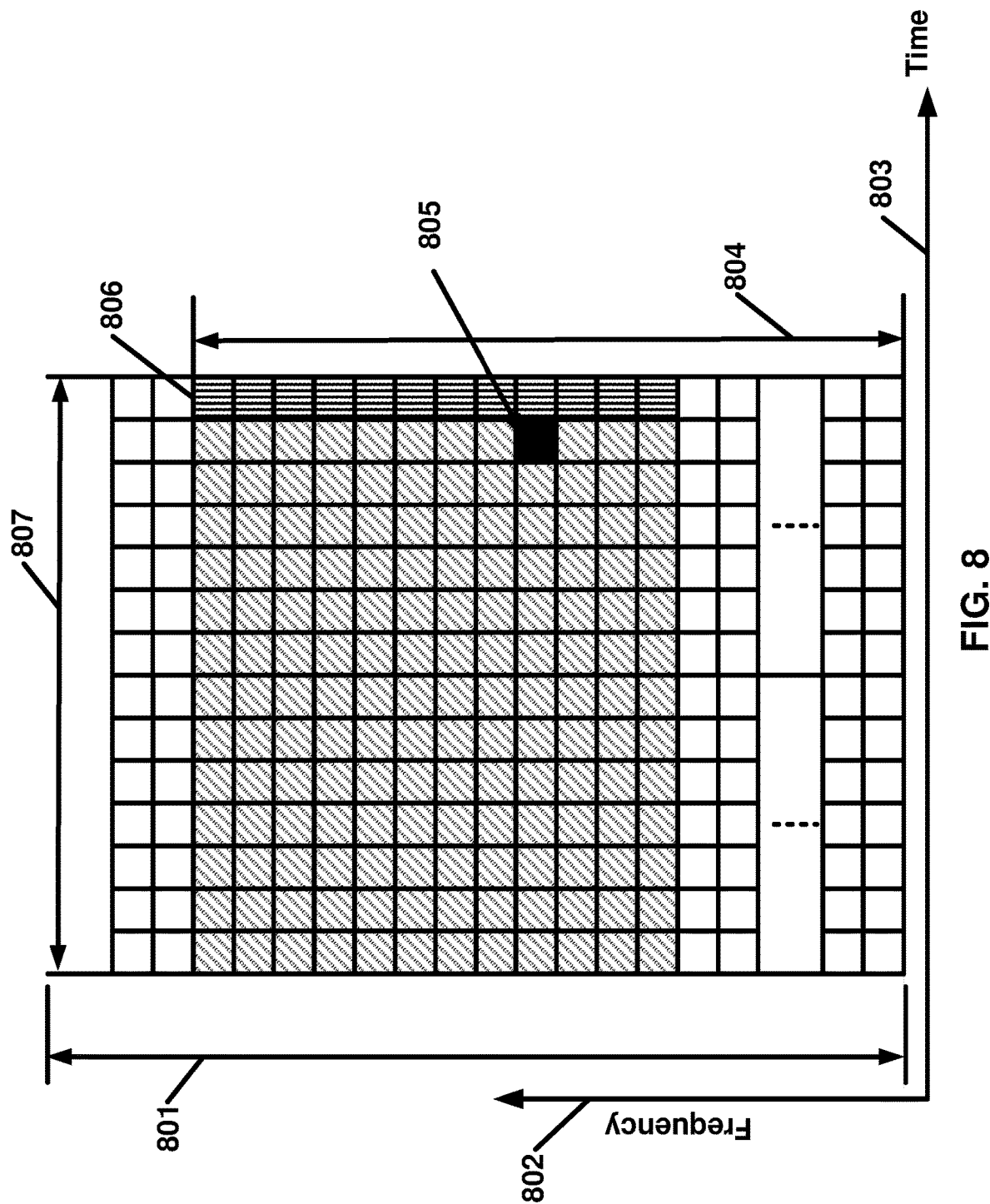
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCLed with the DM-RS antenna port(s). Different set of DM-RS antenna port(s) for a DL data channel may be indicated as QCL with different set of the RS antenna port(s).

Figure 9A:
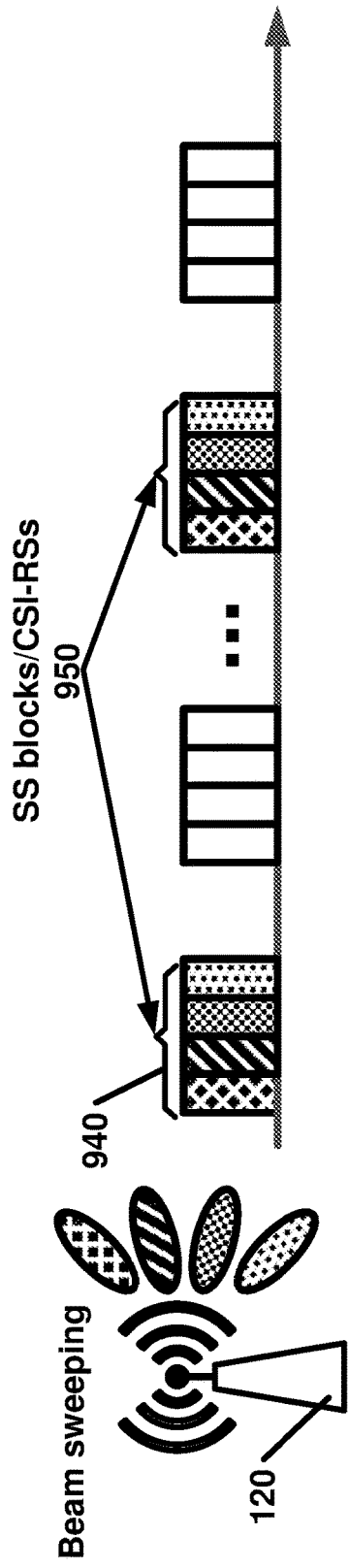
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming an SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
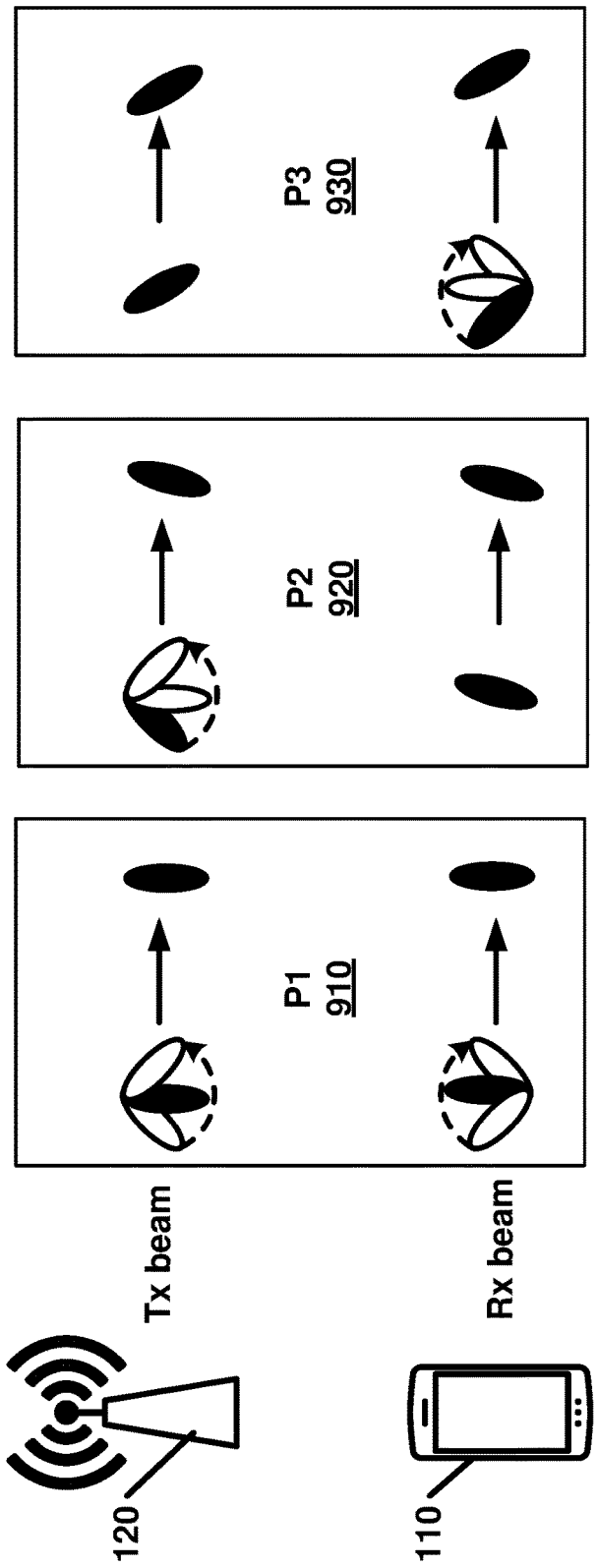
FIG. 9B is a diagram depicting an example downlink beam management procedure as per an aspect of an embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
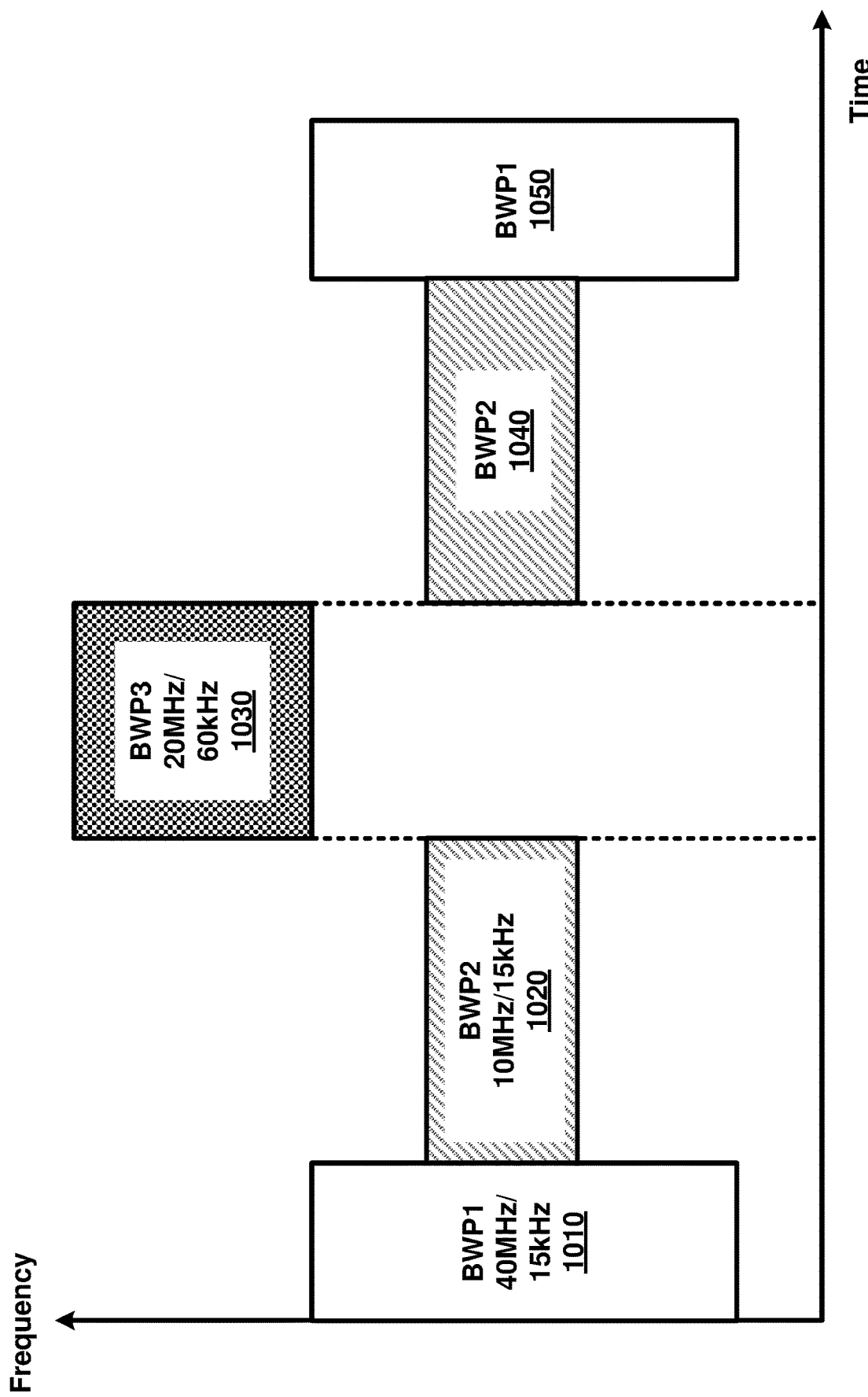
FIG. 10 is an example diagram of configured BWPs as per an aspect of an embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 KHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base statin may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
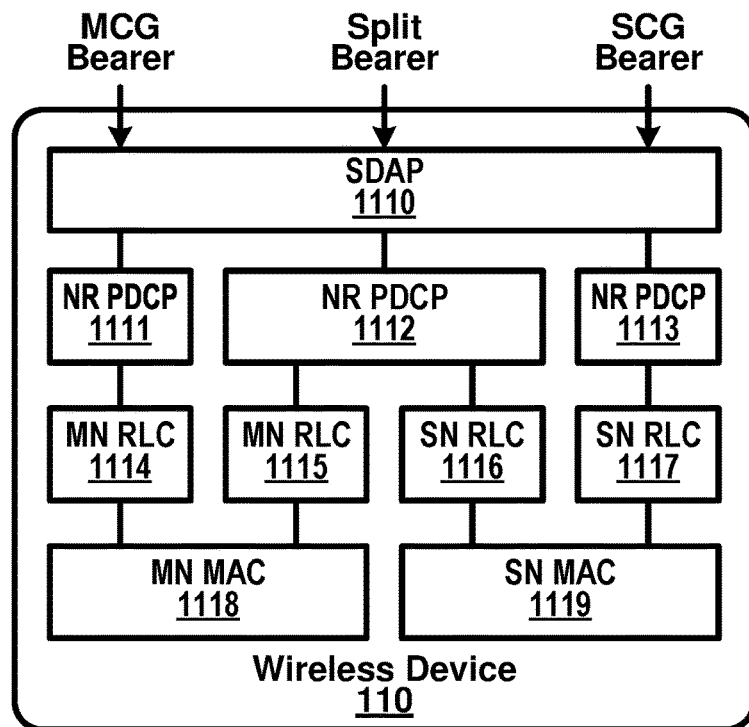
FIG. 11A, and FIG. 11B are diagrams of an example multi connectivity as per an aspect of an embodiment of the present disclosure.
Figure 11B:
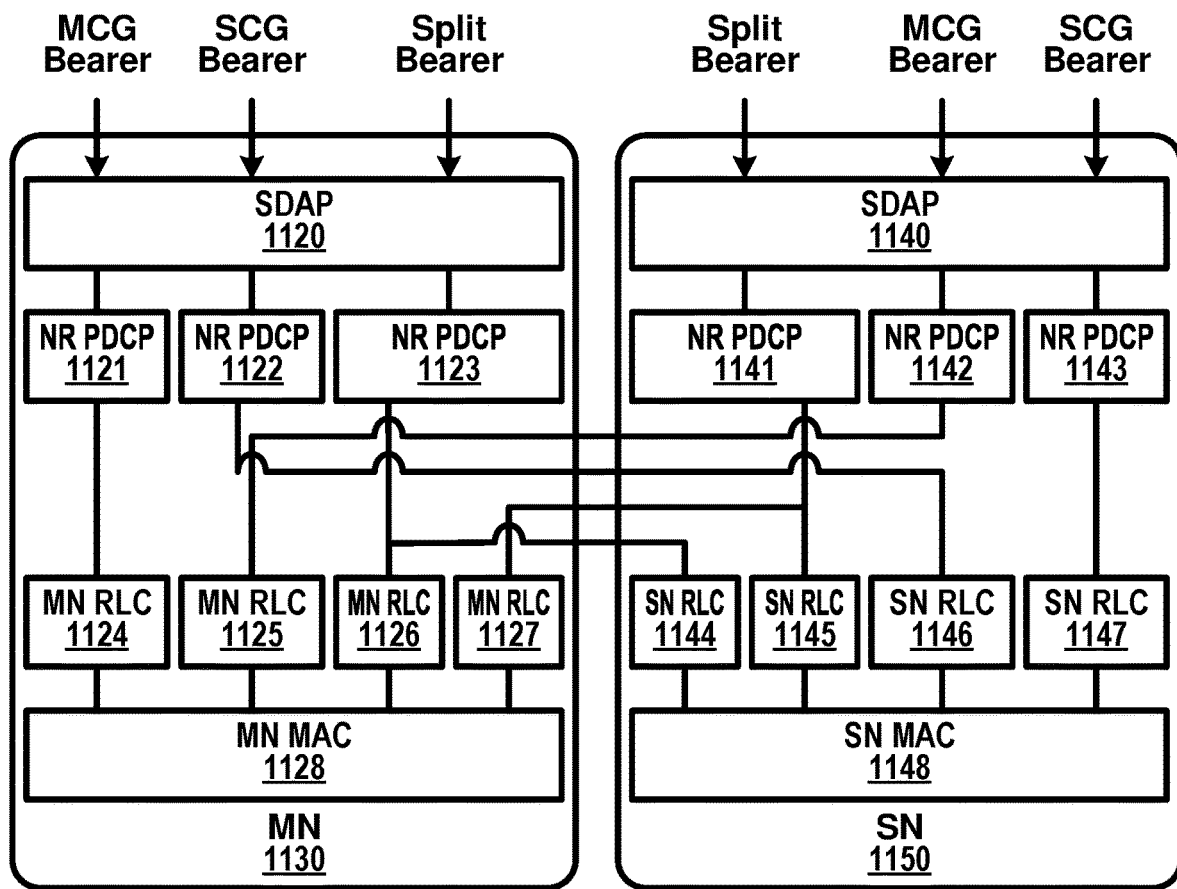

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 12:
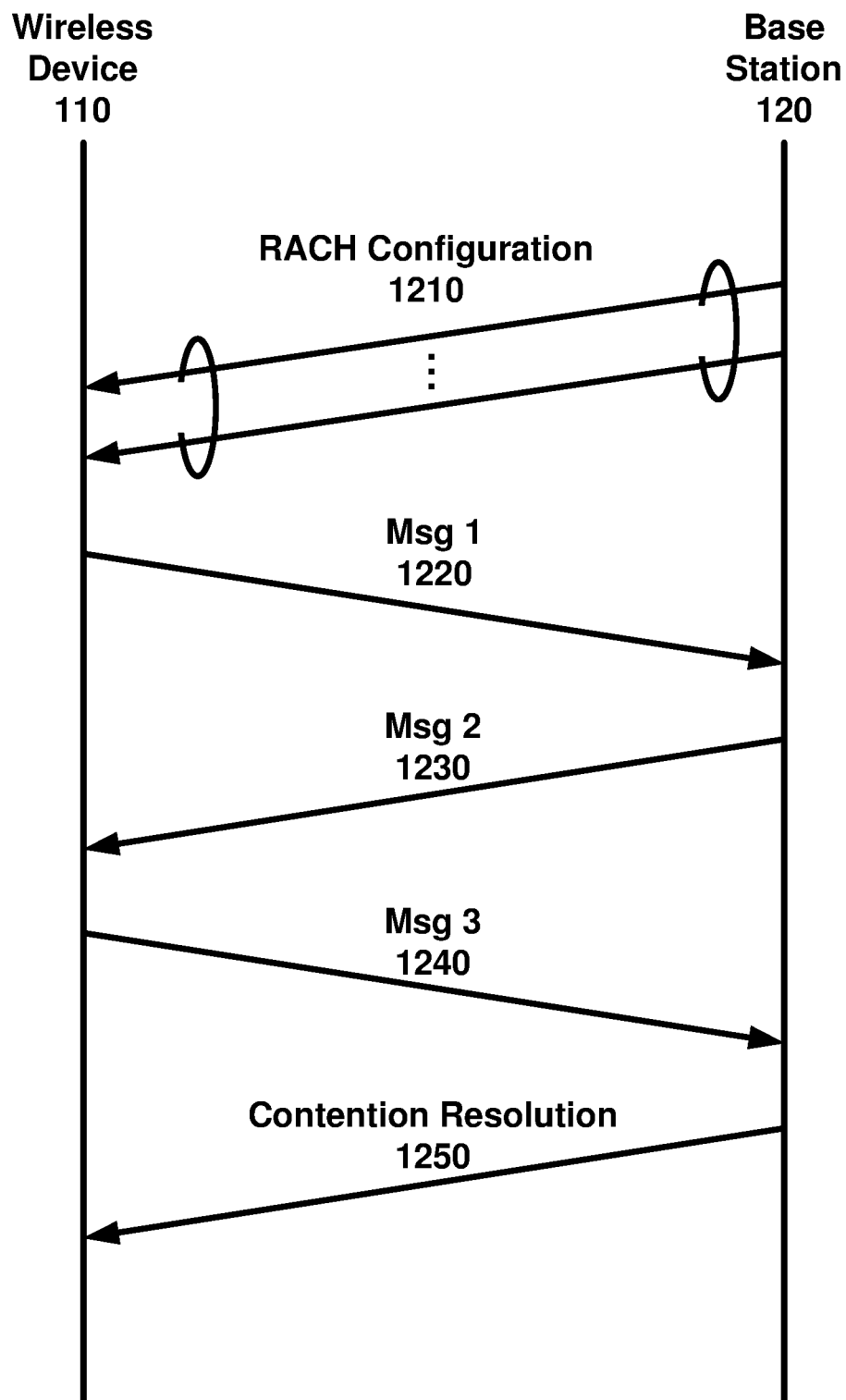
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-ResponseWindow) to monitor a random access response. For beam failure recovery request, a base station may configure a UE with a different time window (e.g., bfr-Response Window) to monitor response on beam failure recovery request. For example, a UE may start a time window (e.g., ra-Response Window or bfr-ResponseWindow) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises only a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
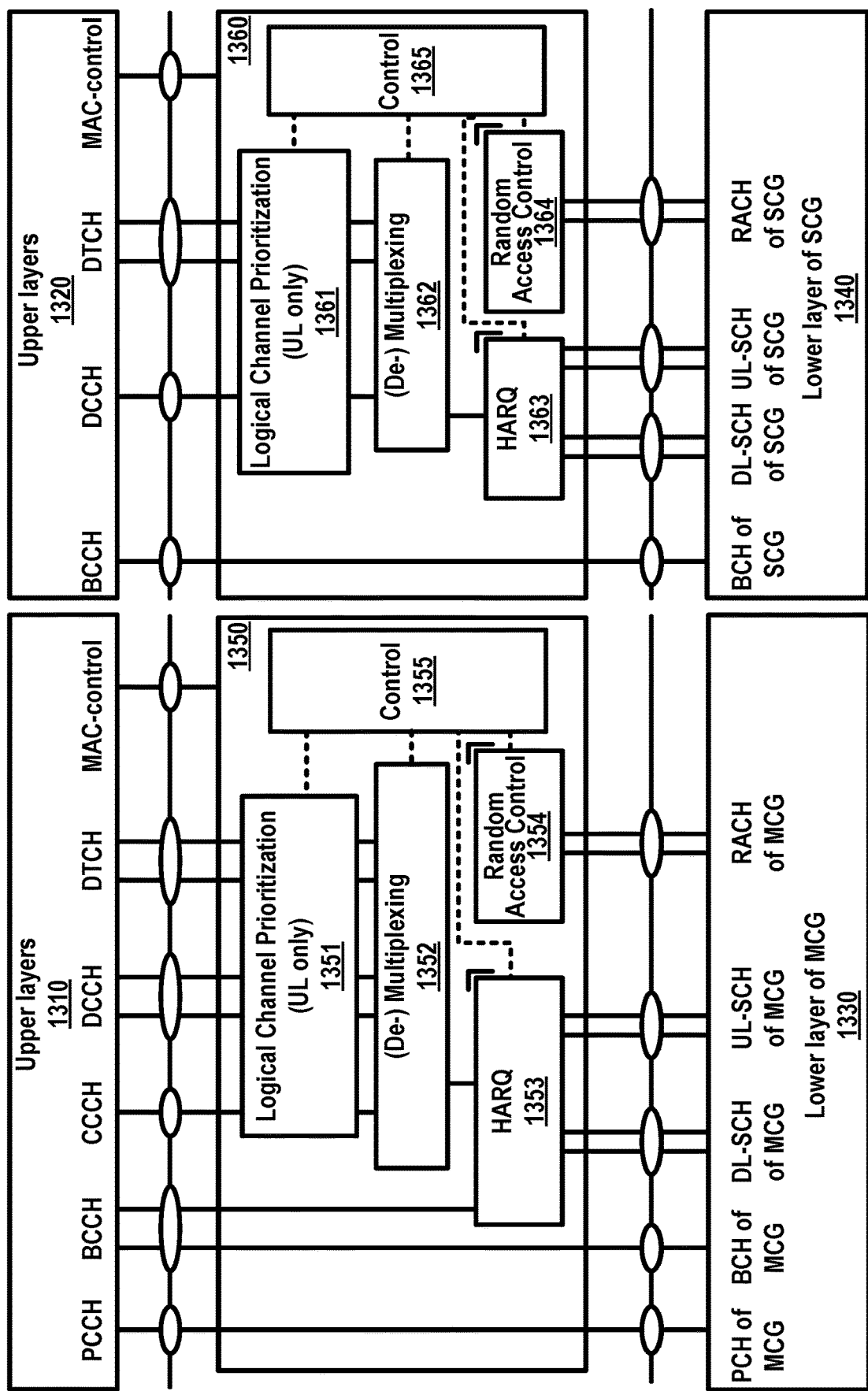
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
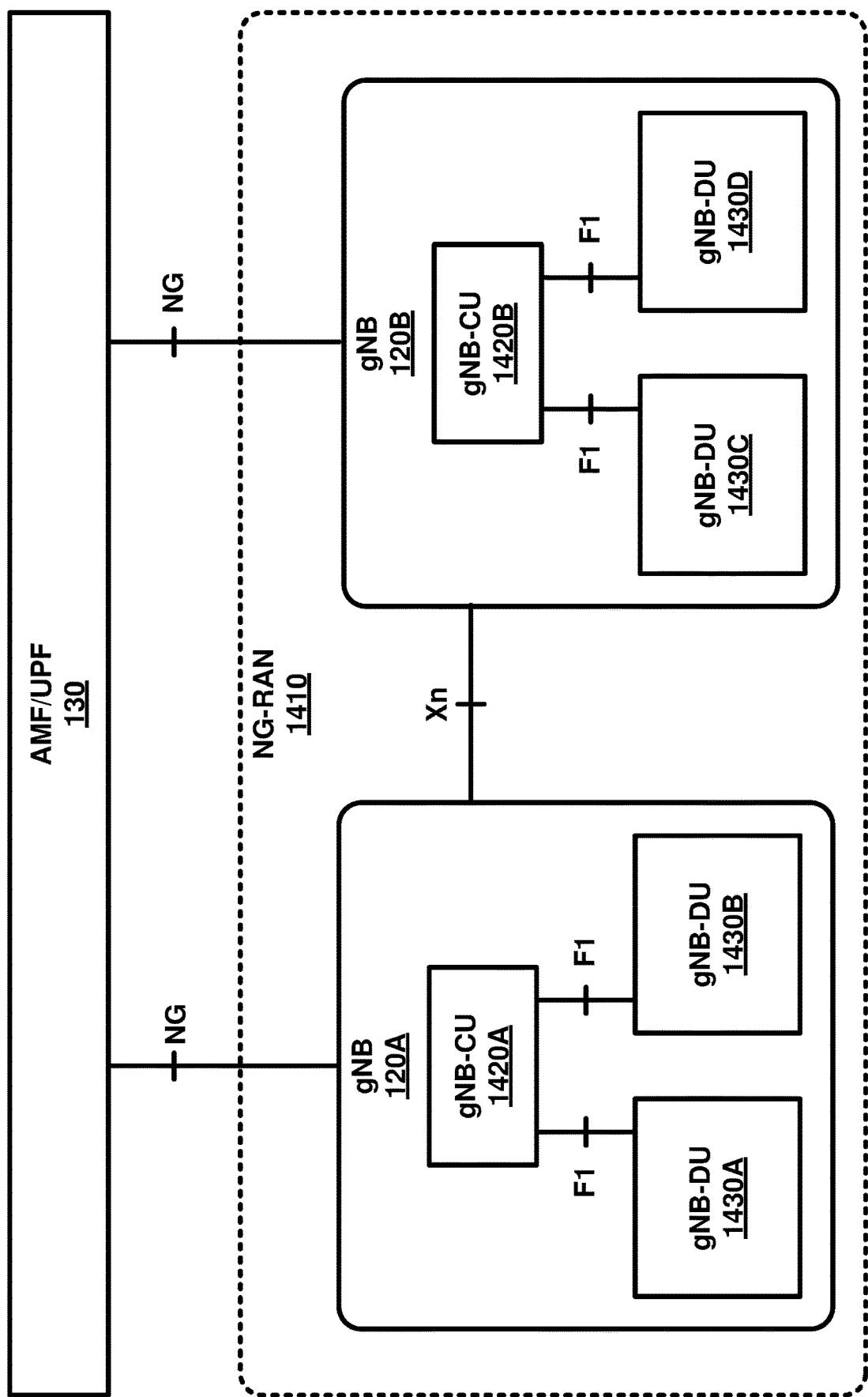
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. gNB 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
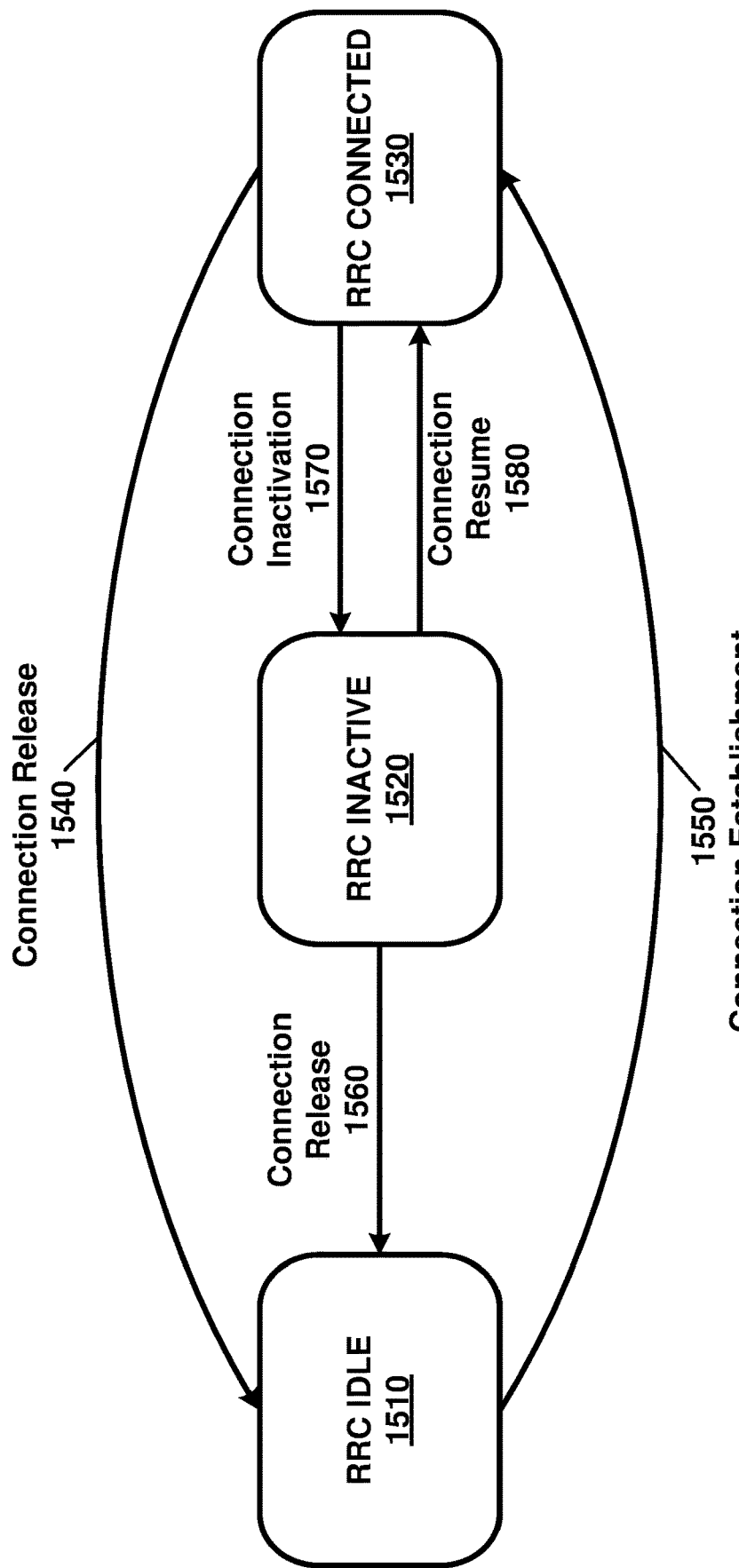
FIG. 15 is a diagram of example RRC states as per an aspect of an embodiment of the present disclosure.

FIG. 15 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

In an example, an integrated access and backhaul (IAB) may support a wireless backhaul connection for an access network node (e.g. distributed unit, gNB-DU, base station, gNB, IAB-node, relay node, mobile relay node, RAN node, and/or the like). In an example, an IAB-node may indicate a RAN node that may support wireless access to UEs and/or wirelessly backhauls access traffic. In an example, an IAB-donor may indicate a RAN node which may provide UE's interface to core network and/or wireless backhauling functionality to IAB nodes.

In an example, IAB may enable flexible and/or very dense deployment of cells without densifying the transport network proportionately. A diverse range of deployment scenarios may be envisioned including support for outdoor small cell deployments, indoors, and/or even mobile relays (e.g. on buses and/or trains). IAB may support physically fixed relays and/or mobile relays.

In example IAB deployment, in-band and/or out-of-band backhauling with respect to the access link may be supported. In-band backhauling may include scenarios, where access and backhaul link at least partially overlap in frequency creating half-duplexing or interference constraints. Half-duplexing constraint and/or interference constraints of in-band backhauling may imply that IAB node may not transmit and receive simultaneously on both links. In an example, out-of-band scenarios may not pose half-duplexing constraint and/or interference constraints. In in-band backhauling deployments, tighter interworking between access and backhaul in compliance with half-duplexing and interference constraints may be needed.

In an example, in-band IAB scenarios may support TDM/FDM/SDM of access and backhaul links subject to half-duplex constraint at the IAB node. In an example, in-band IAB scenario may support full duplex solutions. In an example, out-of-band IAB scenarios may be supported using the same set of RAN features designed for in-band scenarios.

In an example, IAB may support access and backhaul in above-6 GHZ-and/or sub-6 GHz spectrum. Backhauling of access traffic over the same RAT backhaul links may be supported. Inter-RAT operation for backhauling and access may be supported.

UEs may transparently connect to an IAB-node via the same RAT. IAB architectures required for a first RAT access over a second RAT backhaul may be supported In an example, IAB may support stand-alone (SA) and/or non-stand-alone (NSA) deployments. For NSA, IAB-based relaying of UE's secondary cell group (SCG) path may be supported. IAB-based relaying of UE's master cell group (MCG) path be supported.

An IAB node may operate in SA and/or NSA mode. In an example, EN-DC and SA option 2 may be supported. In an example, EN-DC and SA option 2 for UEs and IAB-nodes may be supported. NSA deployment options and/or combinations of SA and NSA may be supported.

In an example, SA and/or NSA may be supported for access link. For an NSA access link, relaying may be applied to RAN node. In an example, both NSA and SA may be supported for backhaul link. Backhaul traffic over radio interface may be supported. In an example, for NSA access and backhaul links, EN-DC may be supported.

In an example, multi-hop backhauling may provide more range extension than single hop. Multi-hop backhauling may be beneficial for above-6 GHz frequencies due to their limited range. Multi-hop backhauling may enable backhauling around obstacles, e.g. buildings in urban environment for in-clutter deployments. In an example, the number of hops in IAB deployment may be expected to depend on many factors such as frequency, cell density, propagation environment, and/or traffic load. These factors may be expected to change over time. From the architecture perspective, flexibility in hop count may be desirable.

In an example, with increasing number of hops, scalability issues may limit performance and/or increase signaling load. Capturing scalability to hop count may affect system performances. IAB design may support multiple backhaul hops. In an example, IAB architecture may not limit on the number of backhaul hops. Scalability to hop-count may be supported. In an example, single hop may be considered (e.g. interpreted as) a special case of multiple backhaul hops.

In an example, wireless backhaul links may be vulnerable to blockage, e.g., due to moving objects such as vehicles, due to seasonal changes (foliage), and/or due to infrastructure changes (e.g. new buildings). Vulnerability of wireless backhaul links may apply to physically stationary IAB-nodes. In an example, traffic variations may create uneven load distribution on wireless backhaul links leading to local link and/or node congestion.

In an example, topology adaptation (e.g. adaptive routing) may refer to procedures that autonomously reconfigure backhaul network under circumstances such as blockage and/or local congestion without discontinuing services for UEs. In an example, topology adaptation for physically fixed relays may be supported to enable robust operation, e.g., mitigate blockage and/or load variation on backhaul links.

In an example, for IAB implementation, layer 2 (L2) and layer 3 (L3) relay architectures may be supported.

In an example, IAB-related features such as IAB-node integration and/or topology adaptation may affect core network operations. In an example, IAB features may create additional core-network signaling load. An amount of signaling load of core network nodes may vary among the various designs of IAB architectures.

In an example, time synchronization between IAB nodes may be implemented e.g. to support TDD system and/or some potential features which may need network synchronization. IAB may support additional implementations on network synchronization, which may include in-band wireless backhaul and/or multi-hops backhauling.

In an example, IAB architectures may comprise mobile-termination (MT), gNB-DU, gNB-CU, UPF, AMF and SMF as well as the corresponding interfaces NR Uu (between MT and gNB), F1, NG, X2 and N4. IAB architecture may be configured based on modifications or enhancements to these functions and interfaces. An mobile-termination (MT) function may be defined a component of a mobile equipment (e.g. user equipment, UE). In an example, MT may be referred to as a function residing on an IAB-node that terminates radio interface layers of a backhaul Uu interface toward an IAB-donor and/or other IAB-nodes.

Figure 16:
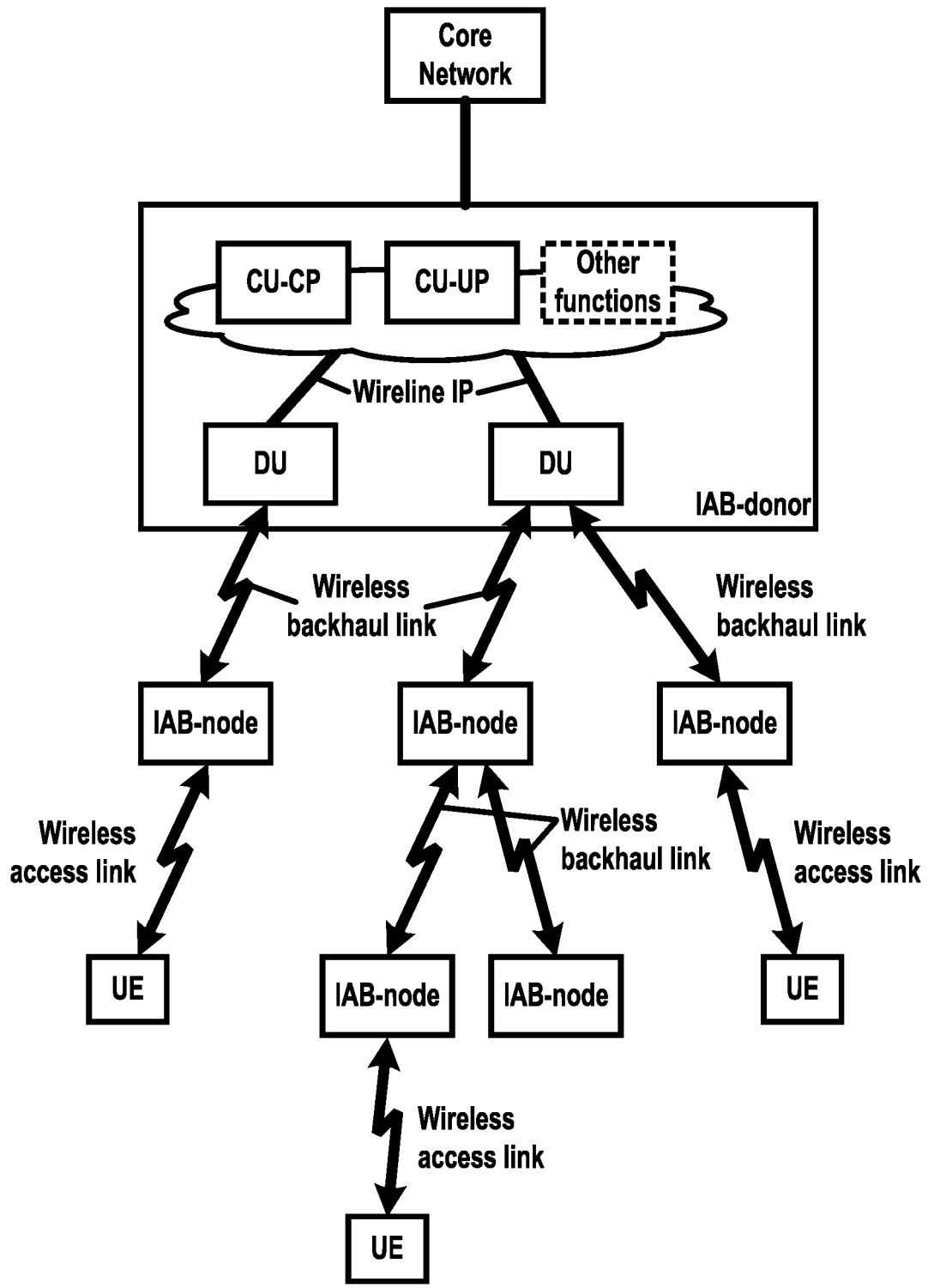
FIG. 16 is an example diagram of an aspect of an embodiment of the present disclosure.

FIG. 16 shows an example diagram for IAB in standalone mode, which may contain one IAB-donor and multiple IAB-nodes. An IAB-donor may be treated as a single logical node that may comprise a set of functions such as gNB-DU, gNB-CU-CP. gNB-CU-UP and/or potentially other functions. In a deployment, an IAB-donor may be split according to these functions, which may be collocated and/or non-collocated. IAB architectures may operate with split of these functions. In an example, some of functions associated with an IAB-donor may be moved outside of the donor in some cases.

In an example, an IAB node may operate in SA mode and/or in NSA mode. When operating in NSA, an IAB-node may use other link for backhauling. In an example, a UE connecting to an IAB-node may choose a different operation mode than the IAB-node. A UE may connect to a different type of core network than an IAB-node that the UE is connected to. In this case, (e)Decor or slicing may be used for core network selection. IAB-nodes operating in NSA-mode may be connected to the same or to different base stations (e.g. gNBs, eNBs). UEs that operate in NSA-node may connect to the same or to a different base stations than an IAB-node that they are connected to. FIG. 17 shows examples for SA-mode and NSA-mode with core network(s).

In an example, IAB multi-hop designs may differ with respect to modification needed on interfaces and/or additional functionality needed, e.g. to accomplish multi-hop forwarding. Example architectures may be divided into two architecture groups.

In an example, architecture group 1 may comprise architectures 1a and/or 1b. The architecture 1a and/or 1b may leverage CU/DU split architecture. Architecture 1a may comprise backhauling of F1-U using an adaptation layer and/or GTP-U combined with an adaptation layer. Architecture 1a may employ hop-by-hop forwarding across intermediate nodes using an adaptation layer for operation with core network and/or PDN-connection-layer routing for operation with other core networks (e.g. other RAT, EPC). In an example, architecture 1b may comprise backhauling of F1-U on access node using GTP-U/UDP/IP. Architecture 1b may employ hob-by-hop forwarding across intermediate node using an adaptation layer.

In an example, architecture group 2 may comprise architectures 2a, 2b, and/or 2c. Architecture 2a may comprise backhauling of F1-U or NG-U on access node using GTP-U/UDP/IP. Architecture 2a may employ hop-by-hop forwarding across intermediate node using PDU-session-layer routing. Architecture 2b may comprise backhauling of F1-U or NG-U on access node using GTP-U/UDP/IP. Architecture 2b may employ hop-by-hop forwarding across intermediate node using GTP-U/UDP/IP nested tunneling. Architecture 2c may comprise backhauling of F1-U or NG-U on access node using GTP-U/UDP/IP. Architecture 2c may employ hop-by-hop forwarding across intermediate node using GTP-U/UDP/IP/PDCP nested tunneling.

Figure 18:
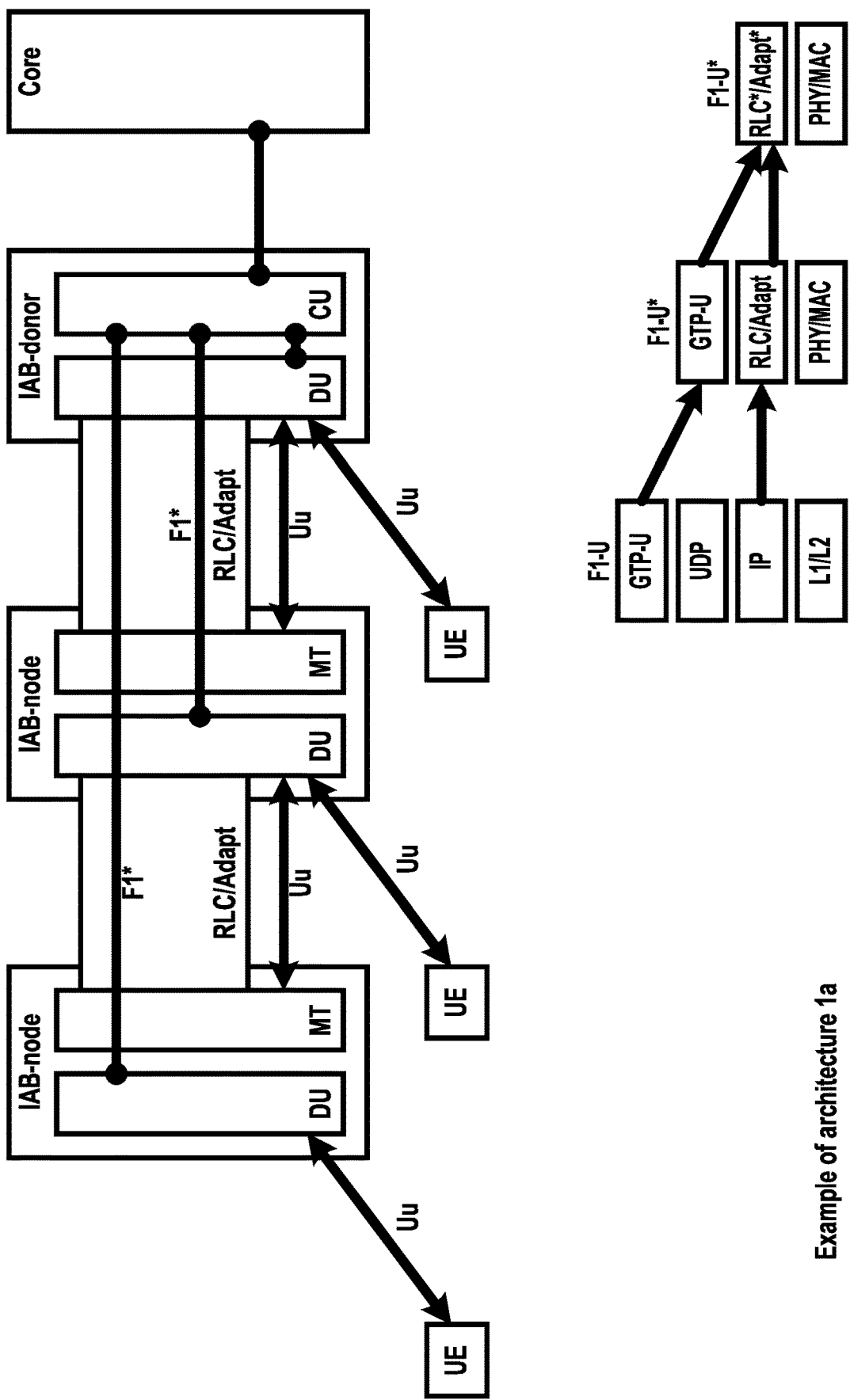
FIG. 18 is an example diagram of an aspect of an embodiment of the present disclosure.

In an example, architecture 1a may leverage CU/DU-split architecture. FIG. 18 shows an example diagram for a two-hop chain of IAB-nodes underneath an IAB-donor, where IAB-node and UE connect in SA-mode to a core network node (e.g. AMF, UPF, SMF, MME, SGW). In an architecture 1a, an IAB node may hold a DU and/or an MT. Via an MT, an IAB-node may connect to an upstream IAB-node and/or an IAB-donor. Via a DU, an IAB-node may establish RLC-channels to UEs and/or to MTs of downstream IAB-nodes. For MTs, an RLC-channel may refer to a modified RLC*. An IAB node may connect to more than one upstream IAB-node and/or IAB-donor.

In an example of an architecture 1a, a donor (IAB-donor) may hold a DU to support UEs and/or MTs of downstream IAB-nodes. An IAB-donor may hold a CU for DUs of IAB-nodes and/or for its own DU. Different CUs may serve DUs of IAB-nodes. A DU on an IAB-node may connect to a CU in an IAB-donor using a modified form of F1, which is referred to as F1*. F1*-U may run over RLC channels on a wireless backhaul between an MT on a serving IAB-node and a DU on a donor. F1*-U transport between MT and DU on a serving IAB-node and/or between DU and CU on a donor may be configured. In an example, an adaptation layer may be added, which may hold routing information, enabling hop-by-hop forwarding. An adaptation layer may replace an IP functionality of an F1-stack. F1*-U may carry a GTP-U header for end-to-end association between CU and DU. In an example, information carried via GTP-U header may be included into an adaption layer.

In an example of an architecture 1a, an RLC may apply ARQ on an end-to-end connection and/or hop-by-hop. FIG. 18 shows examples of F1*-U protocol stacks. RLC* may refer to enhancements of RLC. An MT of IAB-node may sustain NAS connectivity to a core network node (e.g. AMF, SMF, MME, and/or the like core node), e.g., for authentication of an IAB-node. An MT of IAB-node may sustain a PDU session via a core network node (e.g. UPF, SGW, PGW, and/or the like core node), e.g., to provide an IAB-node with connectivity to an operation and management (OAM). In an example, for NSA operation with core network, an MT may be dual-connected with networks (e.g. gNB, cNB, RNC, core network). IAB-node's MT may sustain a PDN connection with core network, e.g., to provide an IAB-node with connectivity to an OAM. Protocol translation between F1* and F1 in case that an IAB-donor is split may be supported.

Figure 19:
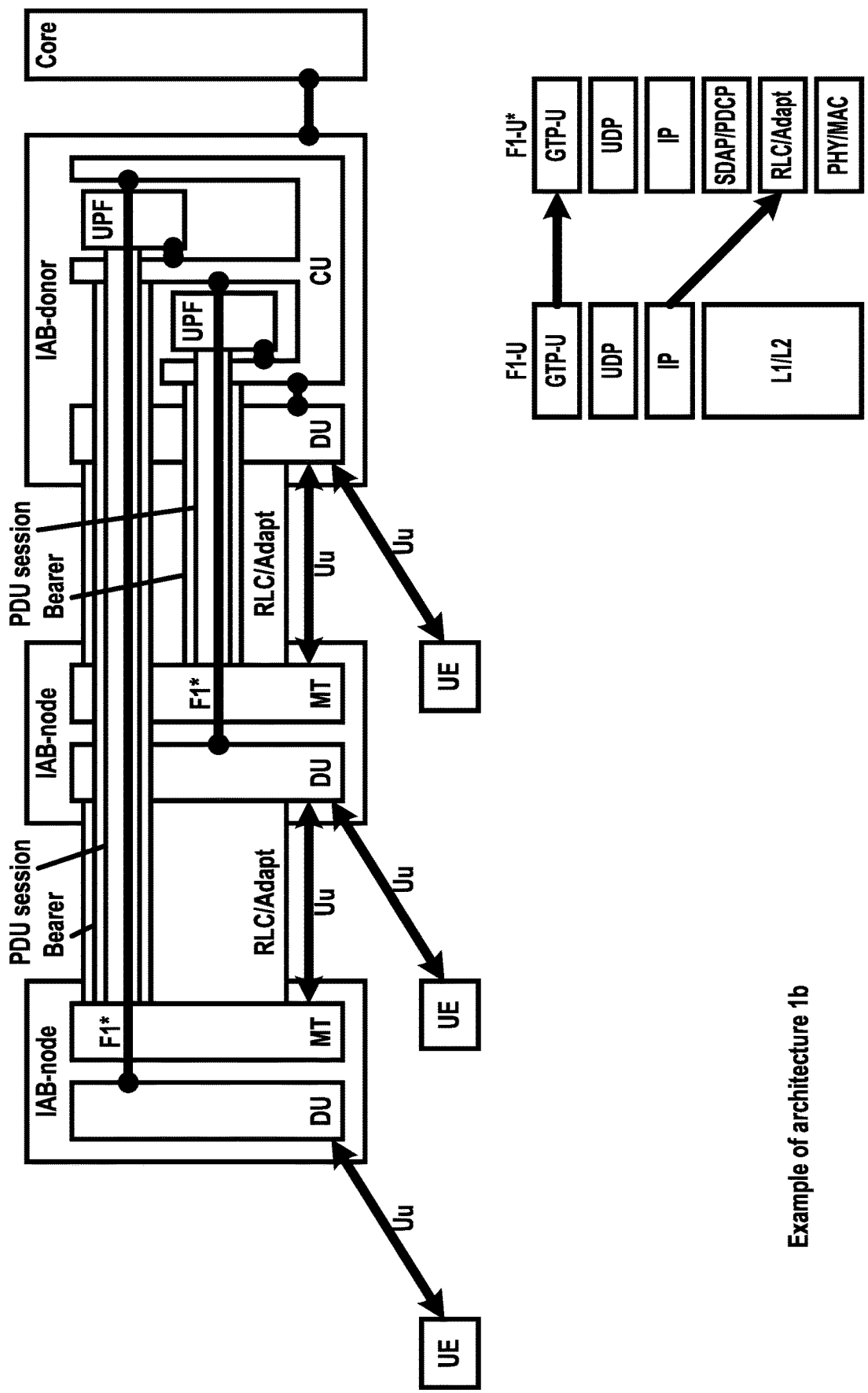
FIG. 19 is an example diagram of an aspect of an embodiment of the present disclosure.

In an example, architecture 1b may leverage CU/DU-split architecture. FIG. 19 shows an example diagram for a two-hop chain of IAB-nodes underneath an IAB-donor. An IAB-donor may hold one logical CU. An IAB node may connect to more than one upstream IAB-node and/or IAB-donor. In an example of architecture 1b, an IAB-node and/or an IAB-donor may hold the same functions as in architecture 1a. In an example, as in architecture 1a, a backhaul link may establish an RLC-channel. In architecture 1b, an adaptation layer may be inserted to enable hop-by-hop forwarding of F1*.

In an example of architecture 1b, an MT on an IAB-node may establishes a PDU session with a UPF residing on a donor (IAB-donor). MT's PDU session may carry F1* for a collocated DU. In an example, a PDU session may provide a point-to-point link between CU and DU. On intermediate hops, PDCP-PDUs of F1* may be forwarded via adaptation layer. FIG. 19 shows an example of an F1*-U protocol stack. For NSA operation with core network, an MT may be dual-connected with networks (e.g. gNB, eNB, RNC, core network). IAB-node's MT may sustain a PDN connection with a local gateway (L-GW) residing on the donor.

Figure 20:
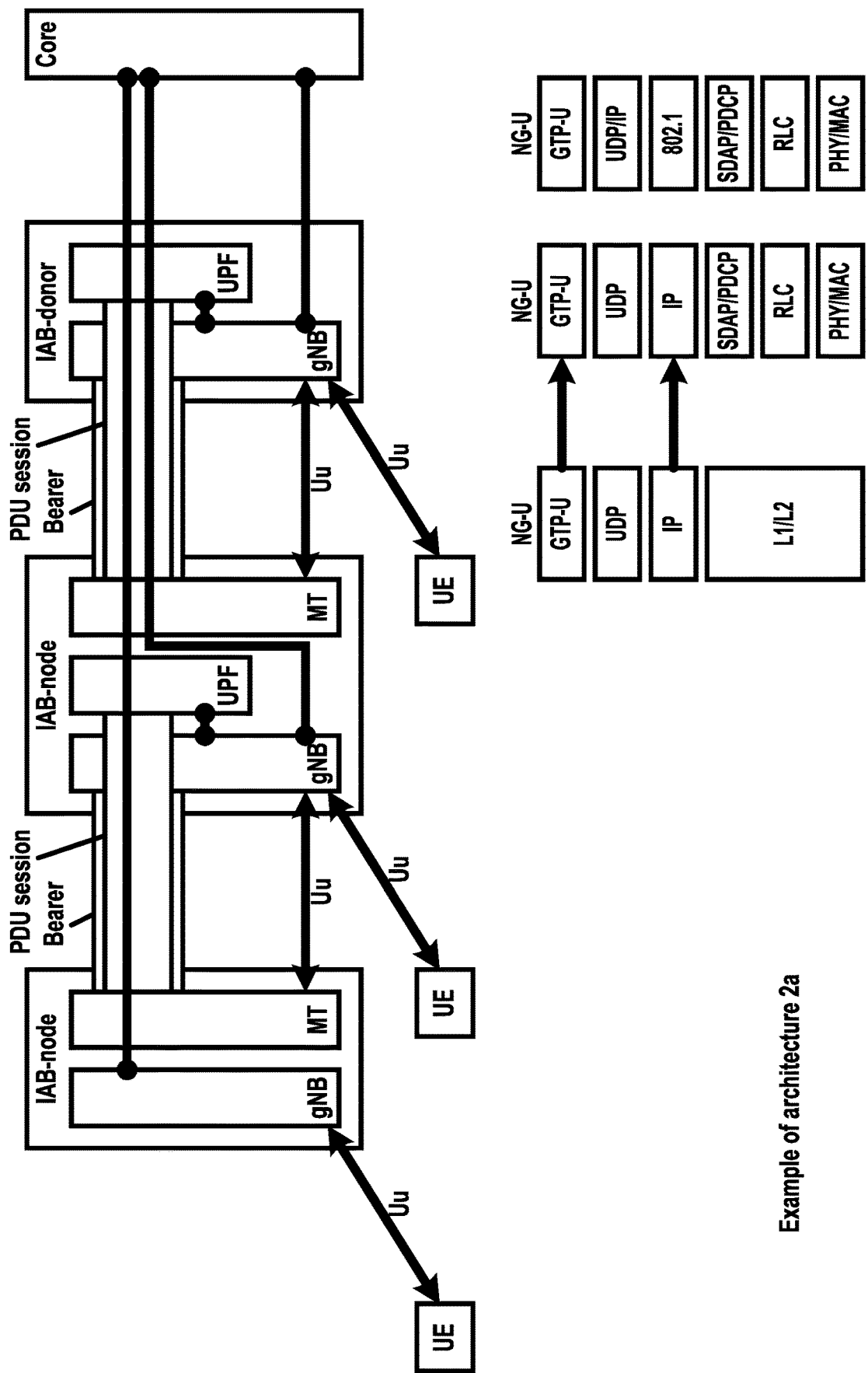
FIG. 20 is an example diagram of an aspect of an embodiment of the present disclosure.

FIG. 20 shows an example diagram for architecture 2a, where UE and/or IAB-node may use SA-mode with core network. In an example, of architecture 2a, an IAB-node may hold an MT to establish a Uu link with a gNB (base station) on a parent IAB-node and/or IAB-donor. Via a Uu link, an MT may sustain a PDU session with a UPF that may by collocated with a gNB. An independent PDU session may be created on a backhaul link (e.g. hop-by-hop). An IAB-node may support a routing function to forward data between PDU sessions of adjacent links. A routing function may create a forwarding plane across a wireless backhaul. Based on PDU session type, a forwarding plane may support IP and/or Ethernet. In case that PDU-session type is Ethernet, an IP layer may be established on top. An IAB-node may obtain IP connectivity to a wireline backhaul network. An IAB node may connect to more than one upstream IAB-node and/or IAB-donor.

In an example of architecture 2a, IP-based interfaces (e.g. NG, Xn, F1, N4, etc.) may be carried over a forwarding plane. In case of F1, a UE-serving IAB-node may contain a DU for access links in addition to a gNB and/or UPF for backhaul links. A CU for access links may reside in or beyond an IAB Donor. FIG. 20 shows an example of an NG-U protocol stack for IP-based and/or for Ethernet-based PDU-session type. In case that an IAB-node holds a DU for UE-access, PDCP-based protection on a hop may not be required since end user data may be protected using end to end PDCP between a UE and a CU. For NSA operation with core network, an MT may be dual-connected with networks (e.g. gNB, eNB, RNC, core network). IAB-node's MT may sustain a PDN-connection with a L-GW residing on a parent IAB-node and/or an IAB-donor. IP-based interfaces (e.g. NG, Xn, S1, S5, X2, etc.) may be carried over a forwarding plane.

Figure 21:
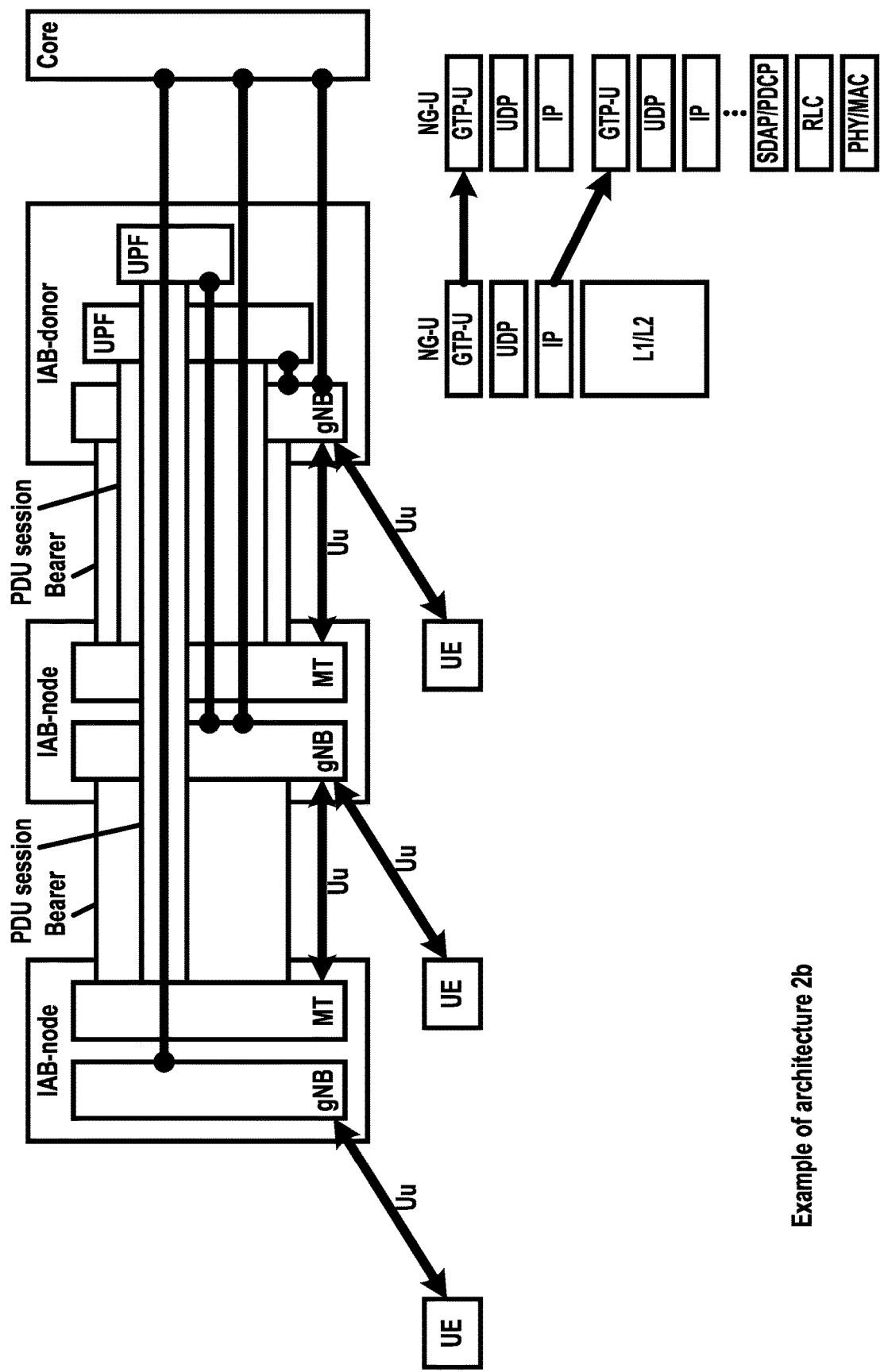
FIG. 21 is an example diagram of an aspect of an embodiment of the present disclosure.

In an example of architecture 2b, as shown in FIG. 21, an IAB-node may hold an MT to establish a Uu link with a gNB (base station) on a parent IAB-node and/or IAB-donor. Via a Uu link, an MT may sustain a PDU session with a UPF. A UPF may be located at an IAB-donor. Forwarding of PDUs across upstream IAB-nodes may be accomplished via tunneling. Forwarding across multiple hops may create a stack of nested tunnels. An IAB-node may obtain IP-connectivity to a wireline backhaul network. IP-based interfaces (e.g. NG, Xn, F1, N4, etc.) may be carried over a forwarding IP plane. FIG. 21 shows a protocol stack example for NG-U (e.g. S1-U). An IAB node may connect to more than one upstream IAB-node and/or IAB-donor. For NSA operation with core network, an MT may be dual-connected with networks (e.g. gNB, eNB, RNC, core network). IAB-node's MT may sustain a PDN-connection with a L-GW residing on an IAB-donor.

Figure 22:
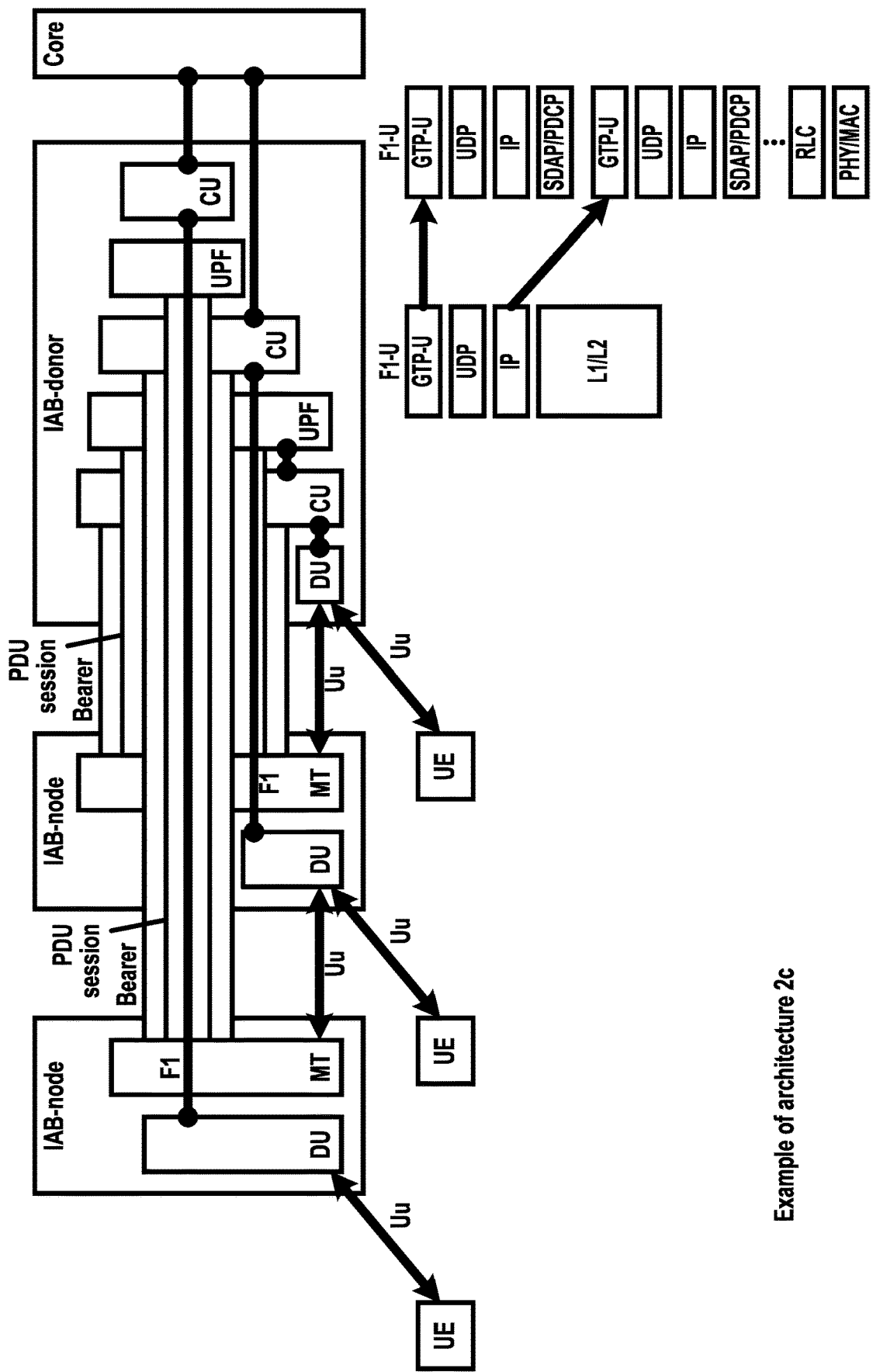
FIG. 22 is an example diagram of an aspect of an embodiment of the present disclosure.

In an example, as shown in FIG. 22, architecture 2c may leverage DU-CU split. An IAB-node may hold an MT which may sustain an RLC-channel with a DU on a parent IAB-node and/or IAB-donor. An IAB donor may hold a CU and/or a UPF for IAB-node's DU. An MT on an IAB-node may sustain a Uu link with a CU and/or a PDU session with a UPF on a donor (IAB-donor). Forwarding on intermediate nodes may be accomplished via tunneling. Forwarding across multiple hops may create a stack of nested tunnels. An IAB-node may obtain IP-connectivity to wireline backhaul network. A tunnel may include an SDAP/PDCP layer. IP-based interfaces (e.g. NG, Xn, F1, N4, etc.) may be carried over a forwarding plane. FIG. 22 shows a protocol stack example for NG-U (e.g. S1-U). An IAB node may connect to more than one upstream IAB-node and/or IAB-donor. For NSA operation with core network, an MT may be dual-connected with networks (e.g. gNB, eNB, RNC, core network). IAB-node's MT may sustain a PDN-connection with a L-GW residing on an IAB-donor.

In an example, an IAB node may follow the same initial access procedure as an UE (e.g. wireless device), comprising cell search, system information (SI) acquisition, and/or random access, to initially set up a connection to a parent IAB-node and/or a IAB-donor. An SSB/CSI-RS based RRM measurement may be supported for IAB-node discovery and/or measurement. In an example, an inter IAB-node discovery procedure subject to half-duplex constraint and/or multi-hop topologies may be supported, including how to avoid conflicting SSB configurations among IAB-nodes and/or feasibility of CSI-RS based IAB-node discovery. When considering a cell ID used by a given IAB-node, IAB-donor and IAB-node may share the same cell ID, and/or IAB-donor and IAB-node may maintain separate cell IDs. Feasibility of sharing the same cell ID by IAB-donor and IAB-node may depend on IAB architectures. Mechanisms for multiplexing of RACH transmissions from UEs and RACH transmissions from IAB-nodes may be supported.

In an example, measurements on multiple backhaul links for link management and/or route selection may be supported. To support a half-duplex constraint in an IAB-node, IAB may support detection and/or measurement of candidate backhaul links (e.g. after initial access), which may utilize resources that may be orthogonal in time from those used by access UEs for cell detection and/or measurement. To support measurement, IAB may support at least one of: TDM of SSBs (e.g. depending on hop order, cell ID, etc.); SSB muting across IAB-nodes; multiplexing of SSBs for access UEs and IABs within a half-frame and/or across half-frames; additional IAB-node discovery signal which may be TDM with SSB transmissions (e.g. CSI-RS), use of off-raster SSBs; different transmission periodicity for backhaul link detection and/or measurement compared to the periodicity used by access UEs; and/or the like. Coordination mechanisms for different solutions may be supported, including mechanisms for coordination of reference signal (RS) transmission and/or measurement occasions for IAB-nodes. Enhancements of SMTC and/or CSI-RS configurations to support RRM measurement for IAB-nodes may be considered.

In an example, an IAB-node may support mechanisms for detecting/recovering from backhaul link failure. Enhancements to RLM RS and/or associated procedures for IAB may be supported.

In an example, mechanisms for route switching and/or transmission/reception on multiple backhaul links simultaneously (e.g. multi-TRP operation and/or intra-frequency dual connectivity) may be supported. Feasibility of those mechanisms may depend on IAB architectures.

In an example, downlink IAB node transmissions (e.g. transmissions on backhaul links from an IAB-node to child IAB-nodes served by the IAB-node and transmissions on access links from an IAB-node to UEs served by the IAB-node) may be scheduled by an IAB-node. In an example, uplink IAB transmission (e.g. transmissions on a backhaul link from an IAB-node to its parent IAB-node and/or IAB-donor) may be scheduled by a parent IAB-node or an IAB-donor.

In an example, IAB may support time division multiplexing (TDM), frequency division multiplexing (FDM), and/or space division multiplexing (SDM) between access and backhaul links at an IAB-node, e.g. subject to a half-duplex constraint. Mechanisms for TDM/FDM/SDM multiplexing of access/backhaul traffic across multiple hops may consider an IAB node half-duplex constraint. In an example, IAB may support mechanisms for orthogonal partitioning of time slots and/or frequency resources between access and backhaul links across one or multiple hops. IAB may provide utilization of different DL/UL slot configurations for access and backhaul links. IAB may support DL and/or UL power control enhancements and/or timing requirements to allow for intra-panel FDM and/or SDM of backhaul and access links. In an example, IAB may provide interference management including cross-link interference.

In an example, IAB may provide mechanisms for scheduling coordination, resource allocation, and/or route selection across IAB-nodes/IAB-donors and/or multiple backhaul hops. Semi-static (e.g. on the timescale of RRC signaling) may be supported for resource (e.g. frequency, time in terms of slot/slot format, etc.) coordination between IAB-nodes. In an example, IAB may support distributed and/or centralized resource coordination mechanisms. IAB may support various resource granularity of required signaling (e.g. TDD configuration pattern). IAB-nodes and/or IAB-donors may exchange information of L1 and/or L3 measurements. In an example, IAB-nodes and/or IAB-donors may exchange topology related information (e.g. hop order) based on the backhaul link physical layer design. IAB may support resource (e.g. frequency, time in terms of slot/slot format, etc.) coordination which may be faster than semi-static coordination.

In an example, over-the-air (OTA) synchronization may be configured for IAB. In an example, IAB may support mechanism to adjust timing alignment of IAB-nodes. IAB may support detection and management of timing misalignment (e.g. depending on the number of hops). In an example, IAB may implement mechanisms for timing alignment across multi-hop IAB networks. IAB may support TA-based synchronization between IAB-nodes, including across multiple backhaul hops. In an example, IAB may support various cases of transmission timing alignment across IAB-nodes and/or IAB-donors: DL transmission timing alignment across IAB-nodes and/or IAB-donors; DL and UL transmission timing aligned within an IAB-node; DL and UL reception timing aligned within an IAB-node; timing alignment within an IAB-node when transmitting DL and UL and receiving DL and UL; DL transmission timing alignment across IAB-nodes and/or IAB-donors for access link; and/or timing alignment within an IAB-node when transmitting DL and UL and receiving DL and UL for backhaul link timing in different time slots.

In an example, levels of timing alignment between IAB-nodes/IAB-donors and/or within an IAB-node may comprise slot-level alignment, symbol-level alignment, and/or no alignment. IAB implementation for TDM/FDM/SDM multiplexing of access and backhaul links, cross-link interference, and/or access UEs may be supported.

In an example, IAB may control cross-link interference (CLI) on access and backhaul links (including across multiple hops) by providing interference measurement and management mechanisms.

In an example, IAB CLI mitigation techniques may support advanced receivers and transmitter coordination. CLI mitigation techniques may support interference mitigation mechanisms for inter IAB-node interference scenarios, for example: victim IAB-node is receiving in DL via its MT, interfering IAB-node is transmitting in UL via its MT; victim IAB-node is receiving in DL via its MT, interfering IAB-node is transmitting in DL via its DU; victim IAB-node is receiving in UL via its DU, interfering IAB-node is transmitting in UL via its MT; and/or victim IAB-node is receiving in UL via its DU, interfering IAB-node is transmitting in DL via its DU. IAB may implement mechanisms to resolve interference experienced at the IAB-node in case of FDM/SDM reception between access and backhaul links at an IAB-node. In an example, IAB may support CLI measurements, e.g. short-term/long term measurements, and/or multiple-antenna and beamforming based measurements, and may support CLI mitigation in IAB-nodes and/or IAB-donors.

IAB may support wireless backhaul links with high spectral efficiency. In an example, IAB may support 1024QAM for the backhaul link.

In an example, UE may establish RLC channels to a DU on UE's access IAB node. RLC-channels may be extended via a modified form of F1-U, referred to as F1*-U, between UE's access DU and an IAB donor. Information embedded in F1*-U may be carried over RLC-channels across backhaul links. Transport of F1*-U over a wireless backhaul may be enabled by an adaptation layer, which may be integrated with the RLC channel. An IAB-donor (referred to as fronthaul) may use F1-U stack. An IAB-donor DU may relay between F1-U on a fronthaul and/or F1*-U on a wireless backhaul.

In an example of architecture 1a, information carried on an adaptation layer may support one or more functions of: identification of a UE-bearer for the PDU, routing across a wireless backhaul topology, QoS-enforcement by a scheduler on DL and UL on a wireless backhaul link, mapping of UE user-plane PDUs to backhaul RLC channels, and/or the like.

In an example of architecture 1b, information carried on the adaptation layer may support one or more functions of: routing across a wireless backhaul topology, QoS-enforcement by a scheduler on DL and UL on a wireless backhaul link, mapping of UE user-plane PDUs to backhaul RLC channels, and/or the like.

In an example, information to be carried on an adaptation layer header may comprise one or more of: UE-bearer-specific Id, UE-specific Id, Route Id, IAB-node, IAB-donor address, QoS information, and/or the like.

In an example, information on an adaptation layer may be processed to support adaptation layer functions on an on-path IAB-node (e.g. hop-by-hop) and/or on UE's access-IAB-node and an IAB-donor (e.g. end-to-end).

Figure 23:
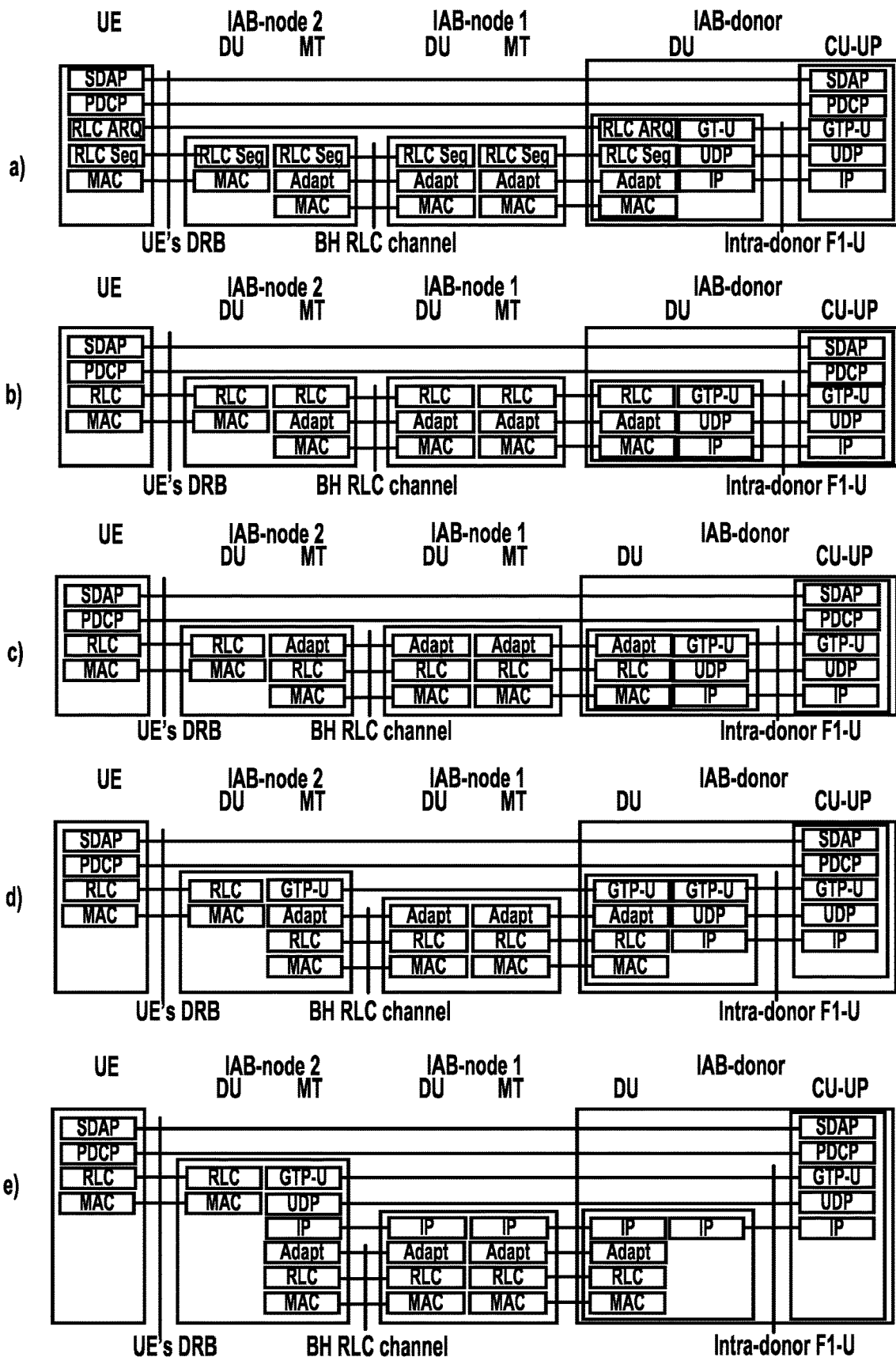
FIG. 23 is an example diagram of an aspect of an embodiment of the present disclosure.

In an example, an adaptation layer may be integrated with MAC layer or above MAC layer, as shown in FIG. 23 (e.g. a, b). In an example, an adaptation layer may be integrated with above RLC layer, as shown in FIG. 23 (e.g. c, d, c) and/or FIG. 24.

Figure 24:
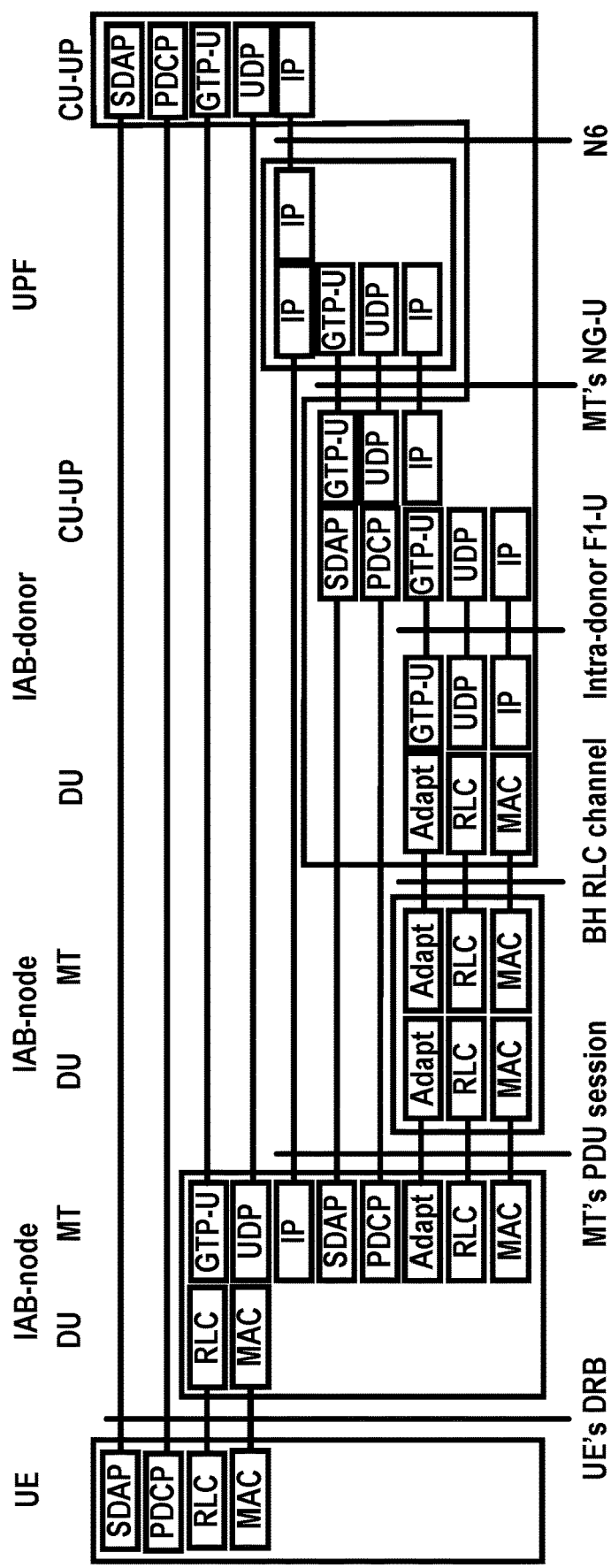
FIG. 24 is an example diagram of an aspect of an embodiment of the present disclosure.

In an example, FIG. 23 and/or FIG. 24 show example protocol stacks. While RLC channels serving for backhauling include an adaptation layer, an adaptation layer may be included in IAB-node access links.

In an example, an adaptation layer may comprise sublayers. A GTP-U header may become a part of an adaptation layer. In an example, a GTP-U header may be carried on top of an adaptation layer to carry end-to-end association between an IAB-node DU and a CU (e.g. as shown in FIG. 23d).

In an example, an IP header may be part of an adaptation layer and/or carried on top of an adaptation layer (e.g. as shown in FIG. 23c). In an example, an IAB-donor DU may hold an IP routing function to extend an IP-routing plane of a fronthaul to an IP-layer carried by adapt on a wireless backhaul. This may allow native F1-U to be established end-to-end, e.g. between IAB-node DUs and IAB-donor CU-UP. An IAB-node may hold an IP-address, which may be routable from a fronthaul via an IAB-donor DU. IAB-nodes' IP addresses may be used for routing on a wireless backhaul. An IP-layer on top of adapt may not represent a PDU session. MT's first hop router on an IP-layer may not hold a UPF.

In an example, an above-RLC adaptation layer may support hop-by-hop ARQ. An above-MAC adaptation layer may support both hop-by-hop and end-to-end ARQ. In an example, both adaptation layer placements may support aggregated routing, e.g. by inserting an IAB-node address into an adaptation header. In an example, both adaptation layer placements may support per-UE-bearer QoS for a large number of UE-bearers. In an example, for above-RLC adaptation layer, an LCID space may be enhanced since a UE-bearer may be mapped to an independent logical channel. In an example, for above-MAC adaptation layer, UE-bearer-related info may be carried on an adaptation header. In an example, both adaptation layer placements may support aggregated QoS handling e.g. by inserting an aggregated QoS Id into an adaptation header. In an example, aggregated QoS handling may reduce the number of queues. An aggregated QoS handling may be independent on where an adaptation layer is placed. In an example, for both adaptation layer placements, aggregation of routing and/or QoS handling may allow proactive configuration of intermediate on-path IAB-nodes, i.e. configuration may be independent of UE-bearer establishment/release. In an example, for both adaptation layer placements, RLC ARQ may be pre-processed on TX side.

In an example, for RLC AM, ARQ may be conducted hop-by-hop along access and backhaul links. ARQ may be supported end-to-end between UE and IAB-donor. RLC segmentation may be a just-in-time process, and/or it may be conducted in a hop-by-hop manner.

A type of multi-hop RLC ARQ and adaptation-layer placement may have interdependence: for end-to-end ARQ, adaptation layer may be integrated with MAC layer or placed above MAC layer; and/or hop-by-hop ARQ may or may not have interdependence.

In an example, different IAB architecture options may have impact on scheduling and/or QoS in downlink and/or uplink directions. In an example, adaptation layer may be placed above an RLC and/or above a MAC.

In an example, control plane (CP) signaling across wireless backhaul-link may use the same routing and/or QoS enforcement mechanisms as for user plane (UP) traffic. Priorities and/or QoS requirements of CP signaling may be different from UP traffic.

In an example, signaling between an MT on an IAB-node and a central unit control plan (CU-CP) on an IAB-donor may use RRC protocol. Signaling between DU on an IAB-node and a CU-CP on an IAB-donor may use an F1-AP protocol. IAB specific enhancements to RRC and F1-AP may be supported.

In an example, RRC and F1-AP connections may be secured over wireless backhaul links. An RRC connection may have at least the same level of protection on a wireless backhaul link as on an access link. In an example, an F1-AP connection may have at least the same level of protection on a wireless backhaul link as an RRC connection. In an example, the same level of protection for F1-AP as for RRC may be supported.

In an example, for CP signaling protection: PDCP may be used to protect RRC; and/or PDCP may be employed to protect F1-AP over a wireless backhaul. CP signaling protection based on using NDS may be supported.

In an example of architecture 1a, UE's and/or MT's UP and/or RRC traffic may be protected via PDCP over a wireless backhaul. A CP protection mechanism may be defined to protect F1-AP traffic over a wireless backhaul.

Figure 25:
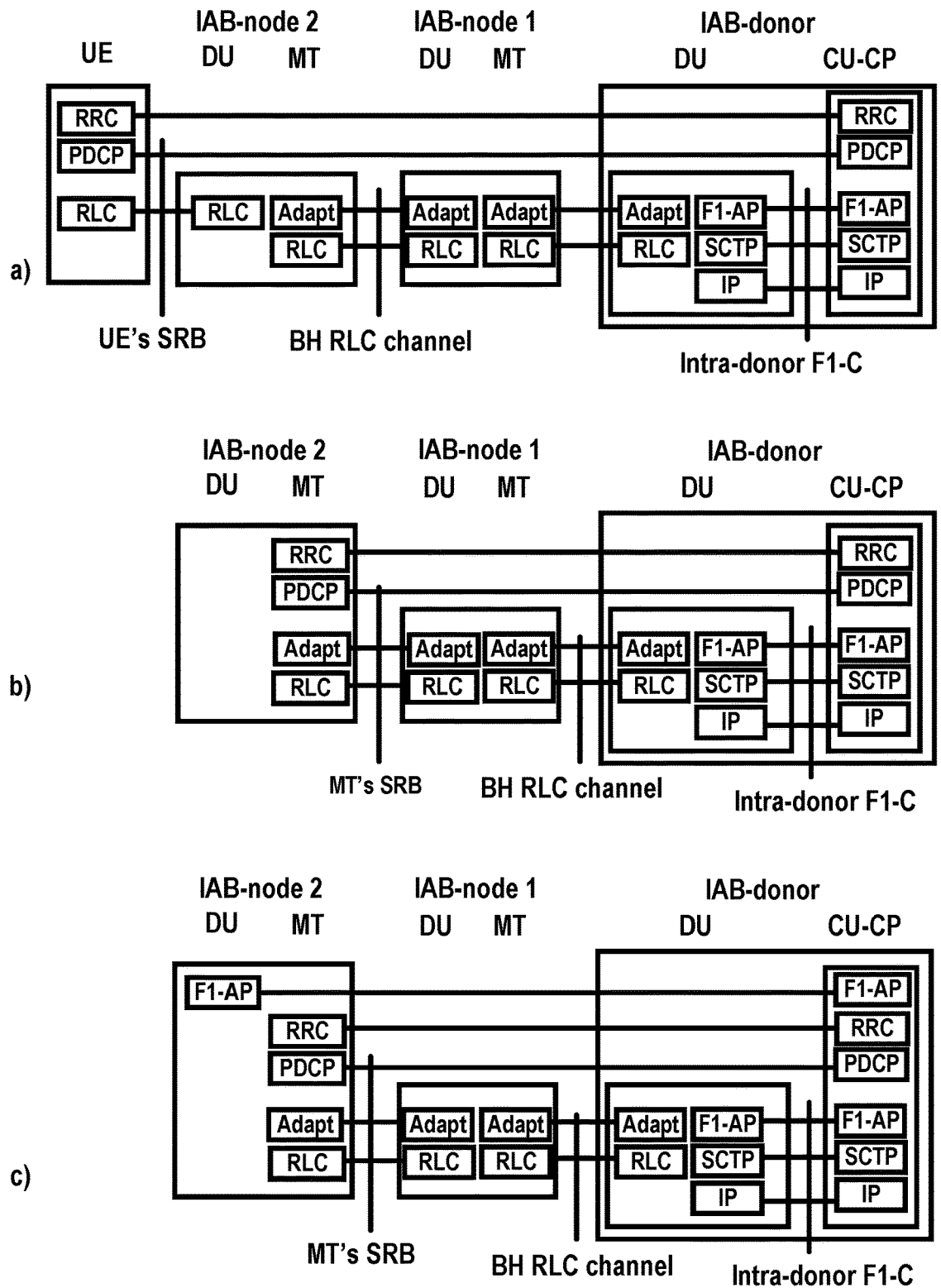
FIG. 25 is an example diagram of an aspect of an embodiment of the present disclosure.

In an example, for alternative 1 of architecture 1a, FIG. 25 shows protocol stacks for UE's RRC, MT's RRC, and/or DU's F1-AP. In an example, an adaptation layer may be placed on top of RLC. On IAB-node's access link, an adaptation layer may or may not be included. In an example of alternative 1 of architecture 1a, UE's and/or MT's RRC may be carried over SRB. On UE's and/or MT's access link, SRB may use an RLC-channel. On wireless backhaul links, SRB's PDCP layer may be carried over RLC-channels with adaptation layer. An adaptation layer placement in an RLC channel may be the same for C-plane as for U-plane. Information carried on an adaptation layer may be different for signaling radio bearer (SRB) than for data radio bearer (DRB). DU's F1-AP may be encapsulated in RRC of a collocated MT. F1-AP may be protected by PDCP of an underlying SRB. An IAB-donor may use native F1-C stack.

Figure 26:
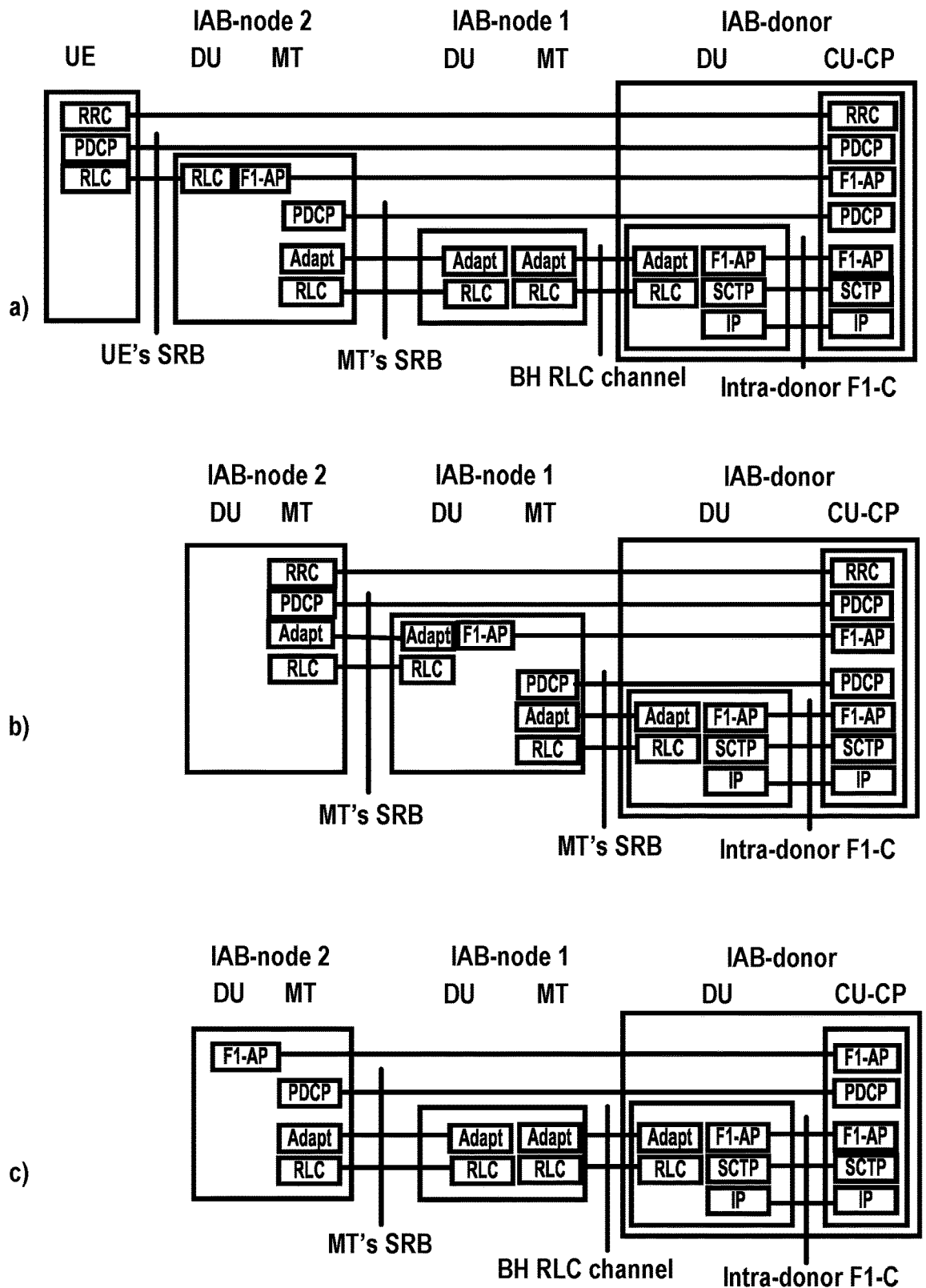
FIG. 26 is an example diagram of an aspect of an embodiment of the present disclosure.

In an example, for alternative 2 of architecture 1a, FIG. 26 shows protocol stacks for UE's RRC, MT's RRC, and/or DU's F1-AP. In an example, an adaptation layer may reside on top of RLC. On IAB-node's access link, an adaptation layer may or may not be included. In an example of alternative 2 of architecture 1a, UE's and/or MT's RRC may be carried over SRB. On UE's and/or MT's access link, an SRB may use an RLC-channel. On a wireless backhaul link, PDCP of RRC's SRB may be encapsulated into F1-AP. DU's F1-AP may carried over an SRB of a collocated MT. F1-AP may be protected by this SRB's PDCP. On wireless backhaul links, PDCP of F1-AP's SRB may be carried over RLC-channels with adaptation layer. An adaptation layer placement in an RLC channel may be the same for C-plane as for U-plane. Information carried on an adaptation layer may be different for SRB than for DRB. An IAB-donor may use native F1-C stack.

Figure 27:
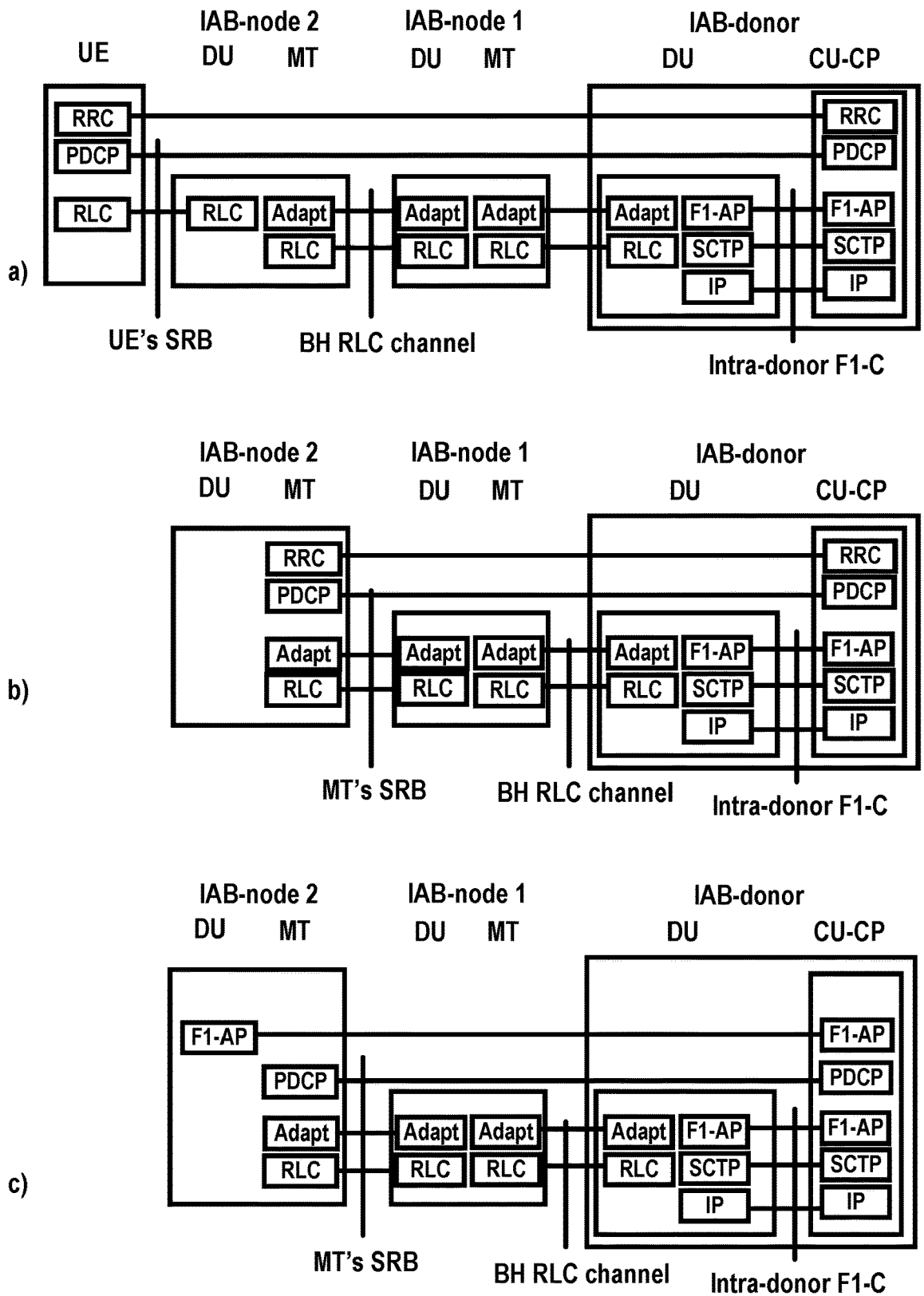
FIG. 27 is an example diagram of an aspect of an embodiment of the present disclosure.

In an example, for alternative 3 of architecture 1a, FIG. 27 shows protocol stacks for UE's RRC, MT's RRC, and/or DU's F1-AP. In an example, an adaptation layer may reside on top of RLC. On IAB-node's access link, an adaptation layer may or may not be included. In an example of alternative 3 of architecture 1a, UE's and/or the MT's RRC may be carried over SRB. On UE's and/or MT's access link, RRC's SRB may use an RLC-channel. On wireless backhaul links, SRB's PDCP layer may be carried over RLC-channels with adaptation layer. An adaptation layer placement in an RLC channel may be the same for C-plane as for U-plane. Information carried on an adaptation layer may be different for SRB than for DRB. DU's F1-AP may be carried over an SRB of a collocated MT. F1-AP may be protected by SRB's PDCP. On wireless backhaul links, PDCP of an SRB may be carried over RLC-channels with adaptation layer. An IAB-donor may use native F1-C stack.

Figure 28:
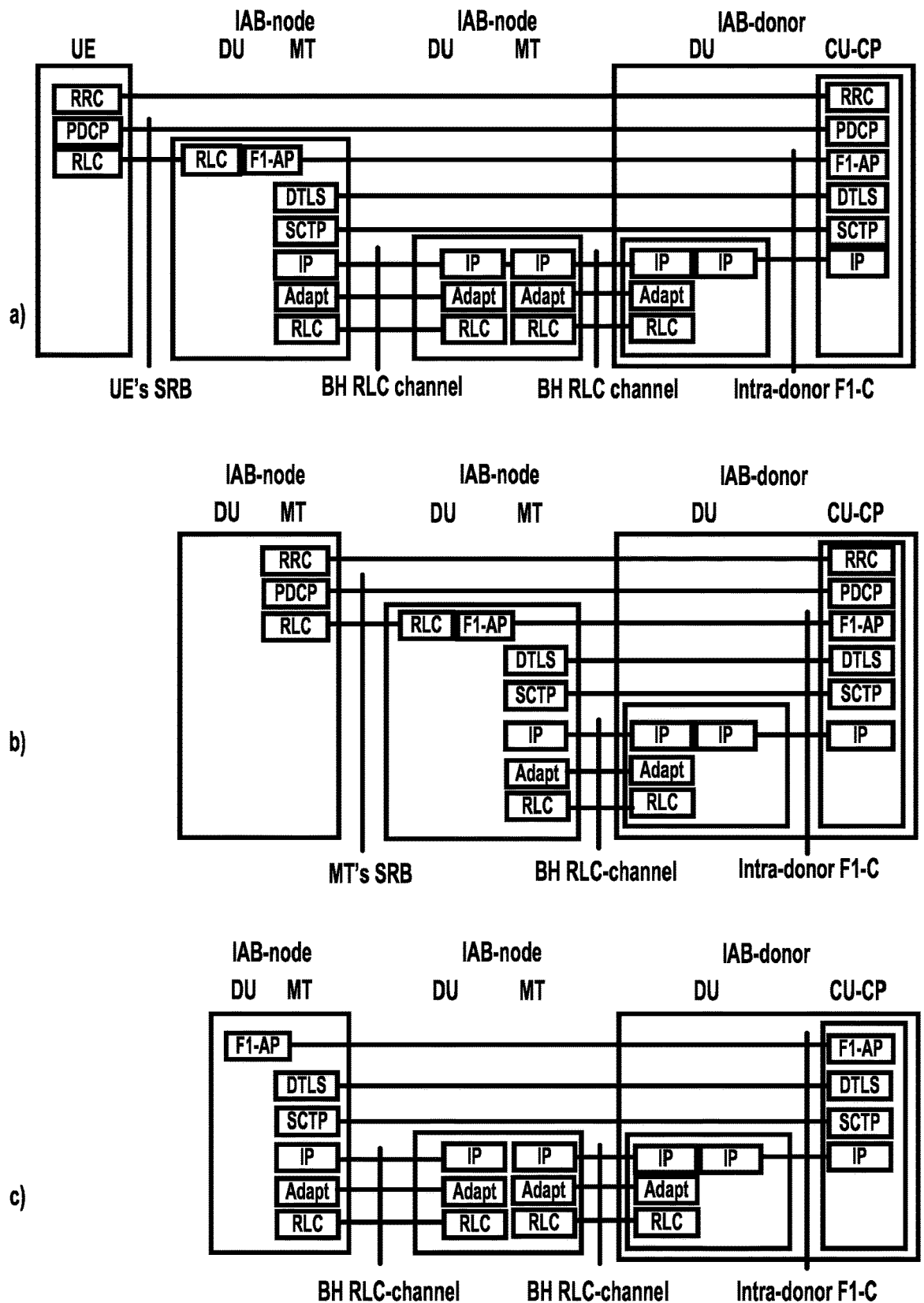
FIG. 28 is an example diagram of an aspect of an embodiment of the present disclosure.

In an example, for alternative 4 of architecture 1a, FIG. 28 shows protocol stacks for UE's RRC, MT's RRC, and/or DU's F1-AP. In an example, an adaptation layer may reside on top of RLC and/or may carry an IP-layer. In an example of alternative 4 of architecture 1a, an IP-layer carried by adapt may be connected to fronthaul's IP-plane through a routing function at an IAB-donor DU. On an IP-layer, IAB-nodes may hold IP-addresses, which may be routable from an IAB-donor CU-CP. An extended IP-plane may allow native F1-C to be used between IAB-node DU and IAB-donor CU-CP. Signaling traffic may be prioritized on an IP routing plane using DSCP markings. F1-C may be protected via NDS, e.g. via D-TLS. UE's and/or MT's RRC may use SRB, which may be carried over F1-C.

Figure 29:
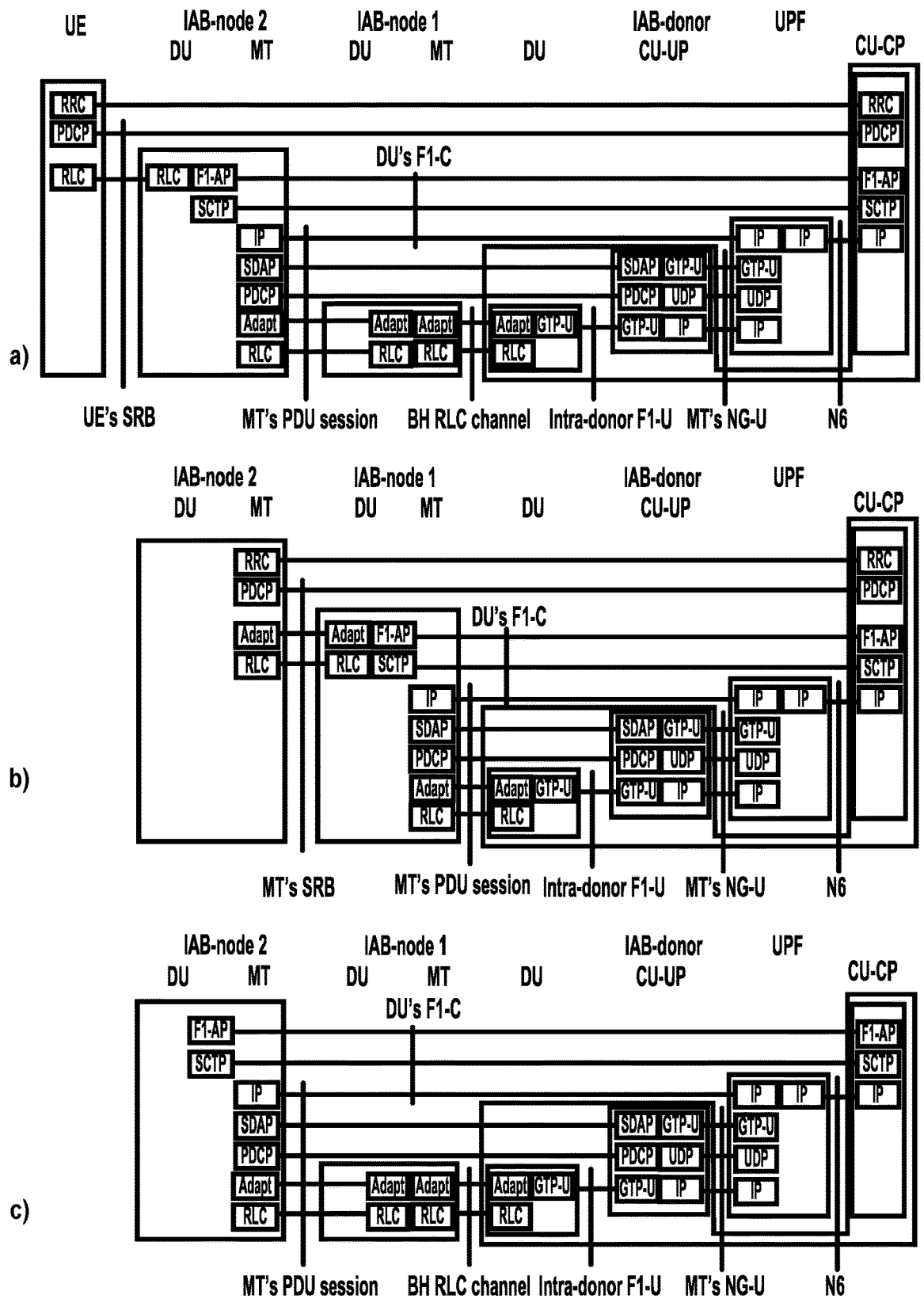
FIG. 29 is an example diagram of an aspect of an embodiment of the present disclosure.

In an example, for an alternative of architecture 1b, FIG. 29 shows protocol stacks for UE's RRC, MT's RRC, and/or DU's F1-AP. In an example, an adaptation layer carrying DRB's PDCP may reside on top of RLC. On IAB-node's access link, an adaptation layer may or may not be included. In an example of an alternative of architecture 1b, UE's and/or MT's RRC may be carried over SRB. On a wireless backhaul, SRB's PDCP may be carried over native F1-C. DUs on IAB-node and/or IAB-donor may use native F1-C stack. Over wireless backlinks, an IP-layer of native F1-C stack may be provided by a PDU session. A PDU-session may be established between an MT collocated with a DU and/or a UPF. A PDU session may be carried by a DRB between an MT and a CU-UP. Between CU-UP and UPF, a PDU-session may be carried via NG-U. IP transport between UPF and CU-CP may be provided by PDU-session's DN. IP transport may be protected. Protection of F1-C transport across a DN between UPF and CU-CP may be supported.

In an example, IAB topologies may comprise a spanning tree (ST) and/or a directed acyclic graph (DAG). Directionality of Uu-backhaul link, defined by uplink and downlink, may be aligned with the hierarchy of ST and/or DAG. For ST, an IAB-node may have one parent node, which may be an IAB-node and/or an IAB-donor. For ST, an IAB-node may be connected to one IAB-donor at a time, and/or one route may exist between IAB-node and IAB-donor. For DAG, an IAB-node may be multi-connected, i.e., an IAB-node may have links to multiple parent nodes. For DAG, an IAB-node may have multiple routes to a node, e.g. an IAB-donor. For DAG, an IAB-node may have redundant routes to a node via multiple parents. In an example, multi-connectivity (e.g. dual-connectivity) and/or route redundancy may be used. Redundant routes may be used concurrently, e.g., to achieve load balancing, reliability, etc.

Figure 30:
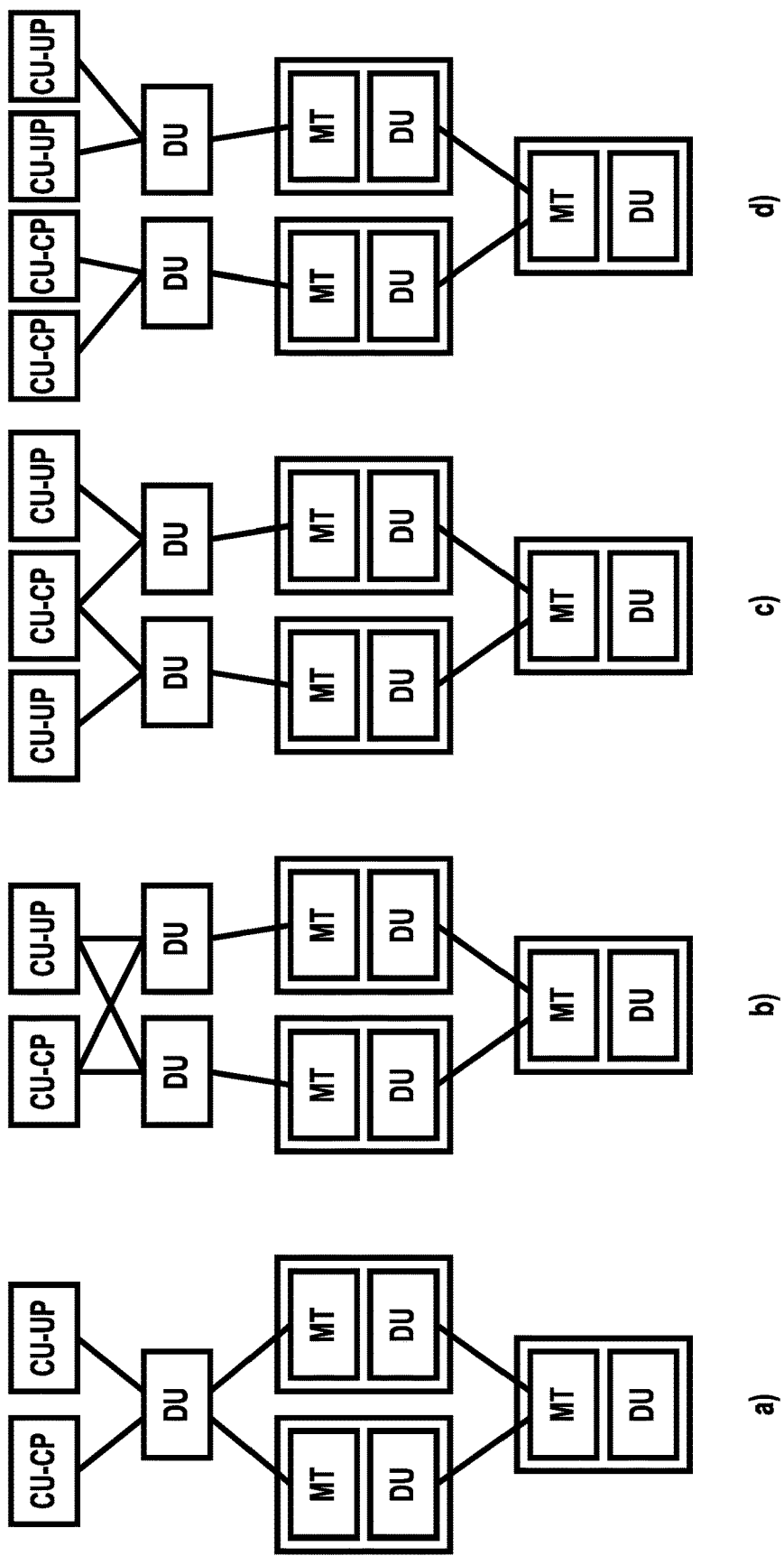
FIG. 30 is an example diagram of an aspect of an embodiment of the present disclosure.

In an example, for architecture group 1, as shown in FIG. 30, routes for an IAB-node may pertain to: the same IAB-donor DU, and the same IAB-donor CU-CP and CU-UP (FIG. 30a); different IAB-donor DUs, and same IAB-donor CU-CP and CU-UP (FIG. 30b); different IAB-donor DUs, different IAB-donor CU-UP, and same IAB-donor CU-CP (FIG. 30c); different IAB-donor DUs, CU-CP and CU-UP (FIG. 30d).

Figure 31:
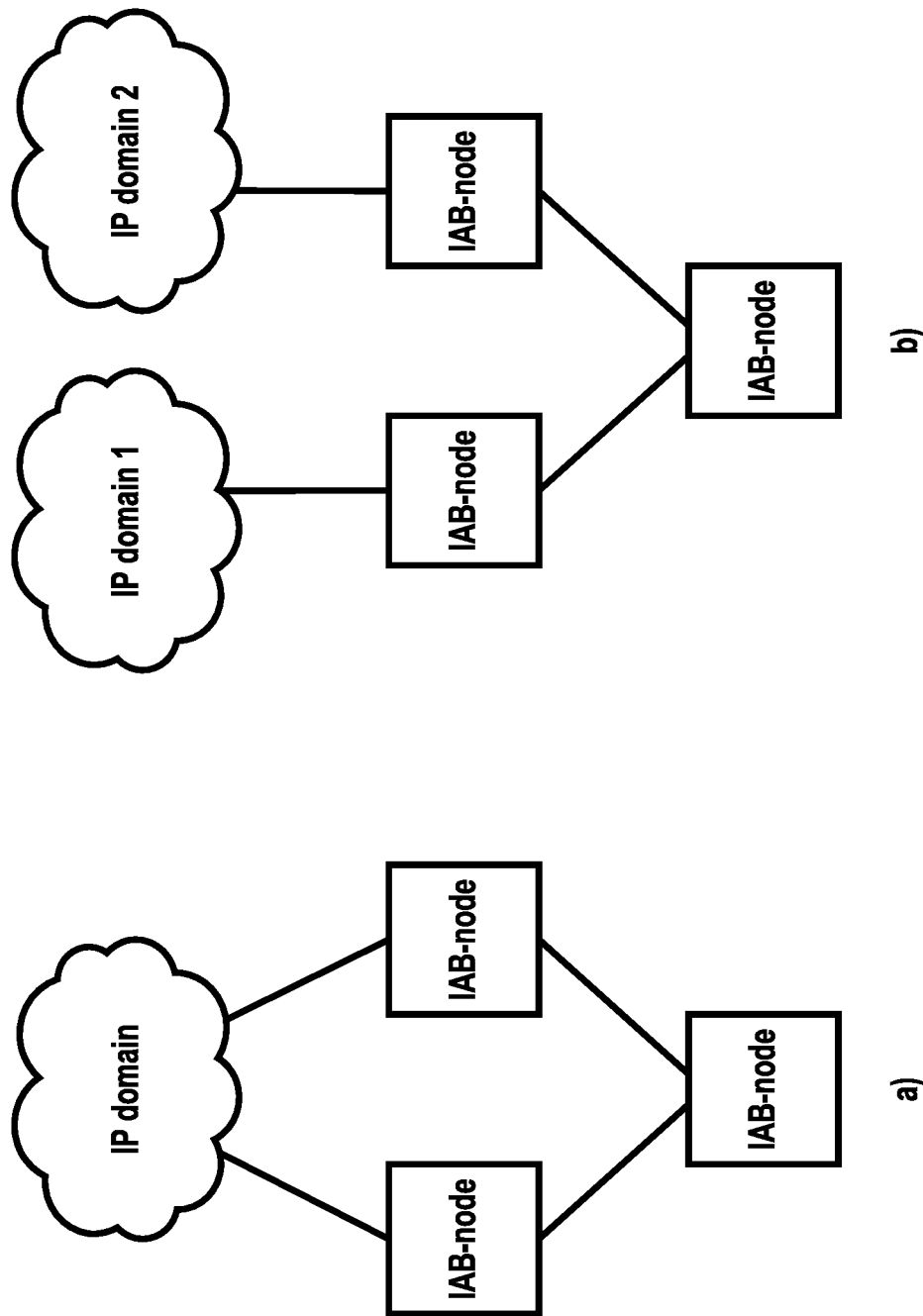
FIG. 31 is an example diagram of an aspect of an embodiment of the present disclosure.

In an example, for architecture group 2, as shown in FIG. 31, routes for an IAB-node may pertain to the same IP domain and/or different IP domains. For at least some of these topologies, IP address management and/or procedures for topology adaptation may be supported.

In an example, an IAB-node may authenticate with operator's network and/or may establish IP connectivity to reach OAM functionality for OAM configuration. The authentication phase may comprise discovery and/or selection of a serving node, which may be an IAB-donor and/or an IAB-node. An IAB-node may retrieve IAB information, e.g. from OAM and/or via RAN signaling such as OSI or RRC. The authentication phase may comprise setting up connectivity to RAN nodes and/or core network (CN). The authentication phase may involve an MT function on an IAB-node.

In an example, IAB-node's DU, gNB, and/or UPF may be set up together with interfaces to RAN-nodes and/or CN. The interface setting-up phase may be performed before an IAB node start serving UEs and/or before IAB-nodes connect. In an example, for architectures 1a and 1b, the interface setting-up phase may comprise setup of IAB-node's DU and/or F1-establishment to IAB-donor's CU-CP and/or CU-UP. In an example, for architecture 2a, the interface setting-up phase may comprise setup of IAB-node's gNB and/or UPF, and/or integration into PDU session forwarding layer across a wireless backhaul. In an example, the interface setting-up phase may comprise IAB-node's integration into topology and/or route management.

In an example, an IAB-node may provide service to UEs and/or to integrated IAB-nodes. UEs may or may not distinguish access to the IAB-node from access to gNBs (e.g. cNBs, RAN).

In an example, IAB architectures of IAB-donor DU and/or IAB-donor CU may be based on CU/DU architectures of a gNB (e.g. RAN). Modifications to the IAB-node DU that supports F1*-U over a wireless backhaul may be supported.

Figure 32:
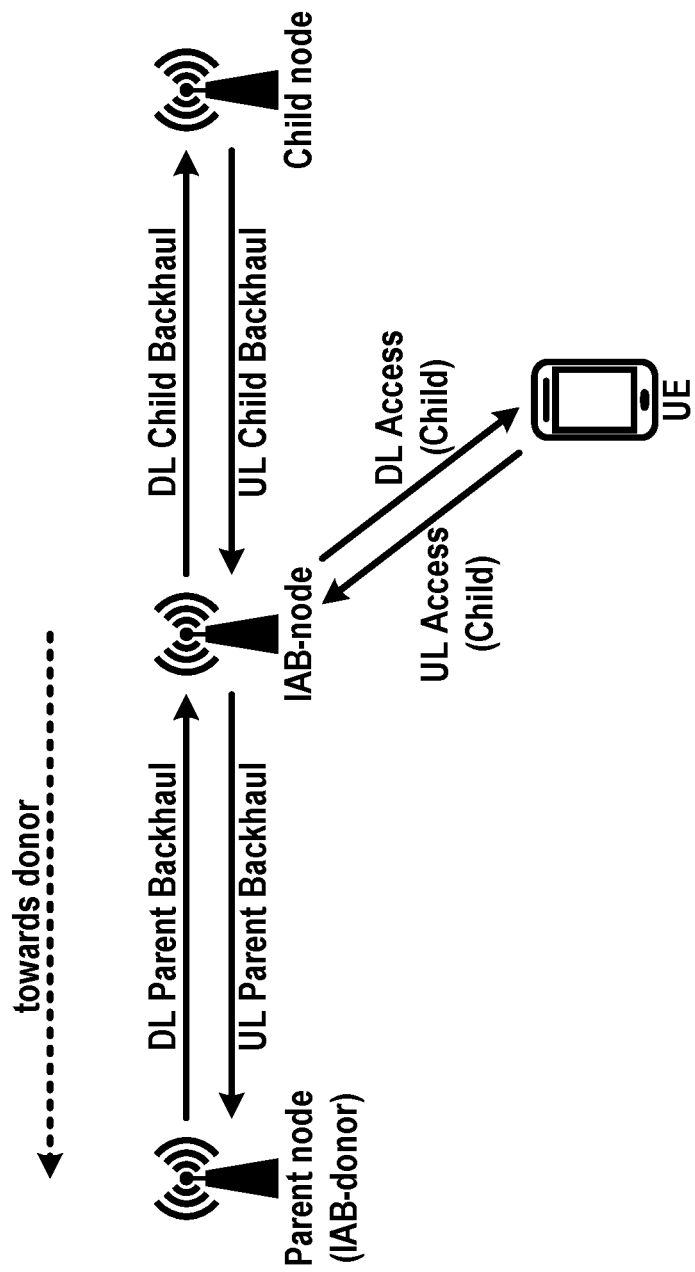
FIG. 32 is an example diagram of an aspect of an embodiment of the present disclosure.

In an example, as shown in FIG. 32, an IAB-node has connections with a parent node, child node and/or a wireless device (e.g. UE). An IAB-node may be connected to IAB-donor (e.g. parent node of the IAB-node) via a downlink parent backhaul (e.g. F1 interface, NG interface, S1 interface, Uu interface, Xn interface) and/or an uplink parent backhaul (e.g. F1 interface, NG interface, S1 interface, Uu interface, Xn interface). An IAB-node may be connected to a child node of the IAB-node via a downlink child backhaul (e.g. F1 interface, NG interface, S1 interface, Uu interface, Xn interface) and/or an uplink child backhaul (e.g. F1 interface, NG interface, S1 interface, Uu interface, Xn interface). An IAB-node may be connected to a wireless device via a downlink access (e.g. Uu interface) and/or an uplink access (e.g. Uu interface).

From an IAB-node MT point-of-view, the following time-domain resources may be indicated for the parent link: Downlink time resource; Uplink time resource; Flexible time resource. From an IAB-node DU point-of-view, the child link may have the following types of time resources: Downlink time resource; Uplink time resource; Flexible time resource; Not available time resources (resources not to be used for communication on the DU child links).

Downlink/uplink flexible time-resource types of the DU child link may belong to one of two categories: Hard (The corresponding time resource is available for the DU child link); Soft (The availability of the corresponding time resource for the DU child link is explicitly and/or implicitly controlled by the parent node).

In TDM case, an IAB-node may be configured with IAB-node specific resources in time available for the links.

Mechanisms for scheduling coordination, resource allocation, and route selection across IAB-nodes/IAB-donors and multiple backhaul hops may implement the following aspects: Distributed or centralized coordination mechanisms; Resource granularity, adaptation period, and/or enhancements to existing mechanisms for the required signaling (e.g. slot or symbol-level or TDD configuration pattern) provided to the IAB-node; Explicit or implicit indication of the resources; Exchange of L1 and/or L3 measurements between IAB-nodes; Exchange of topology related information (e.g. hop order) considering the backhaul link physical layer design; Resource (frequency, time in terms of slot/slot format, etc.) coordination which may be faster than semi-static coordination and the indication of resources within the configuration which may be dynamically and flexibly used for different links (e.g., including need to consider the scheduling delay, IAB-node processing delays, or information required to be available for the use of flexible resources; Mechanisms to schedule flexible resources (e.g. GC-PDCCH)).

In order to support mechanisms for resource allocation for IAB-nodes, semi-static configuration may be supported for the configuration of IAB-node DU resources. Dynamic indication (L1 signaling) to an IAB-node of the availability of soft resources for an IAB-node DU may be supported.

For an IAB node, there may be two different types of links: parent backhaul link and child link. The child link may be further classified into child backhaul link and access link. When an IAB node switches from parent backhaul link to child link or the other way around, some switching gap (Tx→Rx or Rx-Tx) may be needed.

Based on a link type and/or direction of current slot and/or adjacent slot, there may be four cases as listed below: case A-a current slot is a parent backhaul DL slot and an adjacent slot is a child link DL slot; case B-a current slot is a parent backhaul DL slot and an adjacent slot is a child link UL slot; case C: a current slot is a parent backhaul UL slot and an adjacent slot is a child link UL slot; and/or case D: a current slot is a parent backhaul UL slot and an adjacent slot is a child link DL slot. In an example, DL Tx timing alignment may be assumed among IAB nodes. In an example, slot level and/or symbol level resource coordination between a parent link and a child link may be assumed.

In an example, a frame structure of a parent backhaul (BH) slot in terms of usable symbols including starting and/or ending symbols may be considered. In an example, slot level resource coordination may be assumed. When consecutive slots are configured for parent BH link or child link, a frame structure of consecutive slots may be same as a normal UE.

In an example, at least DL transmission timing alignment may be supported for both an access and backhaul link. In an example, physical HARQ indicator channel (PHICH) and/or a cell-specific reference signal (CRS) for a relay DL BH subframe may need to be transmitted in a first one or several OFDM symbols of an MBSFN subframe. eNB (e.g. gNB, IAB-donor) and/or relay node (RN) (e.g. IAB-node) may transmit PHICH and/or CRS in first several symbols of DL subframe. In an example, first two symbols may be occupied by an access link to convey PHICH, CRS, and/or PDCCH. Symbol #2 may be reserved as guard period for Tx-Rx switching. In an example, BH reception may start from symbol #3. Since a first symbol of next subframe may be occupied for transmission of access link, a RN may not receive a last symbol of current subframe. a starting and/or ending symbols may be configured by RRC layer.

In a relay UL BH subframe, a BH PUSCH may start from symbol #0, and/or may end with symbol #12. Because of a propagation delay and/or a power amplifier (PA) switching gap, a RN (e.g. IAB-node) may not receive in the last symbol of previous subframe, and/or may not transmit in the last symbol of current subframe. In an example, a cell specific SRS may be configured in a subframe, and/or UE and/or RN (e.g. IAB-node) may not use the last symbol of the subframe. In an example, a relay system (e.g. IAB system) the last symbol may leave punctured.

Figure 33:
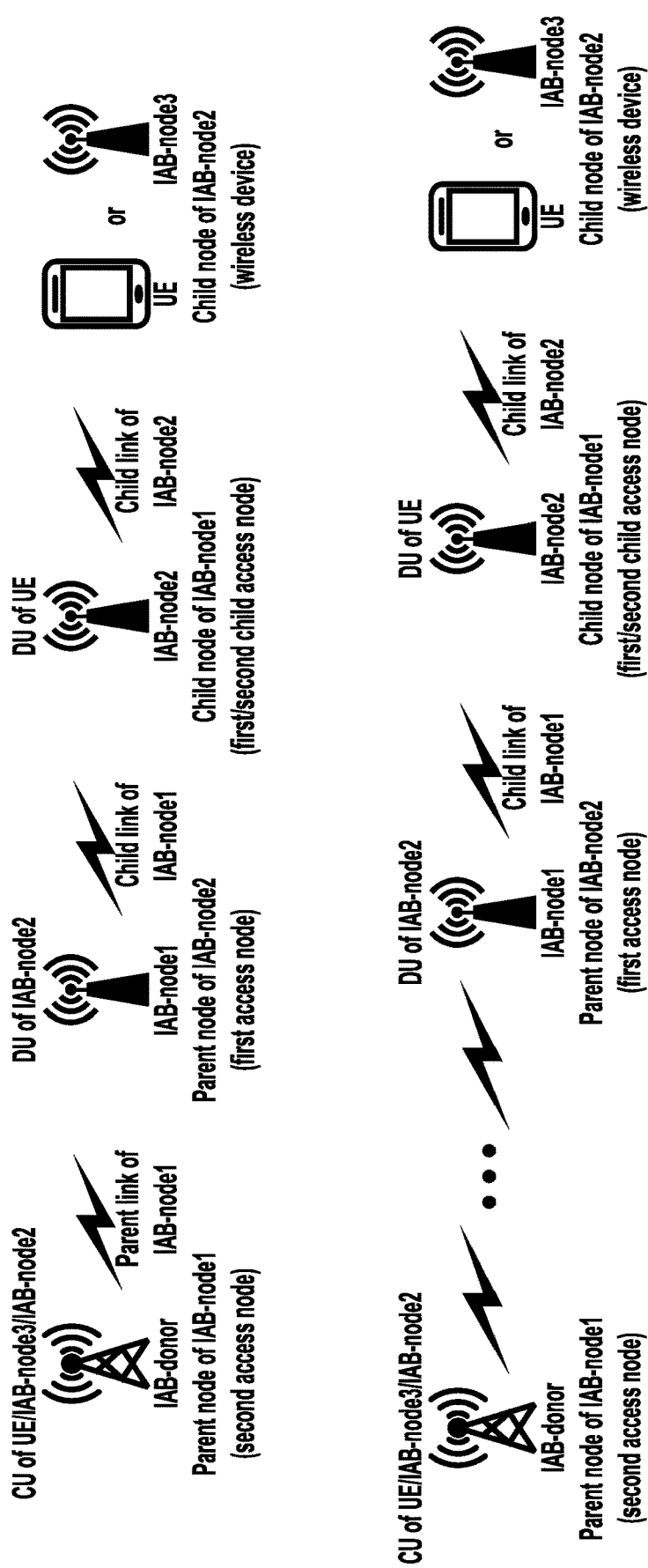
FIG. 33 is an example diagram of an aspect of an embodiment of the present disclosure.

In an example of IAB-node deployment, flexible resources (e.g., hard type and/or soft type) may be configured for integrated access and backhaul (IAB) nodes. A parent node (e.g., parent IAB-node) of IAB nodes (e.g., child IAB-nodes) may activate and/or deactivate flexible resources by transmitting an activation indication and/or a deactivation indication to the IAB-nodes (e.g., via a physical layer). In an example, as shown in FIG. 33, an RRC layer of wireless devices served by an IAB-node (e.g., base station distributed unit, gNB-DU) may locate at an IAB-donor (e.g., base station central unit, gNB-CU), which is different than a parent IAB-node of the IAB-node (e.g., the parent IAB-node is an intermediate node connecting the IAB-node and the IAB-donor). An IAB-donor providing an RRC layer of wireless devices served by IAB-nodes may have interference relation information among cells of the IAB-nodes serving the wireless devices. A parent IAB-node transparently forwarding (e.g., without interpreting/decoding) messages between an IAB-donor and IAB-nodes (e.g., child IAB-nodes of the parent IAB-node) and/or between an IAB-donor and wireless devices served by IAB-nodes (e.g., child IAB-nodes of the parent IAB-node) may have insufficient information to analyze interference relation among cells served by IAB-nodes (e.g., child IAB-nodes of the parent IAB-node). IAB-nodes (e.g., child IAB-nodes of a parent IAB-node) may have separate MAC and/or physical layer from each other and/or may not directly share resource scheduling information to each other. In an implementation of existing IAB systems, flexible resources may be activated for neighboring (e.g., adjacent) cells of multiple IAB-nodes (e.g., due to lack of interference relation information of a parent IAB-node among cells of child IAB-nodes) in an overlapping time duration (e.g., simultaneously, at the same time, etc.). In an implementation of existing technologies, neighboring cells of multiple IAB-nodes activated with the same flexible resources in an overlapping time duration may interfere to each other (e.g., due to lack of direct interference coordination scheduling among the multiple IAB-nodes). An implementation of existing technologies may increase inefficient radio resource utilization and increase packet transmission error rate. An implementation of existing technologies may decrease packet transmission throughput and decrease service quality of wireless devices.

Example embodiments may support a parent IAB-node to get interference relation information (e.g. cell neighboring information and/or simultaneous activation availability information for cells) among cells (e.g., bandwidth parts, beams, uplink/downlink) served by child IAB-nodes of the parent IAB-node, and activate/deactivate flexible resources for the child IAB-nodes based on the interference relation information. Example embodiments may support a parent IAB-node to activate/deactivate flexible resources for child IAB-nodes of the parent IAB-node to reduce inter-cell interference among the child IAB-nodes. Example embodiments may provide signaling between an IAB-donor and a parent IAB-node to support the parent IAB-node to get interference relation information among cells served by child IAB-nodes of the parent IAB-node.

Figure 34:
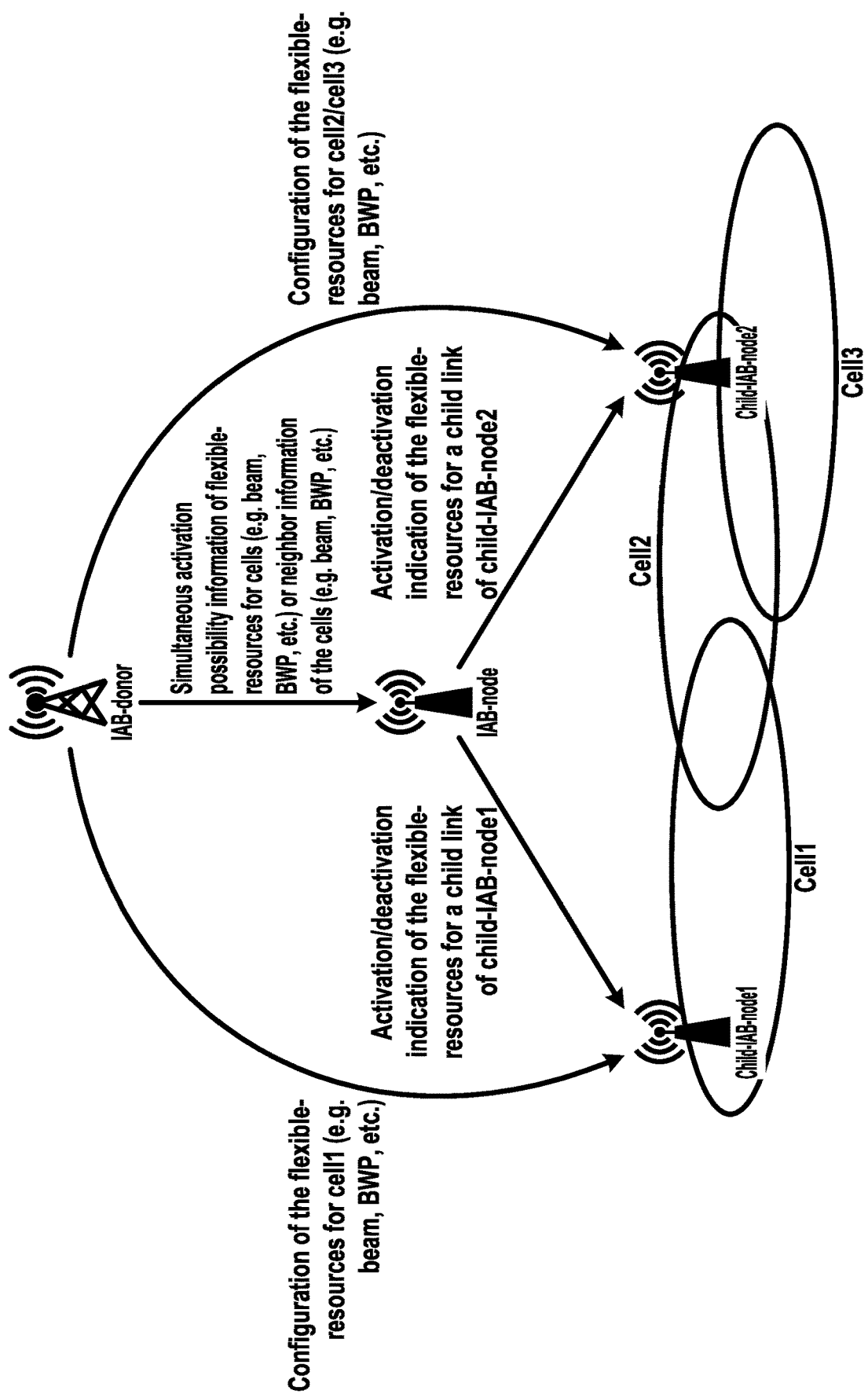
FIG. 34 is an example diagram of an aspect of an embodiment of the present disclosure.
Figure 35:
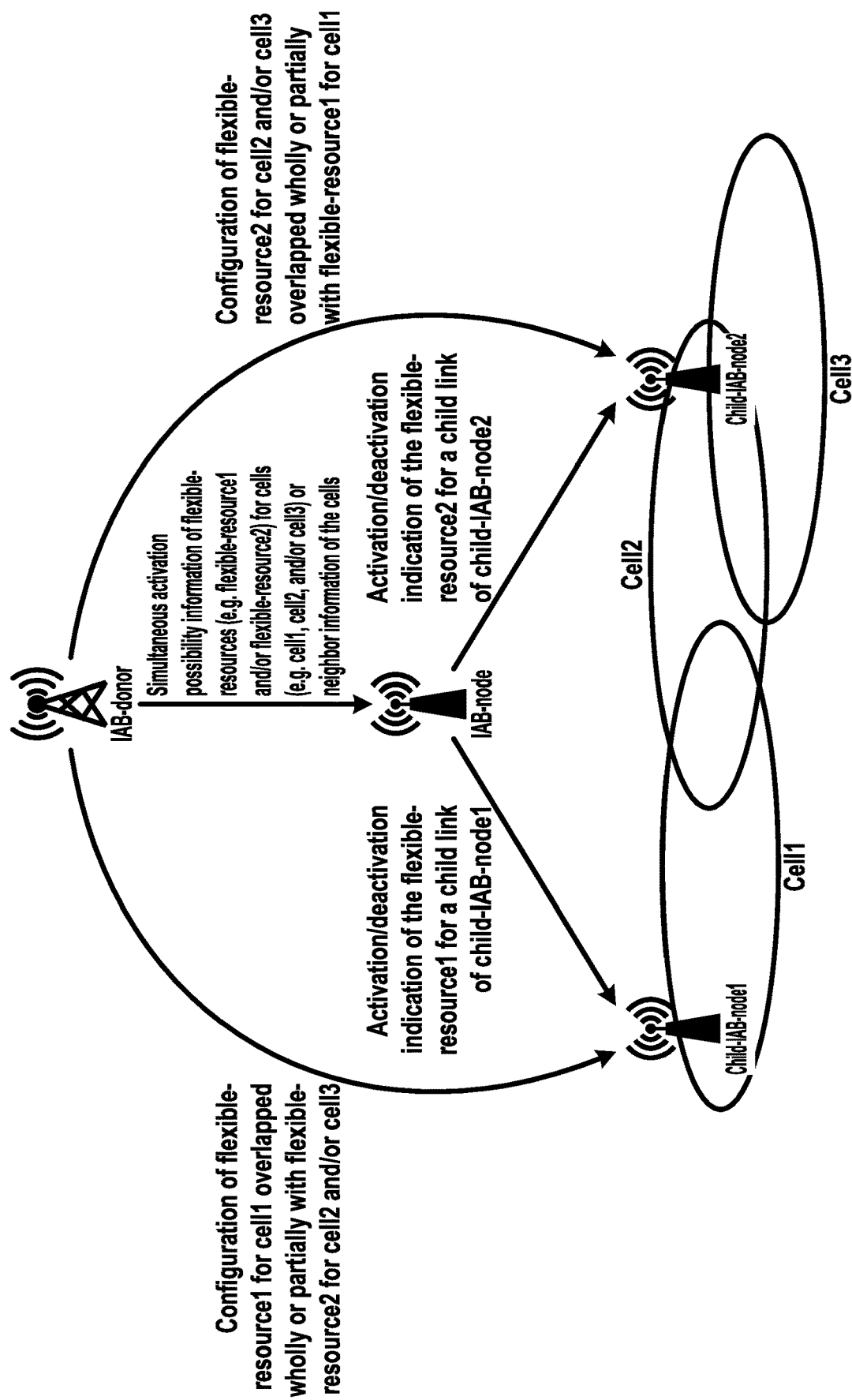
FIG. 35 is an example diagram of an aspect of an embodiment of the present disclosure.
Figure 36:
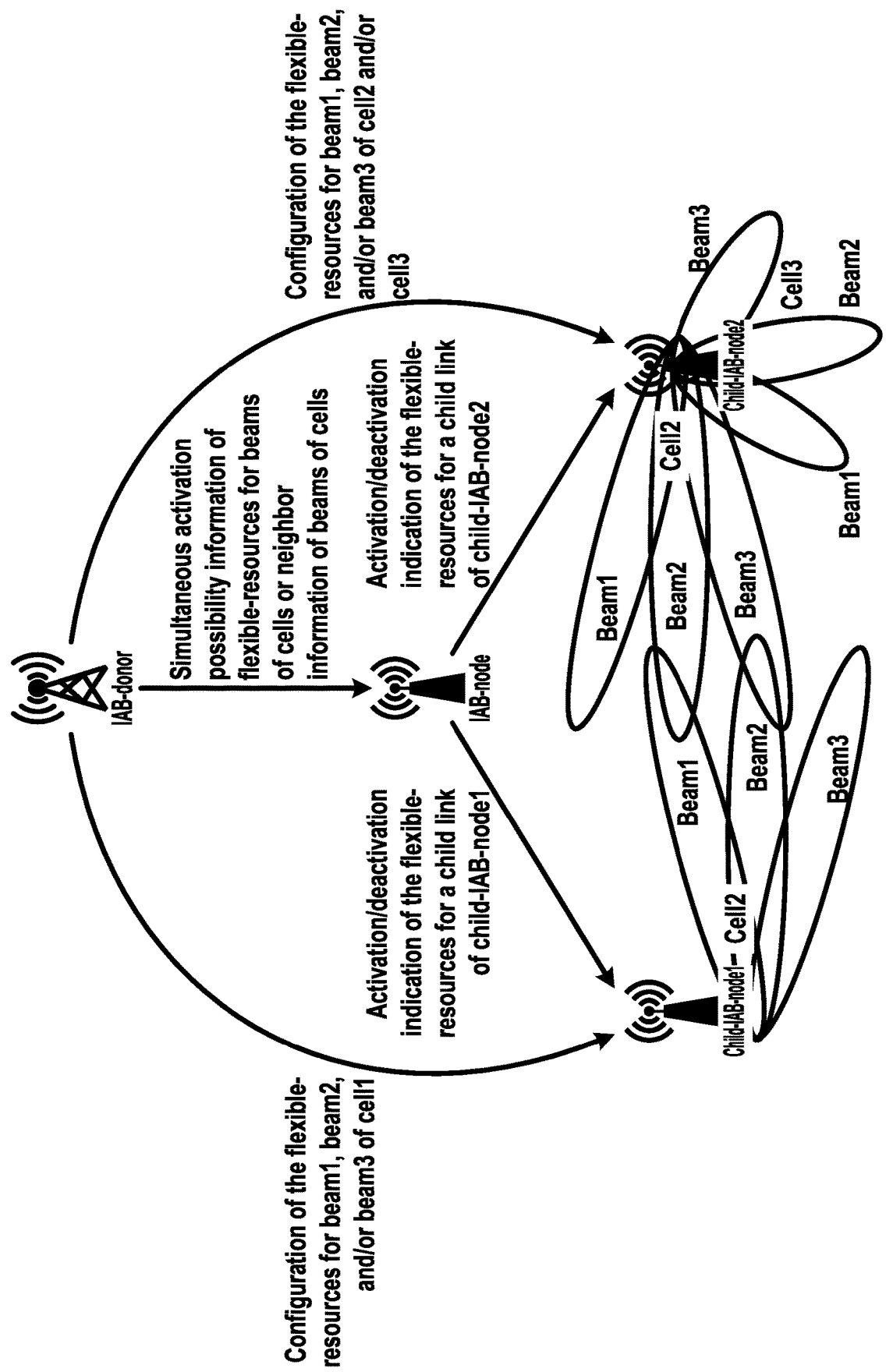
FIG. 36 is an example diagram of an aspect of an embodiment of the present disclosure.
Figure 37:
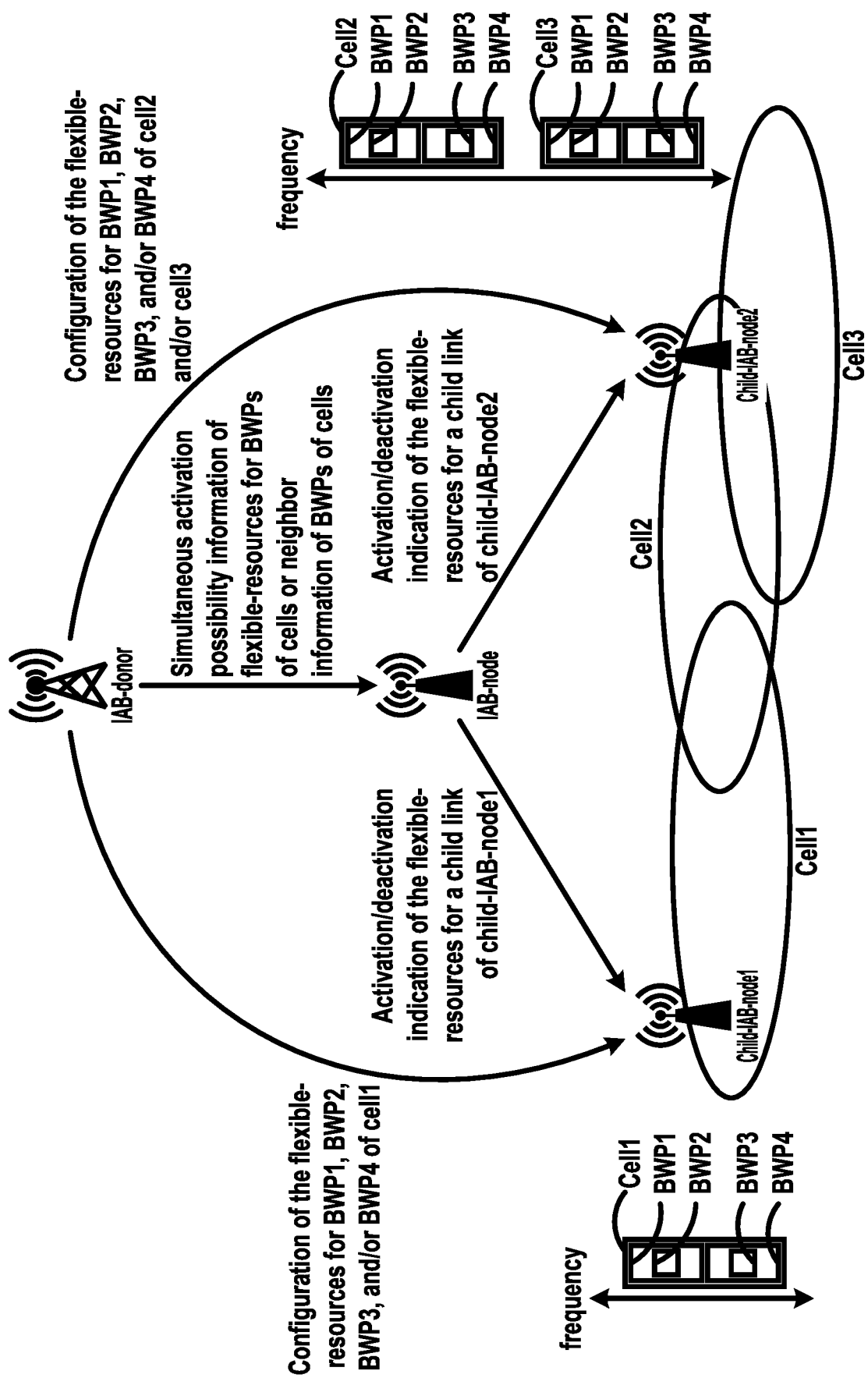
FIG. 37 is an example diagram of an aspect of an embodiment of the present disclosure.
Figure 38:
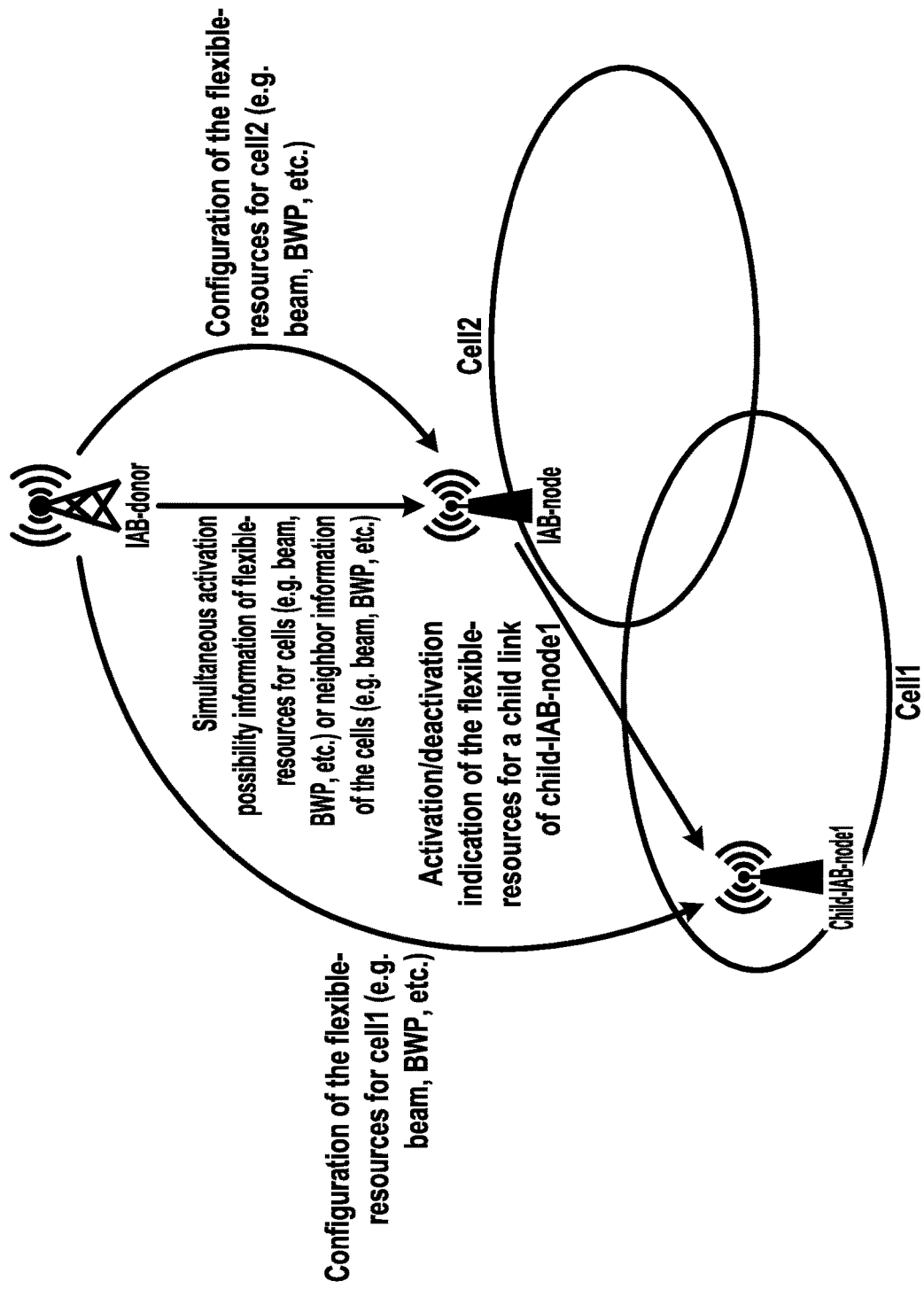
FIG. 38 is an example diagram of an aspect of an embodiment of the present disclosure.

In an example, as shown in FIG. 33, FIG. 34, and/or FIG. 35, a first access node (e.g., IAB-node, base station, gNB, gNB-DU for a wireless device/child IAB-node, eNB, mobile termination (MT), UE, a parent node (parent IAB-node) of a first child access node and/or a second child access node, a child node (child IAB-node) of a second access node, and/or the like) and a second access node (e.g., an IAB-donor/gNB-CU of the first access node, the first child access node, and/or the second child access node; a parent node (parent IAB-node) of the first access node; base station; gNB; eNB; and/or the like) may be directly or indirectly connected to each other (e.g. via one or more radio interfaces, F1 interface, Uu interface, RRC layer communication, parent link/backhaul of the first access node, one or more parent cells serving the first access node, and/or the like). The first access node may directly or indirectly serve the first child access node (e.g. first child IAB-node, IAB-node, child IAB-node of the first access node, child node of the first access node, MT, UE, gNB, gNB-DU for a wireless device served by the first child access node, eNB, and/or the like) and/or the second child access node (e.g. second child IAB-node, IAB-node, child IAB-node of the first access node, child node of the first access node, MT, UE, gNB, gNB-DU for a wireless device served by the second child access node, eNB, and/or the like). The first access node may serve the first child access node and/or the second child access node via a child link/backhaul of the first access node (e.g. one or more radio interfaces, F1 interface, Uu interface, RRC layer communication, adapt/PDCP layer communication protocol, RLC/MAC/physical layer communication protocol, one or more child cells served by the first access node, and/or the like).

In an example, the first access node may be a base station distributed unit (e.g. gNB-DU) for at least one of the first child access node and/or the second child access node. In an example, the second access node may be a base station central unit (e.g. gNB-CU) for at least one of the first access node, the first child access node, the second child access node, and/or a wireless device served by at least one of the first child access node and/or the second child access node. In an example, the first child access node and/or the second child access node may be a base station distributed unit for a wireless device served by at least one of the first child access node and/or the second child access node.

In an example, one or more child cells of the first access node may serve the first child access node, the second child access node, and/or one or more wireless devices (e.g., UE, IAB-node, MT). A cell serving the first child access node may or may not serve the second child access node. One or more first child cells (e.g. comprising a first cell) of the first child access node may serve at least wireless device (e.g., UE, IAB-node, MT). One or more second child cells (e.g. comprising a second cell) of the second child access node may serve at least wireless device (e.g., UE, IAB-node, MT). In an example, the one or more child cells of the first access node may or may not employ a same carrier (e.g., in-band, intra-carrier, same band, wholly or partially overlapping bandwidth) to a carrier employed by the one or more first child cells of the first child access node and/or the one or more second child cells of the second child access node. The one or more first child cells of the first child access node may or may not employ a same carrier (e.g., in-band, intra-carrier, same band, wholly or partially overlapping bandwidth) with a carrier employed by the one or more second child cells of the second child access node.

Figure 39:
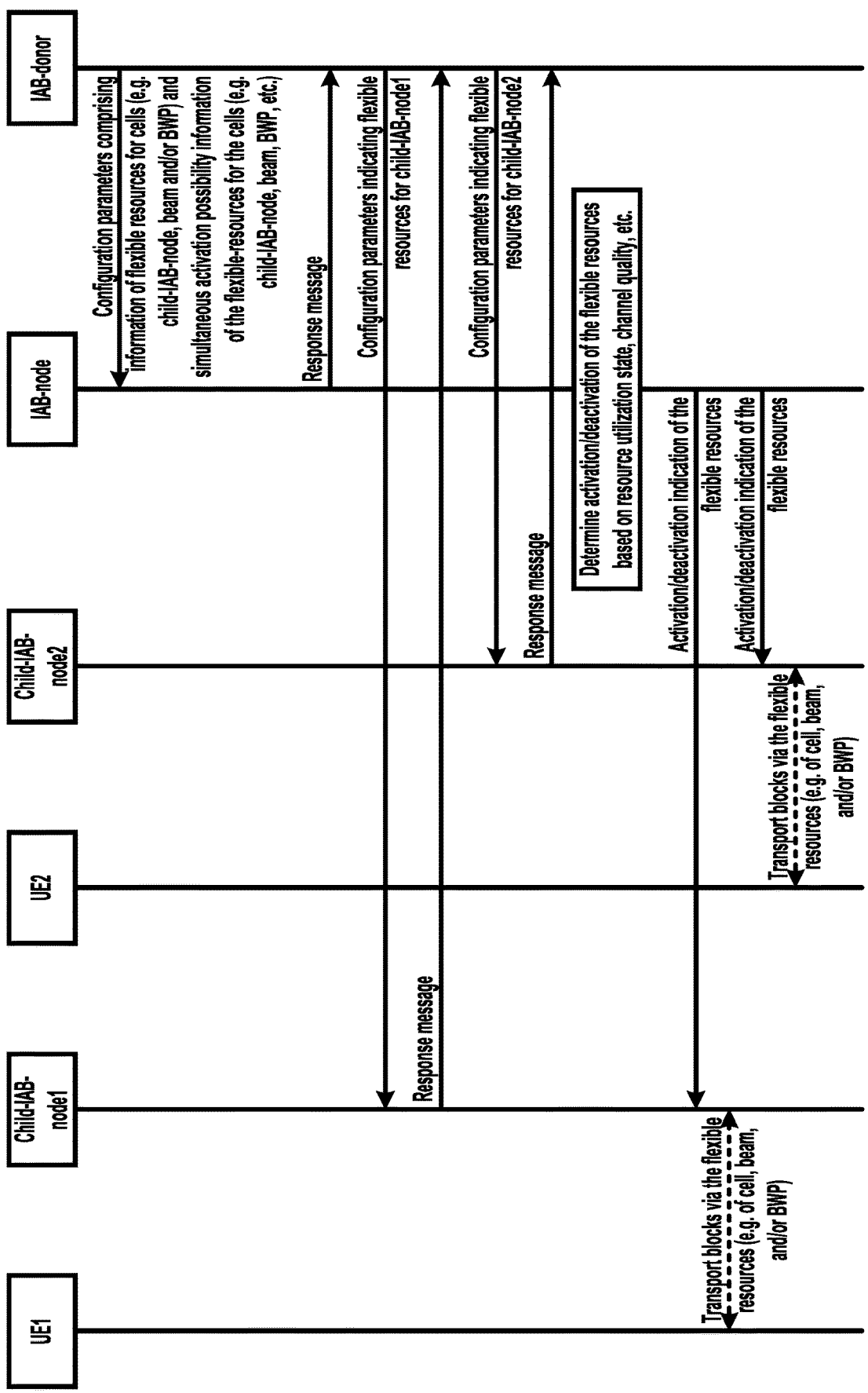
FIG. 39 is an example diagram of an aspect of an embodiment of the present disclosure.

In an example, as shown in FIG. 34, FIG. 35, FIG. 36, FIG. 37, FIG. 38, and/or FIG. 39, the first access node (e.g., IAB-node) may receive from the second access node (e.g., IAB-donor), at least one message comprising configuration parameters indicating whether flexible resources are allowed to be activated for the first cell (e.g. one of the one or more first child cells of the first child access node) and the second cell (e.g. one of the one or more second child cells of the second child access node) in an overlapping time duration (e.g., being activated simultaneously and/or at the same time). The first child access node (e.g. child IAB-node) of the first access node may serve the first cell. The second child access node (e.g. child IAB-node) of the first access node may serve the second cell. In an example the configuration parameters may further indicate whether the flexible resources are allowed to be activated for the first child access node and the second child access node in an overlapping time duration.

In an example, the at least one message may be transmitted via an F1 interface (e.g. Xn interface, X2 interface, N2 interface, S1 interface) between the first access node and the second access node. The at least one message may be transmitted via a Uu interface between the first access node and the second access node (and/or a parent node of the first access node). In an example, the at least one message may be at least one of an F1 interface message (e.g. Xn interface message, X2 interface message, N2 interface message, S1 interface message) and/or a radio resource control (RRC) message. In an example, the at least one message may comprise at least one of an F1 setup response message, a gNB-DU configuration update acknowledge message, a gNB-CU configuration update message, a gNB-DU resource coordination request message, a UE context setup request message, a UE context modification request message, a UE context modification confirm message, and/or the like. In an example, the at least one first message may comprise at least one of an RRC reconfiguration message, an RRC reestablishment message, an RRC setup message, an RRC resume message, at least one system information block, and/or the like.

In an example, the first access node may transmit, to the second access node, at least one response message in response to receiving the at least one message. The at least one response message may indicate configuration completion of the configuration parameters of the at least one message at the first access node (e.g., completion of applying the configuration para meter by the first access node). The at least one response message may be at least one of an F1 interface message (e.g. Xn interface message, X2 interface message, N2 interface message, S1 interface message) and/or a radio resource control message. In an example, the at least one response message may comprise at least one of a gNB-DU configuration update message, a gNB-CU configuration update acknowledge message, a gNB-DU resource coordination response message, a UE context setup response message, a UE context modification response message, a UE context modification required message, and/or the like. In an example, the at least one first message may comprise one or more RRC complete messages (e.g., RRC reconfiguration complete message, RRC reestablishment complete message, RRC setup complete message, RRC resume complete message, and/or the like). The at least one response message may further comprise at least one RRC acknowledge/response message. In an example, the at least one response message may comprise at least one of: an uplink RRC message, a relay node reconfiguration complete message, and/or the like. The at least one response message may indicate whether one or more elements (e.g. one or more of the radio resource control configuration parameters of the second cell) of the at least one response message are successfully configured by the first access node. The at least one response message may indicate whether the bearer is successfully established by the first access node.

In an example, the at least one message (e.g. received by the first access node from the second access node) may further comprise at least one of: a UE identifier (e.g., TMSI, C-RNTI, F1 UE identifier, NG UE identifier, IMSI) of the first access node/the first child access node/the second child access node, a cell identifier (e.g., physical cell identifier, PCI, global cell identifier, GCI, CGI) of the one or more child cells (e.g. and/or of the one or more first child cells, the one or more second child cells, the first cell, and/or the second cell), cell information (e.g., cell index, cell group configuration, radio link failure timers and constants, RLM in-sync/out-of-sync threshold, reconfiguration with sync comprising t304 value, RACH configuration parameters comprising a preamble index and/or RACH resources, carrier frequency information, bandwidth part configuration parameters, beam configuration parameters of SS beam and/or CSI-RS beam, transmission power configuration parameter comprising p-MAX/p-MgNB/p-SgNB, and/or the like) of the one or more child cells (e.g., and/or of the one or more first child cells, the one or more second child cells, the first cell, and/or the second cell), a bearer identifier of a bearer for the first access node (e.g., and/or for the first child access node, second child access node, one or more wireless devices), a logical channel identifier (index) of the bearer, a PDU session identifier of the bearer, a QoS flow identifier of the bearer, an IAB-node identifier of the first access node (e.g. and/or of the second access node, the first child access node, the second child access node), an IAB-donor identifier of the second access node, and/or the like.

In an example, radio resource control configuration parameters received by the first access node via the at least one message may indicate that the bearer (e.g. the logical channel) is for an ultra-reliable and low-latency communication (URLLC) service. In an example, the radio resource control configuration parameters may comprise QoS information of the bearer (e.g. the logical channel). The QoS information of the bearer may indicate that the bearer requires low latency and/or high reliability. The QoS information of the bearer may comprise a required latency (e.g. 1 ms), a required packet loss rate (e.g. 0.0001%), a required data throughput (e.g. 100 Mbps), a priority value (e.g. highest priority, priority 0), a required jitter level, and/or the like.

In an example, the at least one message may further comprise at least one of an rrc-transactionidentifier information element (IE), a radio resource configuration dedicated IE comprising one or more radio resource configuration parameters, measurement configuration parameters, mobility control information parameters, one or more NAS layer parameters, security parameters, antenna information parameters, secondary cell addition/modification parameters, secondary cell release parameters, WLAN configuration parameters, WLAN offloading configuration parameters, LWA configuration parameters, LWIP configuration parameters, RCLWI configuration parameters, sidelink configuration parameters, V2X configuration parameters, uplink transmission power configuration parameters (e.g. p-MAX, p-MeNB, p-SeNB), a power control mode information element, secondary cell group configuration parameters, and/or the like.

In an example, the configuration parameters of the at least one message may further comprise resource parameters of the flexible resources. The resource parameters of the flexible resources may comprise at least one of a time offset, a subframe index, a slot index, a time duration, a time period, a frequency offset, a subcarrier index, a bandwidth, a bandwidth part index of a bandwidth part for the flexible resources, a beam index of a beam for the flexible resources, and/or the like. The first access node may determine resource blocks of the flexible resources based on the resource parameters of the flexible resources. The first access node may determine beams and/or bandwidth part allowed (or not allowed) to activate the flexible resources based on the beam index and/or the bandwidth part index. The resource parameters of the flexible resources may further comprise at least one of an IAB-node identifier (e.g. gNB identifier, gNB-DU identifier, base station identifier, UE identifier, MT identifier) indicating an IAB-node, a cell identifier (e.g. physical cell identifier, global cell identifier, cell index) indicating a cell, and/or the like. The first access node may determine an access node (e.g., the first access node, the first child access node, the second child access node) allowed (or not allowed) to activate the flexible resources based on the IAB-node identifier. The first access node may determine a cell (e.g. the one or more child cells, the one or more first child cells, the one or more second child cells) allowed (or not allowed) to be activated with the flexible resources based on the cell identifier.

In an example, the configuration parameters of the at least one message may further comprise a resource index indicating/identifying the flexible resources. The first access node may transmit the resource index to activate the flexible resources for a child node (e.g., the first child access node, the second child access node).

In an example, the first access node may or may not employ the flexible resources for a serving cell (e.g. the one or more child cells serving at least one of the first child access node, the second child access node, and/or one or more wireless devices served by the first access node). In an example, the first access node may transmit/receive, to/from a wireless device (e.g., comprising the first child access node and/or the second child access node), downlink/uplink transport blocks via the flexible resources.

In an example, the configuration parameter may further indicate whether a group of cells/BWPs of cells/beams of cells (e.g., served by one or more IAB-nodes) are allowed or not allowed to be activated with the flexible resources in an overlapping time duration. In an example, the configuration parameters may further indicate at least one of: whether the flexible resources are allowed to be activated for a first bandwidth part (BWP) of the first cell and for a second BWP of the second cell in an overlapping time duration; whether the flexible resources are allowed to be activated for a first BWP of the first cell and for the second cell in an overlapping time duration; whether the flexible resources are allowed to be activated for the first cell and for a second BWP of the second cell in an overlapping time duration; whether the flexible resources are allowed to be activated for a first beam (e.g., SS beam, CSI-RS beam, etc.) of the first cell and for a second beam (e.g., SS beam, CSI-RS beam, etc.) of the second cell in an overlapping time duration; whether the flexible resources are allowed to be activated for a first beam (e.g., SS beam, CSI-RS beam, etc.) of the first cell and for the second cell in an overlapping time duration; and/or whether the flexible resources are allowed to be activated for the first cell and for a second beam (e.g., SS beam, CSI-RS beam, etc.) of the second cell in an overlapping time duration.

In an example, the configuration parameter may further indicate whether a group of cells/BWPs of cells/beams of cells (e.g., served by one or more IAB-nodes) are neighboring to each other (e.g., adjacent geographically to each other, at location where interfering to each other, etc.). In an example, the configuration parameters may further indicate that the first cell and the second cell are neighboring to each other (e.g., adjacent geographically to each other, at location where interfering to each other, etc.). In an example, the configuration parameters may further indicate that a first beam (e.g., SS beam, CSI-RS beam, etc.) of the first cell and a second beam (e.g., SS beam, CSI-RS beam, etc.) of the second cell are neighboring to each other. In an example, the configuration parameters may further indicate that the first cell and a second beam (e.g., SS beam, CSI-RS beam, etc.) of the second cell are neighboring to each other. In an example, the configuration parameters may further indicate that a first beam (e.g., SS beam, CSI-RS beam, etc.) of the first cell and a coverage of the second cell are neighboring to each other.

In an example, the configuration parameter may further indicate whether uplinks (e.g. comprising a supplementary uplink) and/or downlinks of a group of cells/BWPs of cells/beams of cells (e.g., served by one or more IAB-nodes) are allowed or not allowed to be activated with the flexible resources in an overlapping time duration. In an example, the configuration parameters may further indicate at least one of: whether the flexible resources are allowed to be activated for an uplink of the first cell and for an uplink of the second cell in an overlapping time duration; whether the flexible resources are allowed to be activated for a downlink of the first cell and for a downlink of the second cell in an overlapping time duration; whether the flexible resources are allowed to be activated for an uplink of the first cell and for a downlink of the second cell in an overlapping time duration; and/or whether the flexible resources are allowed to be activated for a downlink of the first cell and for an uplink of the second cell in an overlapping time duration.

In an example, the first access node may receive, from the second access node, at least one first message comprising first resource configuration parameters indicating the flexible resources for the first cell and/or the first child access node. The first access node may transmit/forward, to the first child access node, the at least one first message. The at least one first message may be at least one of: an F1 interface message (e.g., Xn interface message, X2 interface message, N2 interface message, S1 interface message) transmitted from the second access node to the first child access node; and/or a radio resource control (RRC) message transmitted from the second access node to the first child access node. In an example the first access node may receive and forward the at least one first message transparently (e.g., without interpretation, without higher layer (e.g., GTP, RRC, PDCP layer) decoding). In an example, the at least one first message may be routed to the first child access node based on adapt layer information. In an example, the first child access node may transmit/receive, to/from a wireless device, transport blocks based on an activation indication for the flexible resources and the at least one first message.

In an example, the first access node may receive, from the second access node, at least one second message comprising second resource configuration parameters indicating the flexible resources for the second cell and/or the second child access node. The first access node may transmit/forward, to the second child access node, the at least one second message. The at least one second message may be at least one of: an F1 interface message (e.g. Xn interface message, X2 interface message, N2 interface message, S1 interface message) transmitted from the second access node to the second child access node; and/or a RRC message transmitted from the second access node to the second child access node. In an example the first access node may receive and forward the at least one second message transparently (e.g., without interpretation, without higher layer (e.g., GTP, RRC, PDCP layer) decoding). In an example, the at least one second message may be routed to the second child access node based on adapt layer information. In an example, the second child access node may transmit/receive, to/from a wireless device, transport blocks based on an activation indication for the flexible resources and/or the activation indication and the at least one second message.

In an example, the at least one first message and/or the at least one second message may be transmitted via an F1 interface (e.g. Xn interface, X2 interface, N2 interface, S1 interface) between the second access node and the first child access node and/or between the second access node and the second child access node. The at least one first message and/or the at least one second message may be transmitted via a Uu interface between the second access node (or the first access node) and the first child access node and/or between the second access node (or the first access node) and the second child access node. In an example, the at least one first message and/or the at least one second message may be at least one of an F1 interface message (e.g. Xn interface message, X2 interface message, N2 interface message, S1 interface message) and/or a radio resource control (RRC) message. In an example, the at least one first message and/or the at least one second message may comprise at least one of an F1 setup response message, a gNB-DU configuration update acknowledge message, a gNB-CU configuration update message, a gNB-DU resource coordination request message, a UE context setup request message, a UE context modification request message, a UE context modification confirm message, and/or the like. In an example, the at least one first message may comprise at least one of an RRC reconfiguration message, an RRC reestablishment message, an RRC setup message, an RRC resume message, at least one system information block, and/or the like.

In an example, the first resource configuration parameters of the at least one first message and/or the second resource configuration parameters of the at least one second message may further comprise resource parameters of the flexible resources. The resource parameters of the flexible resources may comprise at least one of a time offset, a subframe index, a slot index, a time duration, a time period, a frequency offset, a subcarrier index, a bandwidth, a bandwidth part index of a bandwidth part for the flexible resources, a beam index of a beam for the flexible resources, and/or the like. The first child access node and/or the second child access node may determine resource blocks of the flexible resources based on the resource parameters of the flexible resources. The first child access node and/or the second child access node may determine beams and/or bandwidth part allowed (or not allowed) to activate the flexible resources based on the beam index and/or the bandwidth part index. The resource parameters of the flexible resources may further comprise at least one of an IAB-node identifier (e.g. gNB identifier, gNB-DU identifier, base station identifier, UE identifier, MT identifier) indicating an IAB-node, a cell identifier (e.g. physical cell identifier, global cell identifier, cell index) indicating a cell, and/or the like. The first child access node and/or the second child access node may determine an access node (e.g., the first child access node, the second child access node, and/or one or more child IAB-nodes) allowed (or not allowed) to activate the flexible resources based on the IAB-node identifier. The first child access node and/or the second child access node may determine a cell (e.g. the one or more first child cells, the one or more second child cells) allowed (or not allowed) to be activated with the flexible resources based on the cell identifier.

In an example, the first resource configuration parameters of the at least one first message and/or the second resource configuration parameters of the at least one second message may further comprise a resource index indicating/identifying the flexible resources. The first child access node and/or the second child access node may receive the resource index for activation of the flexible resources from a parent node (e.g., the first access node).

In an example, the first access node may receive, from the first child access node, at least one first response message indicating completion of configuring/applying first resource configuration parameters of the flexible resources for the first cell and/or the first child access node. The first access node may transmit/forward, to the second access node, the at least one first response message. In an example, the first access node may receive, from the second child access node, at least one second response message indicating completion of configuring/applying second resource configuration parameters of the flexible resources for the second cell and/or the second child access node. The first access node may transmit/forward, to the second access node, the at least one second response message.

The first access node may determine, based on the configuration parameters of the at least one message received from the second access node, to activate/deactivate the flexible resources for at least one of the first cell and the second cell. Based on the determination, the first access node may transmit, to at least one of the first child access node and the second child access node (e.g. corresponding to the at least one of the first cell and the second cell), an activation indication of the flexible resources for the at least one of the first cell (e.g., and/or the first child access node, beam of the first cell, BWP of the first cell) and the second cell (e.g., and/or the second child access node, beam of the second cell, BWP of the second cell).

In an example, if the configuration parameters of the at least one message indicates that the first cell (e.g., and/or the first child access node, beam of the first cell, BWP of the first cell) and the second cell (e.g., and/or the second child access node, beam of the second cell, BWP of the second cell) are not allowed to be activated with the flexible resources in an overlapping time duration, the first access node may send the activation indication to the first child access node, and not send an activation indication for the flexible resources to the second child access node at least during a time duration when the flexible resources are activated at the first child access node. In an example, to activate the flexible resources for the second cell (e.g., and/or for the second child access node, beam of the second cell, BWP of the second cell) when the flexible resources are activated for the first cell (e.g., and/or for the first child access node, beam of the first cell, BWP of the first cell), the first access node may send a deactivation indication for the flexible resources to the first child access node, and send an activation indication for the flexible resources to the second child access node.

In an example, if the configuration parameters of the at least one message indicates that the first cell (e.g., and/or the first child access node, beam of the first cell, BWP of the first cell) and the second cell (e.g., and/or the second child access node, beam of the second cell, BWP of the second cell) are not allowed to be activated with the flexible resources in an overlapping time duration, the first access node may send the activation indication to the second child access node, and not send an activation indication for the flexible resources to the first child access node at least during a time duration when the flexible resources are activated at the second child access node. In an example, to activate the flexible resources for the first cell (e.g., and/or for the first child access node, beam of the first cell, BWP of the first cell) when the flexible resources are activated for the second cell (e.g., and/or for the second child access node, beam of the second cell, BWP of the second cell), the first access node may send a deactivation indication for the flexible resources to the second child access node, and send an activation indication for the flexible resources to the first child access node.

In an example, if the configuration parameters of the at least one message indicates that the first cell (e.g., and/or the first child access node, beam of the first cell, BWP of the first cell) and the second cell (e.g., and/or the second child access node, beam of the second cell, BWP of the second cell) are allowed to be activated with the flexible resources in an overlapping time duration, the first access node may send the activation indication to the first child access node, and may send an activation indication for the flexible resources to the second child access node during a time duration when the flexible resources are activated at the first child access node.

In an example, if the configuration parameters of the at least one message indicates that the first cell (e.g., and/or the first child access node, beam of the first cell, BWP of the first cell) and the second cell (e.g., and/or the second child access node, beam of the second cell, BWP of the second cell) are neighboring to each other (e.g. geographically adjacent to each other, and/or at location where interfering to each other), the first access node may send the activation indication to the first child access node, and not send an activation indication for the flexible resources to the second child access node at least during a time duration when the flexible resources are activated at the first child access node. In an example, to activate the flexible resources for the second cell (e.g., and/or for the second child access node, beam of the second cell, BWP of the second cell) when the flexible resources are activated for the first cell (e.g., and/or for the first child access node, beam of the first cell, BWP of the first cell), the first access node may send a deactivation indication for the flexible resources to the first child access node, and send an activation indication for the flexible resources to the second child access node.

In an example, if the configuration parameters of the at least one message indicates that the first cell (e.g., and/or the first child access node, beam of the first cell, BWP of the first cell) and the second cell (e.g., and/or the second child access node, beam of the second cell, BWP of the second cell) are neighboring to each other (e.g. geographically apart from each other, geographically not adjacent to each other, and/or at location where not interfering to each other), the first access node may send the activation indication to the first child access node, and may send an activation indication for the flexible resources to the second child access node during a time duration when the flexible resources are activated at the first child access node.

In an example, the first access node may transmit, to the one of the first child access node and the second child access node, the activation indication via at least one of a MAC CE, a physical layer indication, a physical downlink control channel, and/or downlink control information. In an example, the first access node may transmit, to the at least one of the first child access node and the second child access node, the activation indication to activate the flexible resources for at least one of: at least one of a first BWP of the first cell, a second BWP of the second cell, a first beam of the first cell, a second beam of the second cell, an uplink of the first cell, an uplink of the second cell, a downlink of the first cell, a downlink of the second cell, the first cell, the second cell, the first child access node, and/or the second child access node. In an example, the first access node may transmit, to the first child access node, the activation indication to activate the flexible resources for at least one of: a first BWP of the first cell, a first beam of the first cell, an uplink of the first cell, a downlink of the first cell, the first cell, the first child access node, and/or the like. In an example, the first access node may transmit, to the second child access node, the activation indication to activate the flexible resources for at least one of: a second BWP of the second cell, a second beam of the second cell, an uplink of the second cell, a downlink of the second cell, the second cell, the second child access node, and/or the like.

In an example, the configuration parameters of the at least one message (e.g. received by the first access node from the second access node) may further comprise a resource index indicating/identifying the flexible resources. In an example, the resource index may be a scrambling code (e.g. RNTI) employed to scramble the activation indication and/or the deactivation indication for the flexible resources. The activation indication transmitted by the first access node may further comprise the resource index (e.g., and/or may be scrambled with the resource index) for the flexible resources. When receiving the activation indication comprising the resource index (e.g. and/or when receiving the activation indication scrambled with the resource index (the scrambling code)) for the flexible resources, the first child access node and/or the second child access node may activate the flexible resources based on the first resource configuration parameters received via the at least one first message comprising the resource index and/or the second resource configuration parameters received via the at least one second message comprising the resource index. In an example, the deactivation indication transmitted by the first access node to deactivate the flexible resources may further comprise the resource index (e.g., and/or may be scrambled with the resource index) for the flexible resources. When receiving the deactivation indication comprising the resource index (e.g. and/or when receiving the deactivation indication scrambled with the resource index (the scrambling code)) for the flexible resources, the first child access node and/or the second child access node may deactivate the flexible resources (e.g., based on the first resource configuration parameters received via the at least one first message comprising the resource index and/or the second resource configuration parameters received via the at least one second message comprising the resource index).

In an example, the first access node may transmit, to the first child access node via a third cell served by the first access node, a first activation indication (e.g. the activation indication) to activate the flexible resources for the first cell (e.g., and/or for the first child access node, beam of the first cell, BWP of the first cell). The first access node may transmit, to the second child access node via a fourth cell of the first access node, a second activation indication (e.g. the activation indication) to activate the flexible resources for the second cell (e.g., and/or for the second child access node, beam of the second cell, BWP of the second cell). The third cell may be the fourth cell.

In an example, the one of the first child access node and the second child access node may transmit, to a wireless device and based on the activation indication, transport blocks via the flexible resources via the one of the first cell (e.g., via at least one cell, at least one beam of the cell, at least one BWP of the cell) and/or the second cell (e.g., via at least one cell, at least one beam of the cell, at least one BWP of the cell).

In an example, the one of the first child access node and the second child access node may transmit, to a wireless device and based on the activation indication, at least one of: a resource grant indication indicating uplink resources (e.g. the flexible resources may comprise the uplink resources); and/or a resource activation indication indicating activation of configured grant resources (e.g. the flexible resources may comprise the configured grant resources). The uplink resources and/or the configured grant resources may be configured on at least one cell, at least one beam of the cell, and/or at least one BWP of the cell. The one of the first child access node and the second child access node may receive, from the wireless device, transport blocks via the uplink resources and/or the configured grant resources.

In an example, the first child access node may transmit/receive, to/from a wireless device, transport blocks based on the activation indication and the first resource configuration parameters received via the at least one first message. In an example, the second child access node may transmit/receive, to/from a wireless device, transport blocks based on the activation indication and the second resource configuration parameters received via the at least one second message.

The first access node may determine, based on the configuration parameters of the at least one message received from the second access node, to deactivate the flexible resources for at least one of the first cell (e.g., and/or the first child access node, beam of the first cell, BWP of the first cell) and the second cell (e.g., and/or the second child access node, beam of the second cell, BWP of the second cell). In an example, the first access node may transmit, to the at least one of the first child access node and the second child access node (e.g. corresponding to the at least one of the first cell and the second cell), a deactivation indication of the flexible resources for the at least one of the first cell (e.g., and/or the first child access node, beam of the first cell, BWP of the first cell) and the second cell (e.g., and/or the second child access node, beam of the second cell, BWP of the second cell).

In an example, in response to receiving the deactivation indication for the flexible resources from the first access node, the one of the first child access node and the second child access node may stop transmitting transport blocks via the flexible resources. In an example, in response to receiving the deactivation indication for the flexible resources from the first access node, the one of the first child access node and the second child access node may stop transmitting a resource grant indication to grant uplink resources on the flexible resources and/or may stop transmitting a resource activation indication to activate configured grant resources configured on (partially or wholly) the flexible resources.

In an example, the first access node may determine further based on resource status of the first access node and/or channel/load information received from a child node (e.g. the first child access node and/or the second child access node). In an example, if resource status of the first access node (e.g. the third cell and/or the fourth cell) is enough to serve wireless devices (e.g., UE, child IAB-nodes) and/or if the channel/load information received from a child node indicates that a child cell (e.g. the first cell of the first child access node and/or the second cell of the second child access node) has a good quality of channel (e.g., larger RSRP/RSRQ than threshold value in uplink/downlink of the child cell) and/or has a low load traffic (e.g., smaller than a threshold load value), the first access node may determine to activate the flexible resources for the first child access node (e.g., cell/beam/BWP) and/or for the second child access node (e.g., cell/beam/BWP). In an example, if resource status of the first access node (e.g. the third cell and/or the fourth cell) is not enough to serve wireless devices (e.g., UE, child IAB-nodes) and/or if the channel/load information received from a child node indicates that a child cell (e.g. the first cell of the first child access node and/or the second cell of the second child access node) has a lower quality of channel (e.g., smaller RSRP/RSRQ than threshold value in uplink/downlink of the child cell) and/or has a high load traffic (e.g., larger than a threshold load value), the first access node may determine to deactivate (e.g., not activate) the flexible resources for the first child access node (e.g., cell/beam/BWP) and/or for the second child access node (e.g., cell/beam/BWP).

Figure 40:
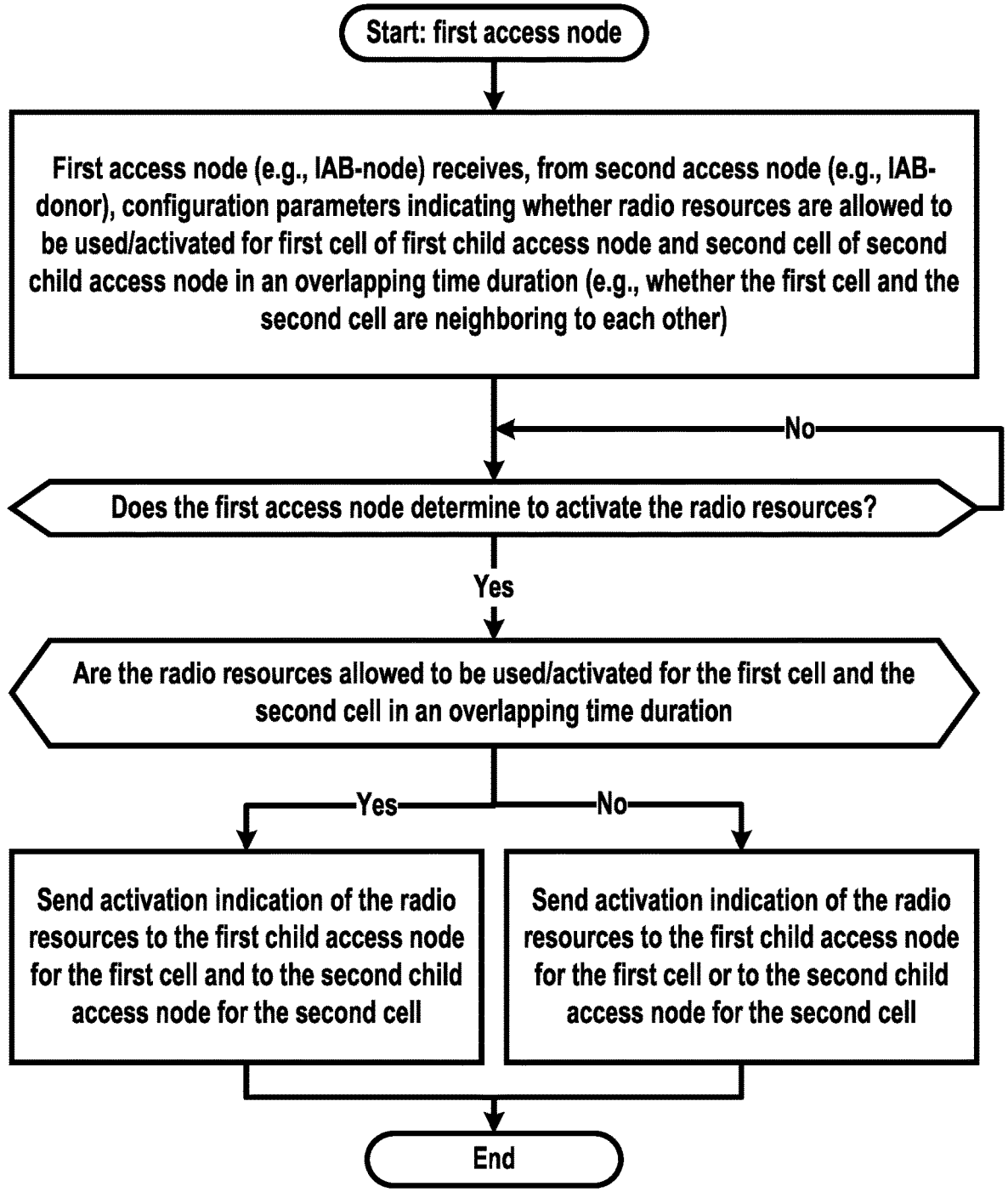
FIG. 40 is an example diagram of an aspect of an embodiment of the present disclosure.
Figure 41:
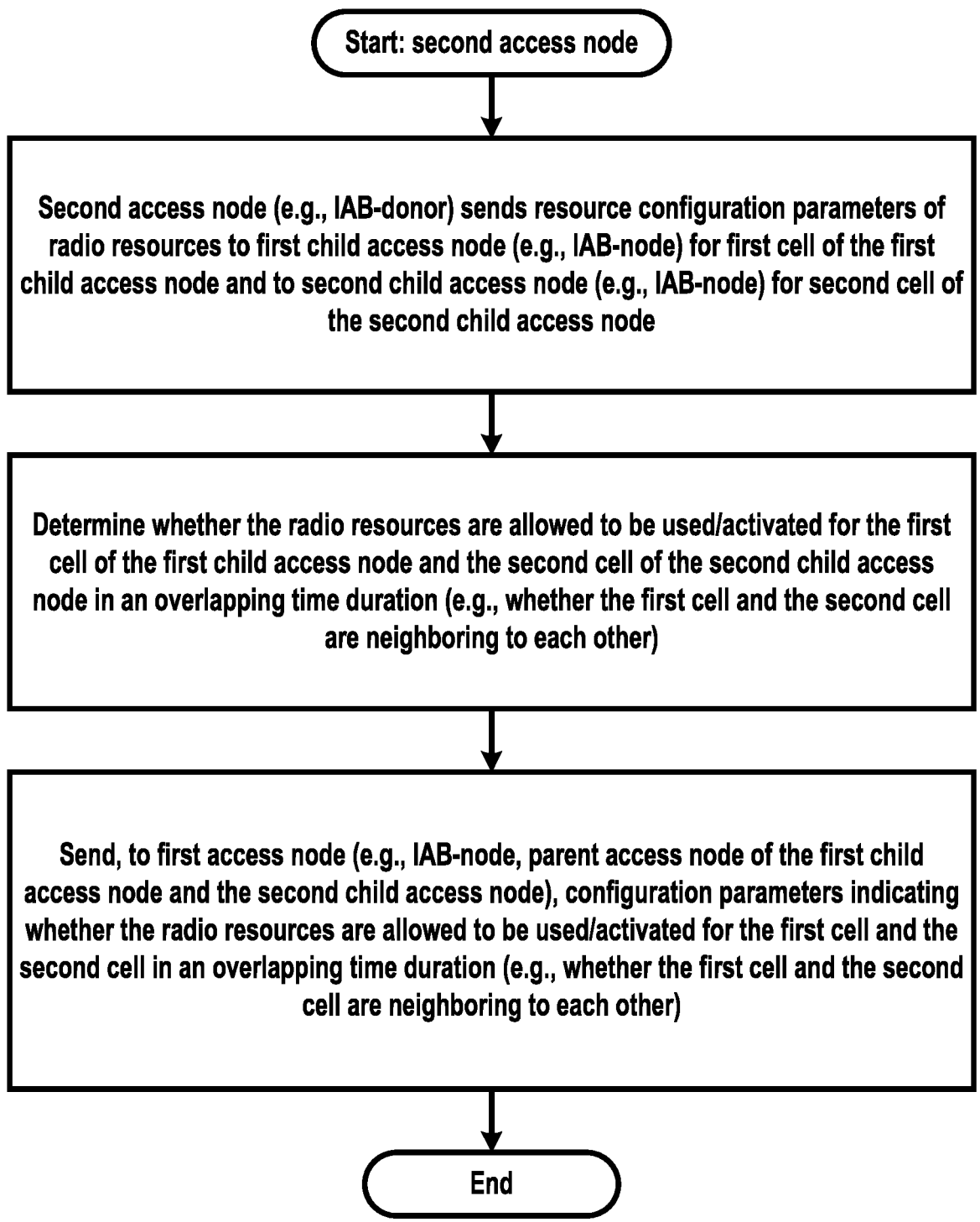
FIG. 41 is an example diagram of an aspect of an embodiment of the present disclosure.

In an example, as shown in FIG. 40 and/or FIG. 41, a first access node (e.g. IAB-node) may receive from a second access node (e.g. IAB-donor), at least one message comprising configuration parameters indicating whether flexible resources are allowed to be activated for a first cell and a second cell in an overlapping time duration. A first child access node (e.g. child IAB-node) of the first access node may serve the first cell. A second child access node (e.g. child IAB-node) of the first access node may serve the second cell. The first access node may determine, based on the configuration parameters, to activate the flexible resources for at least one of the first cell and the second cell. Based on the determination, the first access node may transmit, to at least one of the first child access node and the second child access node (e.g. corresponding to the at least one of the first cell and the second cell), an activation indication of the flexible resources for the at least one of the first cell and the second cell.

In an example, the one of the first child access node and the second child access node may transmit, to a wireless device and based on the activation indication, transport blocks via the flexible resources via the one of the first cell and the second cell. In an example, the one of the first child access node and the second child access node may transmit to a wireless device and based on the activation indication, at least one of: a resource grant indication indicating uplink resources (e.g. the flexible resources may comprise the uplink resources); and/or a resource activation indication indicating configured grant resources (e.g. the flexible resources may comprise the configured grant resources). The one of the first child access node and the second child access node may receive, from the wireless device, transport blocks via the uplink resources and/or the configured grant resources.

In an example, the first access node may transmit, to the at least one of the first child access node and the second child access node (e.g. corresponding to the at least one of the first cell and the second cell), a deactivation indication of the flexible resources for the at least one of the first cell and the second cell.

In an example, the first access node may be an IAB-node. In an example, the second access node may be an IAB-donor. In an example, the first child access node and/or the second child access node may be an IAB-node. In an example, the first access node may be a parent node of at least one of the first child access node and/or the second child access node. In an example, the first access node may be a base station distributed unit (e.g. gNB-DU) for at least one of the first child access node and/or the second child access node. In an example, the second access node may be a base station central unit (e.g. gNB-CU) for at least one of the first access node, the first child access node, the second child access node, and/or a wireless device served by at least one of the first child access node and/or the second child access node. In an example, the first child access node and/or the second child access node may be a base station distributed unit for a wireless device served by at least one of the first child access node and/or the second child access node.

In an example, the configuration parameters may further comprise resource parameters of the flexible resources. The resource parameters of the flexible resources may comprise at least one of a time offset, a subframe index, a slot index, a time duration, a time period, a frequency offset, a subcarrier index, a bandwidth, a bandwidth part index of a bandwidth part, a beam index of a beam, and/or the like.

In an example, the configuration parameters may further indicate at least one of: whether the flexible resources are allowed to be activated for a first bandwidth part of the first cell and for a second bandwidth part of the second cell in an overlapping time duration; whether the flexible resources are allowed to be activated for a first bandwidth part of the first cell and for the second cell in an overlapping time duration; whether the flexible resources are allowed to be activated for the first cell and for a second bandwidth part of the second cell in an overlapping time duration; whether the flexible resources are allowed to be activated for a first beam of the first cell and for a second beam of the second cell in an overlapping time duration; whether the flexible resources are allowed to be activated for a first beam of the first cell and for the second cell in an overlapping time duration; and/or whether the flexible resources are allowed to be activated for the first cell and for a second beam of the second cell in an overlapping time duration.

In an example, the configuration parameters may further indicate that the first cell and the second cell are neighboring to each other (e.g., adjacent geographically to each other, at location where interfering to each other, etc.). In an example, the configuration parameters may further indicate that a first beam of the first cell and a second beam of the second cell are neighboring to each other. In an example, the configuration parameters may further indicate that the first cell and a second beam of the second cell are neighboring to each other. In an example, the configuration parameters may further indicate that a first beam of the first cell and a coverage of the second cell are neighboring to each other.

In an example, the at least one message may be at least one of an F1 interface message (e.g. Xn interface message, X2 interface message, N2 interface message, S1 interface message) and/or a radio resource control message. In an example, the first access node may transmit, to the one of the first child access node and the second child access node, the activation indication via at least one of a physical layer indication, a physical downlink control channel, and/or downlink control information.

In an example, the first access node may receive, from the second access node, at least one first message comprising first resource configuration parameters indicating the flexible resources for the first cell. The first access node may transmit/forward, to the first child access node, the at least one first message. The at least one first message may be at least one of: an F1 interface message (e.g. Xn interface message, X2 interface message, N2 interface message, S1 interface message) transmitted from the second access node to the first child access node; and/or a radio resource control message transmitted from the second access node to the first child access node. In an example, the first child access node may transmit/receive, to/from a wireless device, transport blocks based on the activation indication and the at least one first message.

In an example, the first access node may receive, from the second access node, at least one second message comprising second resource configuration parameters indicating the flexible resources for the second cell. The first access node may transmit/forward, to the second child access node, the at least one second message. The at least one second message may be at least one of: an F1 interface message (e.g. Xn interface message, X2 interface message, N2 interface message, S1 interface message) transmitted from the second access node to the second child access node; and/or a radio resource control message transmitted from the second access node to the second child access node. In an example, the second child access node may transmit/receive, to/from a wireless device, transport blocks based on the activation indication and the at least one second message.

In an example, the first access node may transmit, to the first child access node via a third cell of the first access node, a first activation indication of the flexible resources for the first cell. The first access node may transmit, to the second child access node via a fourth cell of the first access node, a second activation indication of the flexible resources for the second cell. The third cell may be the fourth cell.

In an example, the first access node may transmit/receive, to/from a wireless device, transport blocks via the flexible resources.

In an example, the configuration parameters may further indicate at least one of: whether the flexible resources are allowed to be activated for an uplink of the first cell and for an uplink of the second cell in an overlapping time duration; whether the flexible resources are allowed to be activated for a downlink of the first cell and for a downlink of the second cell in an overlapping time duration; whether the flexible resources are allowed to be activated for an uplink of the first cell and for a downlink of the second cell in an overlapping time duration; and/or whether the flexible resources are allowed to be activated for a downlink of the first cell and for an uplink of the second cell in an overlapping time duration.

In an example, the first access node may transmit, to the at least one of the first child access node and the second child access node, the activation indication of the flexible resources for at least one of: at least one of a first bandwidth part of the first cell and a second bandwidth part of the second cell; at least one of a first beam of the first cell and a second beam of the second cell; at least one of an uplink of the first cell and an uplink of the second cell; and/or at least one of a downlink of the first cell and a downlink of the second cell.

In an example, the configuration parameters may further comprise a resource index indicating/identifying the flexible resources. The activation indication and/or the deactivation indication for the flexible resources may further comprise the resource index for the flexible resources. In an example, the resource index may be a scrambling code (e.g. RNTI) employed to scramble the activation indication and/or the deactivation indication.

Figure 42:
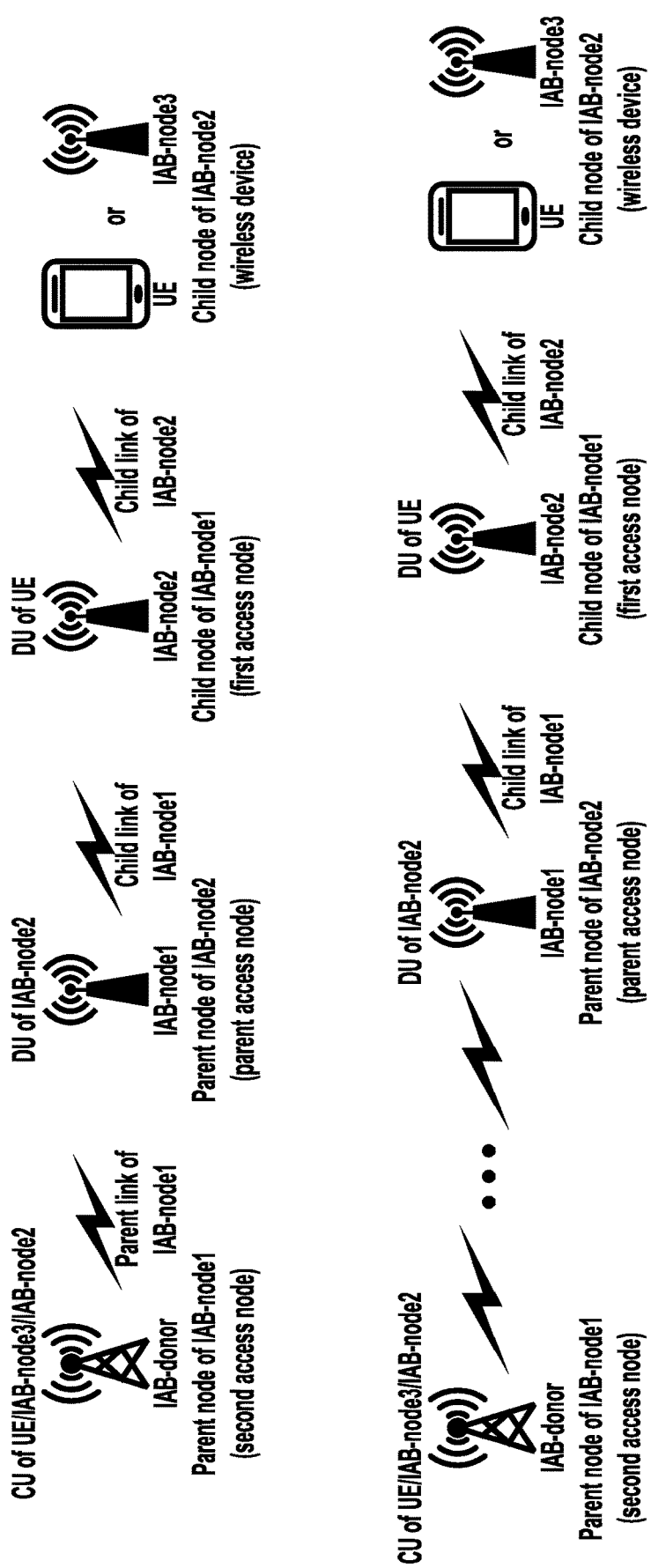
FIG. 42 is an example diagram of an aspect of an embodiment of the present disclosure.

In an example of IAB-node deployment, flexible resources (e.g., hard type and/or soft type) may be configured for integrated access and backhaul (IAB) nodes. In an example, as shown in FIG. 42, an RRC layer of wireless devices served by an IAB-node (e.g., base station distributed unit, gNB-DU) may locate at an IAB-donor (e.g., base station central unit, gNB-CU), which may be different than a parent IAB-node of the IAB-node (e.g., the parent IAB-node is an intermediate node connecting the IAB-node and the IAB-donor). An IAB-donor providing an RRC layer of an IAB-node may configure the flexible resources for the IAB-node and/or indicate to a parent IAB-node of the IAB-node that the flexible resources are configured for the IAB-node. A parent node (e.g., parent IAB-node) of IAB nodes (e.g., child IAB-nodes) may activate and/or deactivate flexible resources by transmitting an activation indication and/or a deactivation indication to the IAB-nodes (e.g., via a physical layer and/or via a MAC CE). In an example, an IAB-node may serve multiple cells (e.g., comprising multiple beams/BWPs). Cells served by an IAB-node may have different interference conditions and/or different traffic load status from each other. An IAB-node may have insufficient information about flexible resource utilization of neighboring cells served by other access nodes. In an implementation of existing technologies, an IAB-node may activate flexible resources for an improper serving cell without neighboring cell environment information. Flexible resource activation of an IAB-node may increase interference to neighboring cells and/or inefficient resource utilization. An implementation of existing technologies may decrease packet transmission throughput and/or service reliability of wireless devices.

Example embodiments may support a parent IAB-node to indicate, to an IAB-node, a cell (e.g., beam, bandwidth part, uplink, downlink of a cell) that flexible resources of an activation/deactivation indication are activated/deactivated for. Example embodiments may support a parent IAB-node to activate/deactivate flexible resources for selective cells (e.g., beam, bandwidth part, uplink, downlink of a cell) of an IAB-node (e.g. child IAB-node of the parent IAB-node). Example embodiments may provide flexible resource activation/deactivation for proper cells and support efficient utilization of flexible resources.

Figure 43:
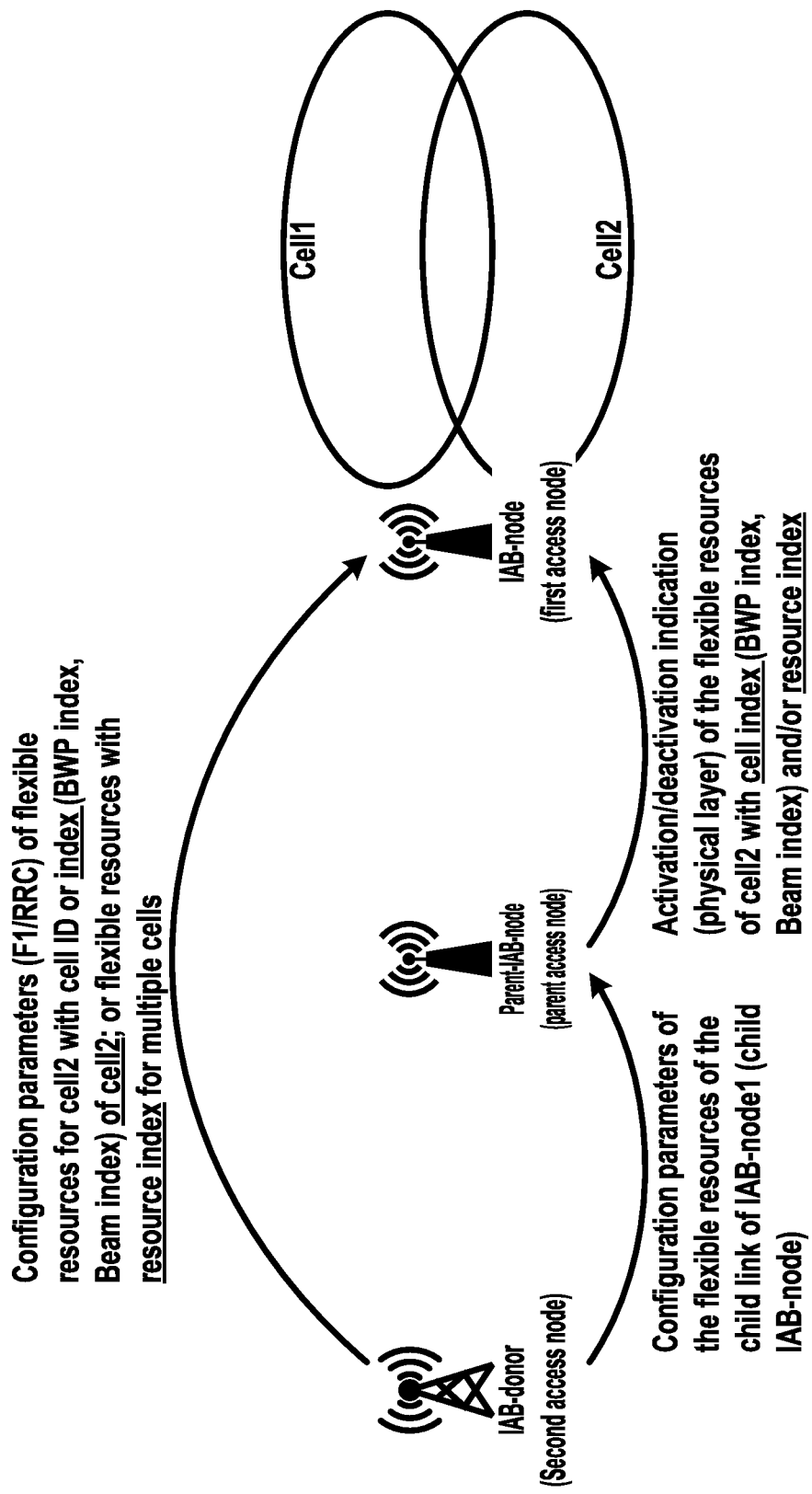
FIG. 43 is an example diagram of an aspect of an embodiment of the present disclosure.
Figure 44:
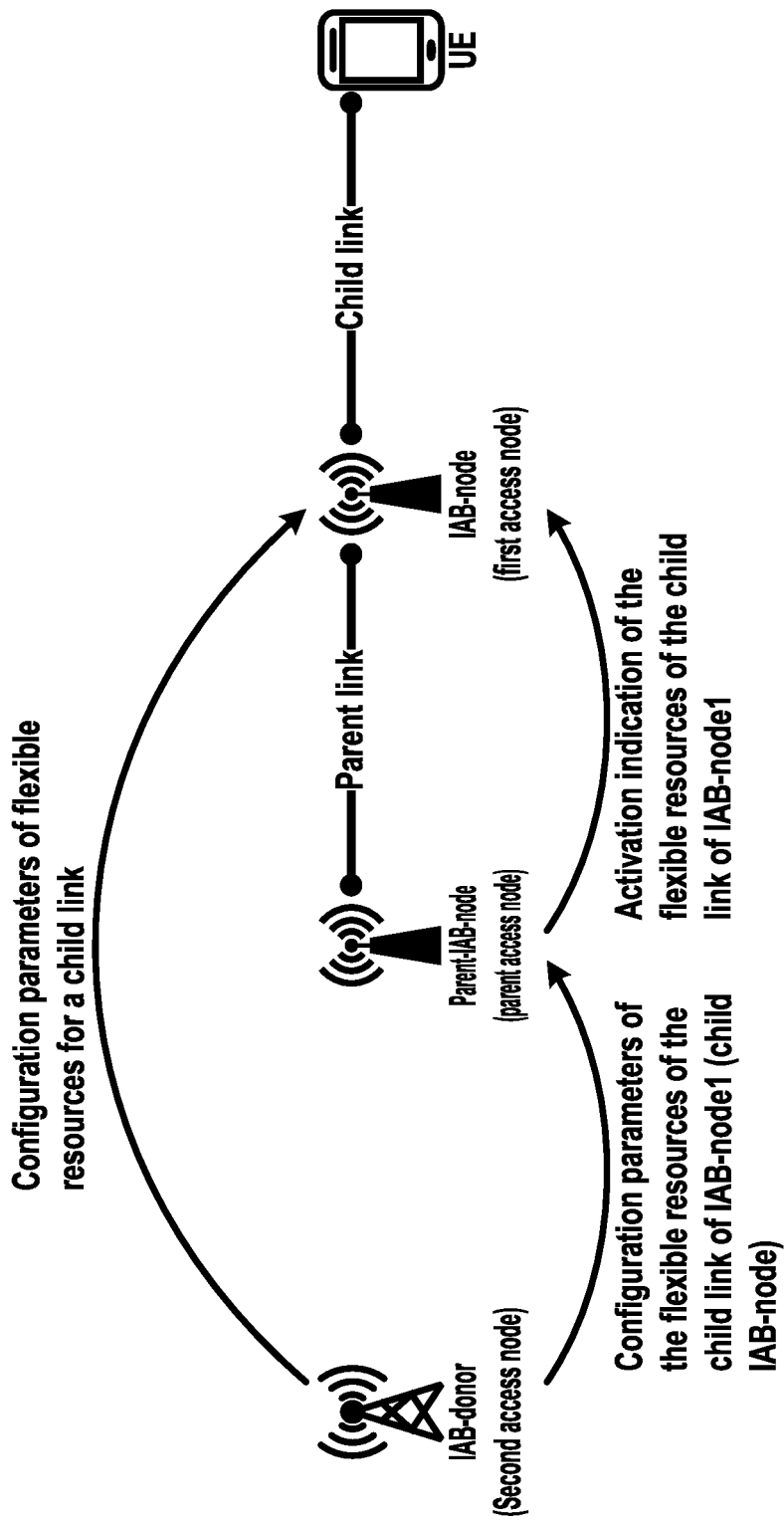
FIG. 44 is an example diagram of an aspect of an embodiment of the present disclosure.

In an example, as shown in FIG. 42, FIG. 43, and/or FIG. 44, a parent access node (e.g., IAB-node, base station, gNB, gNB-DU for a wireless device/a first access node, eNB, mobile termination (MT), UE, a parent node (parent IAB-node) of the first access node, a child node (child IAB-node) of an access node, and/or the like) and a second access node (e.g., an IAB-donor/gNB-CU of the first access node and/or the parent access node; a parent node (parent IAB-node) of the parent access node; base station; gNB; eNB; and/or the like) may be directly or indirectly connected to each other (e.g. via one or more radio interfaces, F1 interface, Uu interface, RRC layer communication, parent link/backhaul of the parent access node, one or more parent cells serving the parent access node, and/or the like). The parent access node may directly or indirectly serve the first access node (e.g. IAB-node, child IAB-node of the parent access node, child node of the parent access node, MT, UE. gNB, gNB-DU for a wireless device served by the first access node, eNB, and/or the like). The parent access node may serve the first access node via a child link/backhaul of the parent access node (e.g. one or more radio interfaces, F1 interface, Uu interface, RRC layer communication, adapt/PDCP layer communication protocol, RLC/MAC/physical layer communication protocol, one or more child cells served by the first access node, and/or the like).

In an example, the parent access node may be a base station distributed unit (e.g. gNB-DU) for the first access node. In an example, the second access node may be a base station central unit (e.g. gNB-CU) for at least one of the parent access node, the first access node, and/or a wireless device served by the first access node. In an example, the first access node may be a base station distributed unit for a wireless device served by the first access node.

In an example, the first access node may be an IAB-node. The second access node may be an IAB-donor. The parent access node may be an IAB-node. The first access node may be a child node (e.g., child IAB-node) of the parent access node. The first access node may be a base station distributed unit (e.g., gNB-DU) for the wireless device. The second access node may be a base station central unit (e.g., gNB-CU) for at least one of the first access node, the parent access node, and/or the wireless device. The parent access node may be a base station distributed unit (e.g., gNB-DU) for the first access node.

Figure 47:
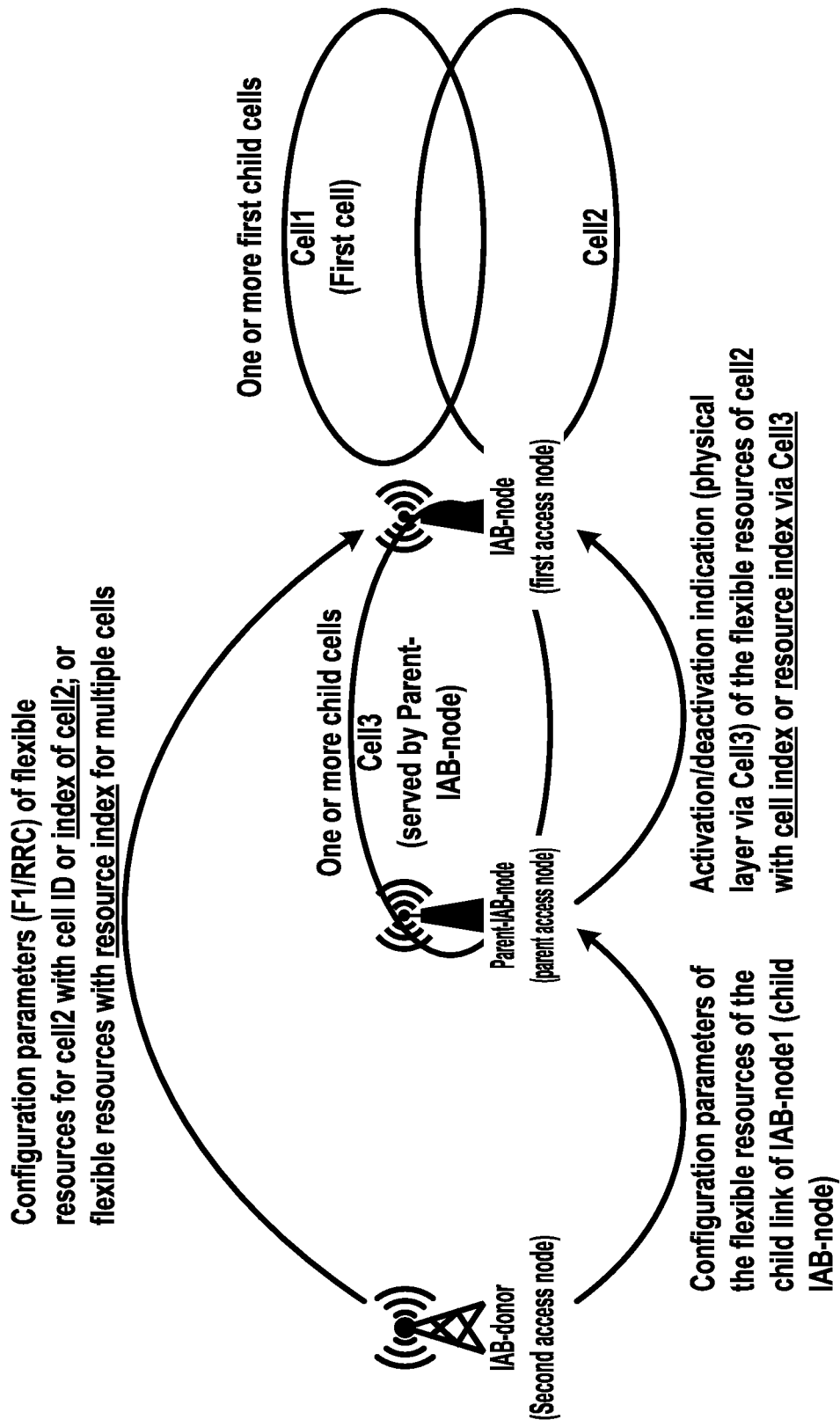
FIG. 47 is an example diagram of an aspect of an embodiment of the present disclosure.

In an example, as shown in FIG. 47, one or more child cells of the parent access node may serve the first access node and/or one or more wireless devices (e.g., UE, IAB-node, MT). One or more first child cells (e.g. comprising a first cell) of the first child access node may serve at least on wireless device (e.g., UE, IAB-node, MT). In an example, the one or more child cells of the parent access node may or may not employ a same carrier (e.g., in-band, intra-carrier, same band, wholly or partially overlapping bandwidth) to a carrier employed by the one or more first child cells of the first child access node. The one or more first child cells of the first child access node may or may not employ a same carrier (e.g., in-band, intra-carrier, same band, wholly or partially overlapping bandwidth) with a carrier employed by cells served by one or more IAB-nodes.

Figure 45:
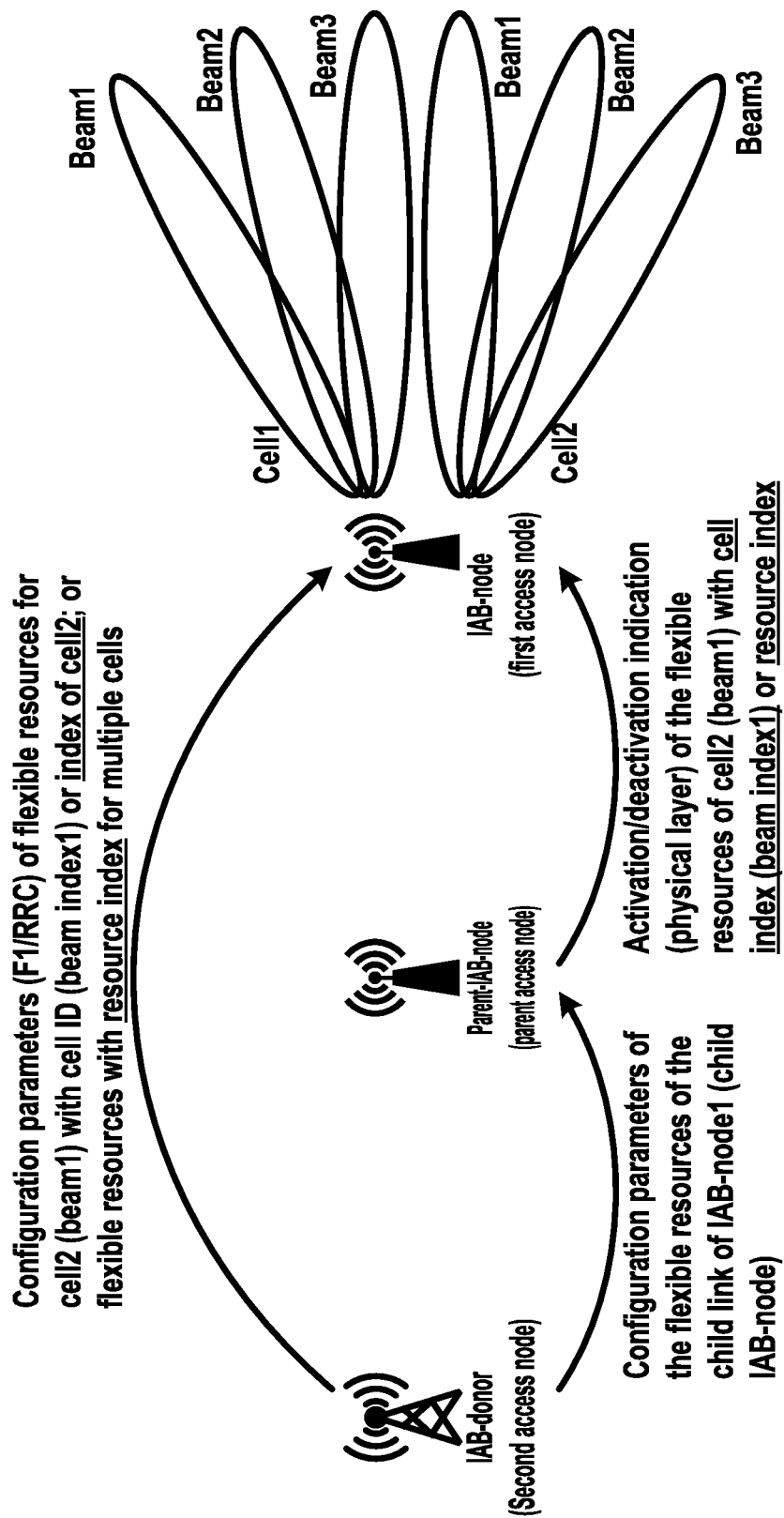
FIG. 45 is an example diagram of an aspect of an embodiment of the present disclosure.
Figure 46:
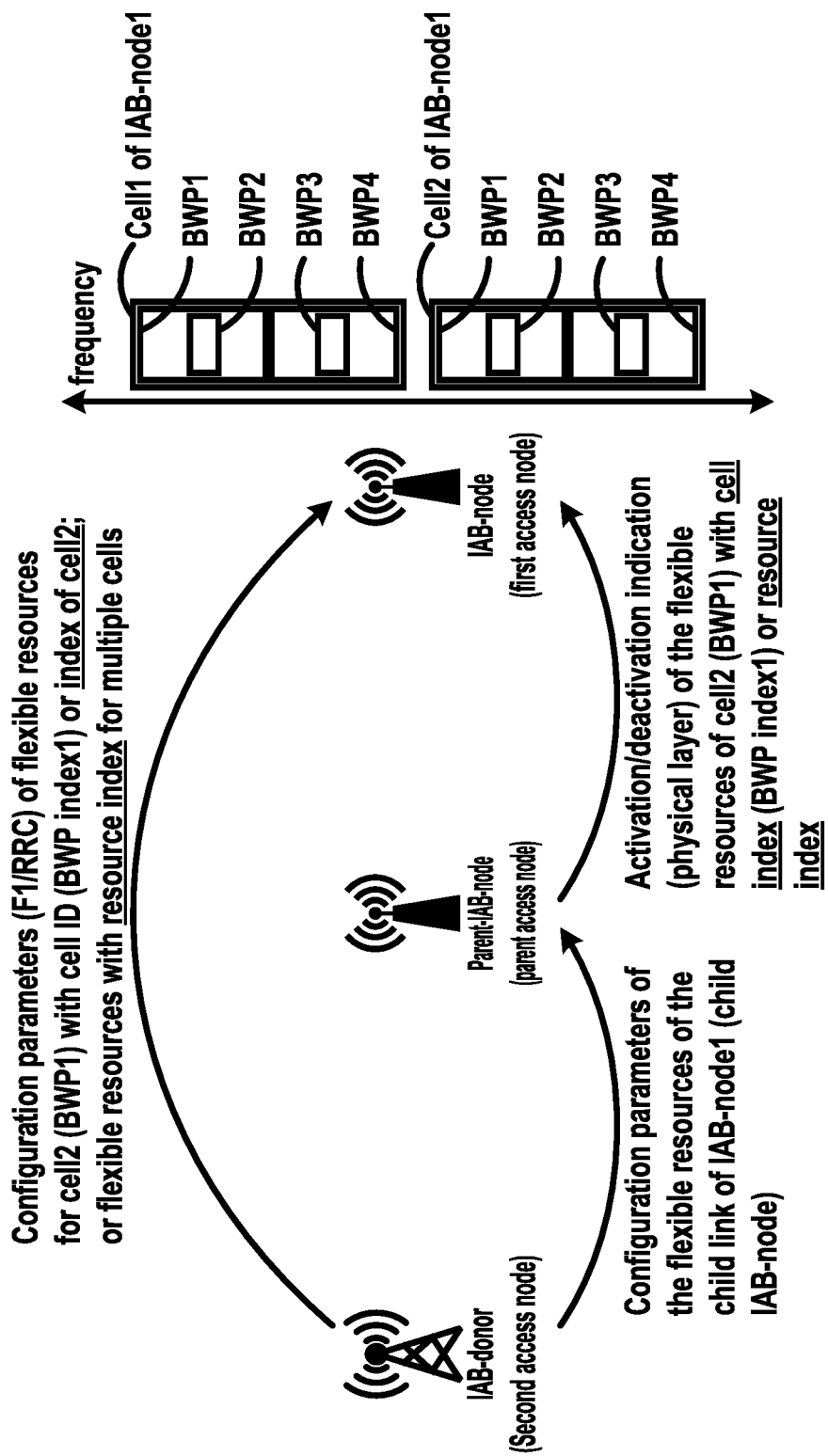
FIG. 46 is an example diagram of an aspect of an embodiment of the present disclosure.

In an example, as shown in FIG. 43, FIG. 44, FIG. 45, and/or FIG. 46, the first access node may receive, from the second access node, at least one message comprising configuration parameters indicating flexible resources for a cell (e.g. the first cell, and/or one of the one or more first child cells) served (e.g. controlled, operated, managed) by the first access node. In an example, the first access node may receive the at least one message via the parent access node.

In an example, the parent access node may receive, from the second access node, the at least one message comprising the configuration parameters indicating the flexible resources for the cell and/or the first access node. The parent access node may transmit/forward, to the first access node, the at least one message. In an example, the at least one message may comprise at least one of: an F1 interface message; a radio resource control message; an N2 interface message; an S1 interface message; an Xn interface message; and/or an X2 interface message. The at least one message may be at least one of: an F1 interface message (e.g., Xn interface message, X2 interface message, N2 interface message, S1 interface message) transmitted from the second access node to the first access node; and/or a radio resource control (RRC) message transmitted from the second access node to the first access node. In an example the parent access node may receive and forward the at least one message transparently (e.g., without interpretation, without higher layer (e.g., GTP, RRC, PDCP layer) decoding). In an example, the at least one message may be routed to the first access node based on adapt layer information. In an example, the first access node may transmit/receive, to/from a wireless device, transport blocks based on an activation indication for the flexible resources and the at least one message.

In an example, the at least one message may be transmitted via an F1 interface (e.g. Xn interface, X2 interface, N2 interface, S1 interface) between the second access node and the first access node. The at least one message may be transmitted via a Uu interface between the second access node (or the parent access node) and the first access node. In an example, the at least one message may be at least one of an F1 interface message (e.g. Xn interface message, X2 interface message, N2 interface message, S1 interface message) and/or a radio resource control (RRC) message. In an example, the at least one message may comprise at least one of an F1 setup response message, a gNB-DU configuration update acknowledge message, a gNB-CU configuration update message, a gNB-DU resource coordination request message, a UE context setup request message, a UE context modification request message, a UE context modification confirm message, and/or the like. In an example, the at least one message may comprise at least one of an RRC reconfiguration message, an RRC reestablishment message, an RRC setup message, an RRC resume message, at least one system information block, and/or the like.

In an example, the configuration parameters of the at least one message may further comprise resource parameters of the flexible resources. The resource parameters of the flexible resources may comprise at least one of a time offset, a subframe index, a slot index, a time duration, a time period, a frequency offset, a subcarrier index, a bandwidth, a bandwidth part index of a bandwidth part for the flexible resources, a beam index of a beam (e.g., SS beam, CSI-RS beam, etc.) for the flexible resources, an uplink indicator indicating an uplink of a cell for the flexible resources, a downlink indicator indicating an downlink of a cell for the flexible resource, and/or the like. The first access node may determine resource blocks of the flexible resources based on the resource parameters of the flexible resources. The first access node may determine beams and/or bandwidth part allowed (or not allowed) to activate the flexible resources based on the beam index and/or the bandwidth part index. The first access node may determine the uplink and/or the downlink allowed (or not allowed) to activate the flexible resources based on the uplink indicator and/or the downlink indicator. The resource parameters of the flexible resources may further comprise at least one of an IAB-node identifier (e.g. gNB identifier, gNB-DU identifier, base station identifier, UE identifier, MT identifier) indicating an IAB-node, a cell identifier (e.g. physical cell identifier, global cell identifier, cell index) indicating a cell, and/or the like. The first access node may determine an access node (e.g., the first access node and/or one or more child IAB-nodes) allowed (or not allowed) to activate the flexible resources based on the IAB-node identifier. The first access node may determine a cell (e.g. the first cell and/or the one or more first child cells) allowed (or not allowed) to be activated with the flexible resources based on the cell identifier.

In an example, the configuration parameters may indicate at least one of: a beam index indicating a beam of the cell for the flexible resources; a bandwidth part index indicating a bandwidth part of the cell for the flexible resources; an uplink of the cell for the flexible resources; and/or a downlink of the cell for the flexible resources. The beam, the bandwidth part, the uplink, and/or the downlink may be configured with the flexible resources, and/or may be activated or deactivated based on an activation or deactivation indication received from the parent access node.

In an example, the configuration parameters of the at least one message may further comprise a resource index indicating/identifying the flexible resources. The first access node may receive the resource index via an activation indication for activation and/or via a deactivation indication for deactivation of the flexible resources from the parent access node. The resource index may be a scrambling code (e.g. RNTI) employed to scramble the activation indication and/or the deactivation indication.

In an example, the configuration parameters may further comprise at least one of: a cell identifier of the cell (e.g. the first cell and/or the one or more first child cells); the cell index of the cell; a carrier indicator field (e.g. 3bits) of the cell; mapping information of the cell identifier and the cell index; mapping information of the carrier indicator field and the cell index; and/or mapping information of the cell identifier and the carrier indicator field.

Figure 48:
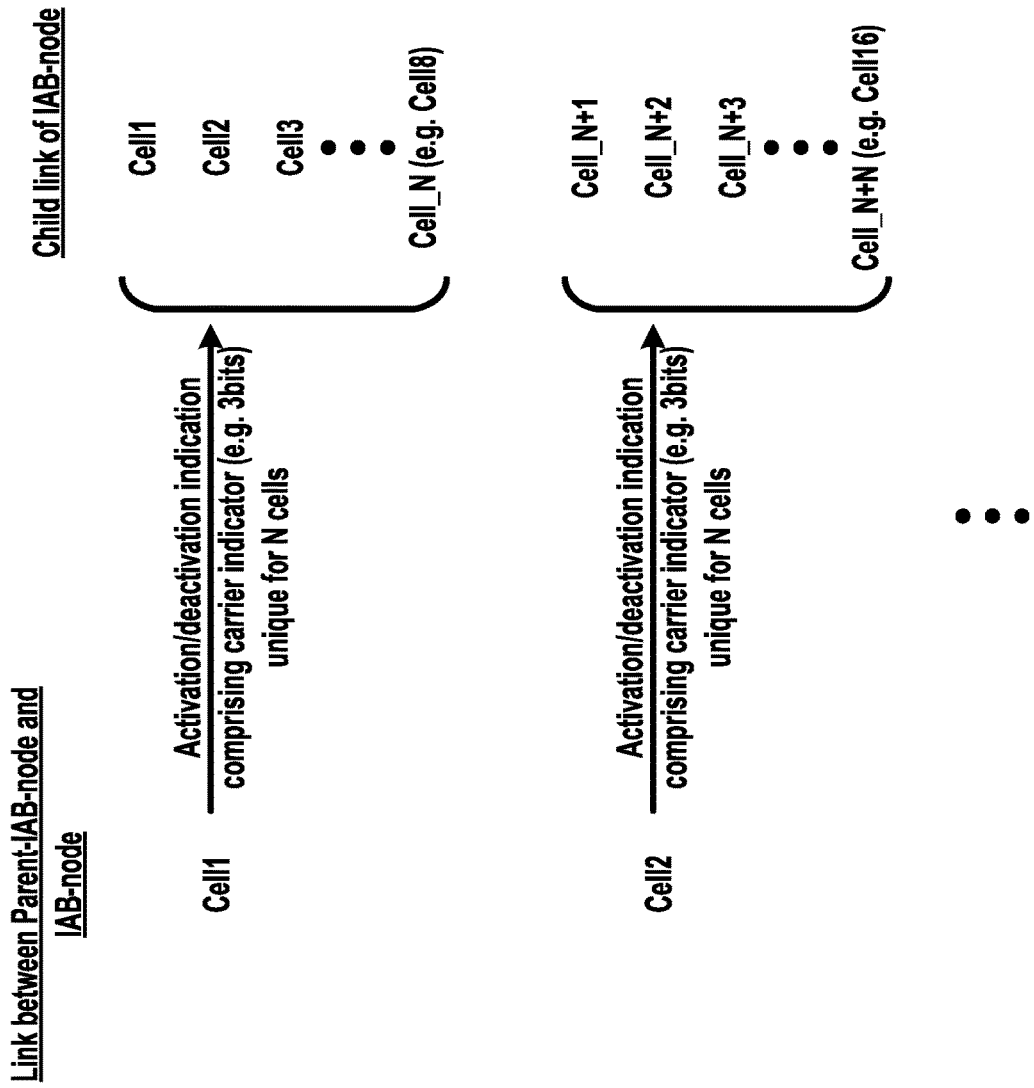
FIG. 48 is an example diagram of an aspect of an embodiment of the present disclosure.

In an example, as shown in FIG. 47, FIG. 48, and/or FIG. 49, the configuration parameters may further comprise at least one of: a cell index (identifier) of a parent cell served by the parent access node; one or more cell indexes (index, identifier, carrier indicator field) of one or more cells (e.g. the first cell and/or the one or more first child cells) of the first access node; mapping information between the parent cell and the one or more cells; and/or the like. The one or more cells may be a scheduling group for the flexible resources. The scheduling group may be scheduled by the parent cell for the flexible resources. The one or more cells may be activated/deactivated with the flexible resources by the parent cell (e.g. by an activation indication and/or a deactivation indication). The one or more cell indexes may be identifiable/unique in the scheduling group. In an example, if the first access node receives an activation/deactivation indication comprising (e.g. or scrambled with) a cell index (e.g., uniquely assigned in the scheduling group) via the parent cell, the first access node may activate/deactivate the flexible resources for a cell (e.g. corresponding to the cell index) determined in the scheduling group, which is scheduled by the parent cell, based on the cell index (e.g., the cell index uniquely assigned in the scheduling group)). In an example, if the number of child cells (e.g. the one or more first child cell) in the scheduling group is 8, the size of the cell index for the scheduling group may be 3bits.

In an example, the parent access node may receive, from the first access node, at least one response message indicating completion of configuring/applying configuration parameters of the flexible resources for the cell (e.g. the first cell, the one or more first child cells) and/or the first access node. The parent access node may transmit/forward, to the second access node, the at least one response message. The at least one response message may indicate configuration completion of the configuration parameters of the at least one message at the first access node (e.g., completion of applying the configuration parameters by the first access node). The at least one response message may be at least one of an F1 interface message (e.g. Xn interface message, X2 interface message, N2 interface message, S1 interface message) and/or a radio resource control message. In an example, the at least one response message may comprise at least one of a gNB-DU configuration update message, a gNB-CU configuration update acknowledge message, a gNB-DU resource coordination response message, a UE context setup response message, a UE context modification response message, a UE context modification required message, and/or the like. In an example, the at least one response message may comprise one or more RRC complete messages (e.g., RRC reconfiguration complete message, RRC reestablishment complete message, RRC setup complete message, RRC resume complete message, and/or the like). The at least one response message may further comprise at least one RRC acknowledge/response message. In an example, the at least one response message may comprise at least one of: an uplink RRC message, a relay node reconfiguration complete message, and/or the like. The at least one response message may indicate whether one or more elements (e.g. one or more of radio resource control configuration parameters of the cell) of the at least one message are successfully configured by the first access node. The at least one response message may indicate whether a bearer is successfully established by the first access node.

In an example, the parent access node may receive, from the second access node, at least one first message comprising first resource configuration parameters indicating the flexible resources for the cell served by the first access node. The parent access node may transmit, to the first access node, the downlink control information (e.g. DCI, MAC CE, other physical or MAC layer indication) based on the at least one first message. The first resource configuration parameters of the at least one first message may further comprise at least one of: the resource index of the flexible resources; the cell index (e.g., carrier index, carrier indication field) of the cell configured with the flexible resources; an identifier of the first access node; the beam index of the beam for the flexible resources; the bandwidth part index of the bandwidth part for the flexible resources; the uplink indicator indicating the uplink for the flexible resources; and/or the downlink indicator indicating the downlink for the flexible resources (e.g. indicated via the configuration parameters of the at least one message transmitted from the second access node to the first access node). In an example, the at least one first message may comprise at least one of: an F1 interface message; a radio resource control message; an N2 interface message; an S1 interface message; an Xn interface message; and/or an X2 interface message.

In an example, the parent access node (e.g., IAB-node) may receive, from the second access node (e.g., IAB-donor), the at least one first message comprising the first radio resource configuration parameters indicating whether the flexible resources are allowed to be activated for the cell (e.g. the first cell and/or at least one of the one or more first child cells of the first access node). The first access node (e.g. IAB-node) served by the parent access node may serve the cell. In an example the first radio resource configuration parameters may further indicate whether the flexible resources are allowed to be activated for the first access node.

In an example, the at least one first message may be transmitted via an F1 interface (e.g. Xn interface, X2 interface, N2 interface, S1 interface) between the parent access node and the second access node. The at least one first message may be transmitted via a Uu interface between the parent access node and the second access node (and/or a parent node of the parent access node). In an example, the at least one first message may be at least one of an F1 interface message (e.g. Xn interface message, X2 interface message, N2 interface message, S1 interface message) and/or a radio resource control (RRC) message. In an example, the at least one first message may comprise at least one of an F1 setup response message, a gNB-DU configuration update acknowledge message, a gNB-CU configuration update message, a gNB-DU resource coordination request message, a UE context setup request message, a UE context modification request message, a UE context modification confirm message, and/or the like. In an example, the at least one first message may comprise at least one of an RRC reconfiguration message, an RRC reestablishment message, an RRC setup message, an RRC resume message, at least one system information block, and/or the like.

In an example, the parent access node may transmit, to the second access node, at least one first response message in response to receiving the at least one first message. The at least one first response message may indicate configuration completion of the first resource configuration parameters of the at least one first message at the parent access node (e.g., completion of applying the first resource configuration parameters by the parent access node). The at least one first response message may be at least one of an F1 interface message (e.g. Xn interface message, X2 interface message, N2 interface message, S1 interface message) and/or a radio resource control message. In an example, the at least one first response message may comprise at least one of a gNB-DU configuration update message, a gNB-CU configuration update acknowledge message, a gNB-DU resource coordination response message, a UE context setup response message, a UE context modification response message, a UE context modification required message, and/or the like. In an example, the at least one first response message may comprise one or more RRC complete messages (e.g., RRC reconfiguration complete message, RRC reestablishment complete message, RRC setup complete message, RRC resume complete message, and/or the like). The at least one first response message may further comprise at least one RRC acknowledge/response message. In an example, the at least one first response message may comprise at least one of: an uplink RRC message, a relay node reconfiguration complete message, and/or the like. The at least one first response message may indicate whether one or more elements (e.g. one or more of radio resource control configuration parameters of the cell) of the at least one first message are successfully configured by the parent access node. The at least one first response message may indicate whether a bearer is successfully established by the parent access node.

In an example, the at least one first message (e.g. received by the parent access node from the second access node) may further comprise at least one of: a UE identifier (e.g., TMSI, C-RNTI, F1 UE identifier, NG UE identifier, IMSI) of the parent access node/the first access node, a cell identifier (e.g., physical cell identifier, PCI, global cell identifier, GCI, CGI) of one or more cells (e.g. one of the one or more child cells served by the parent access node and/or one of the one or more first child cell served by the first access node), cell information (e.g., cell index, cell group configuration, radio link failure timers and constants, RLM in-sync/out-of-sync threshold, reconfiguration with sync comprising t304 value, RACH configuration parameters comprising a preamble index and/or RACH resources, carrier frequency information, bandwidth part configuration parameters, beam configuration parameters of SS beam and/or CSI-RS beam, transmission power configuration parameter comprising p-MAX/p-MgNB/p-SgNB, and/or the like) of the one or more cells (e.g. one of the one or more child cells served by the parent access node and/or one of the one or more first child cell served by the first access node), a bearer identifier of a bearer for the parent access node (e.g., and/or for the first access node and/or one or more wireless devices), a logical channel identifier (index) of the bearer, a PDU session identifier of the bearer, a QoS flow identifier of the bearer, an IAB-node identifier of the parent access node (e.g. and/or of the second access node, the first access node), an IAB-donor identifier of the second access node, and/or the like.

In an example, radio resource control configuration parameters received by the parent access node via the at least one first message may indicate that the bearer (e.g. the logical channel) is for an ultra-reliable and low-latency communication (URLLC) service. In an example, the radio resource control configuration parameters may comprise QoS information of the bearer (e.g. the logical channel). The QoS information of the bearer may indicate that the bearer requires low latency and/or high reliability. The QoS information of the bearer may comprise a required latency (e.g. 1 ms), a required packet loss rate (e.g. 0.0001%), a required data throughput (e.g. 100 Mbps), a priority value (e.g. highest priority, priority 0), a required jitter level, and/or the like.

In an example, the at least one first message may further comprise at least one of an rrc-transactionidentifier information element (IE), a radio resource configuration dedicated IE comprising one or more radio resource configuration parameters, measurement configuration parameters, mobility control information parameters, one or more NAS layer parameters, security parameters, antenna information parameters, secondary cell addition/modification parameters, secondary cell release parameters, WLAN configuration parameters, WLAN offloading configuration parameters, LWA configuration parameters, LWIP configuration parameters, RCLWI configuration parameters, sidelink configuration parameters, V2X configuration parameters, uplink transmission power configuration parameters (e.g. p-MAX, p-MeNB, p-SeNB), a power control mode information element, secondary cell group configuration parameters, and/or the like.

In an example, the first resource configuration parameters of the at least one first message may further comprise resource parameters of the flexible resources. The resource parameters of the flexible resources may comprise at least one of a time offset, a subframe index, a slot index, a time duration, a time period, a frequency offset, a subcarrier index, a bandwidth, a bandwidth part index of a bandwidth part for the flexible resources, a beam index of a beam for the flexible resources, an uplink indicator of an uplink for the flexible resources, a downlink indicator of an downlink for the flexible resources, and/or the like. The parent access node may determine resource blocks of the flexible resources based on the resource parameters of the flexible resources. The parent access node may determine beams and/or bandwidth part allowed (or not allowed) to activate the flexible resources based on the beam index and/or the bandwidth part index. The parent access node may determine the uplink and/or the downlink allowed (or not allowed) to activate the flexible resources based on the uplink indicator and/or the downlink indicator. The resource parameters of the flexible resources may further comprise at least one of an IAB-node identifier (e.g. gNB identifier, gNB-DU identifier, base station identifier, UE identifier, MT identifier) indicating an IAB-node, a cell identifier (e.g. physical cell identifier, global cell identifier, cell index) indicating a cell, and/or the like. The parent access node may determine an access node (e.g., the parent access node, the first access node) allowed (or not allowed) to activate the flexible resources based on the IAB-node identifier. The parent access node may determine a cell (e.g. the one or more first child cells served by the first access node and/or the one or more child cells served by the parent access node) allowed (or not allowed) to be activated with the flexible resources based on the cell identifier.

In an example, the first resource configuration parameters of the at least one first message may further indicate whether uplinks (e.g. comprising a supplementary uplink) and/or downlinks of a group of cells/BWPs of cells/beams of cells (e.g., served by one or more IAB-nodes) are allowed or not allowed to be activated with the flexible resources. In an example, the first resource configuration parameters may further indicate at least one of: whether the flexible resources are allowed to be activated for an uplink of the cell (e.g. the first cell, the one or more first child cells served by the first access node, and/or the one or more child cells served by the parent access node); whether the flexible resources are allowed to be activated for a downlink of the cell (e.g. the first cell, the one or more first child cells served by the first access node, and/or the one or more child cells served by the parent access node); and/or the like.

In an example, the first resource configuration parameters of the at least one first message may further comprise a resource index indicating/identifying the flexible resources. The parent access node may transmit the resource index to activate or deactivate the flexible resources for a child node (e.g., the first access node). An activation indication or a deactivation indication for the flexible resources may comprise the resource index indicating the flexible resources. An activation indication or a deactivation indication for the flexible resources may be scrambled with the resource index (e.g. RNTI) indicating the flexible resources.

In an example, the parent access node may or may not employ the flexible resources for a serving cell (e.g. the one or more child cells served by the parent access node and/or a cell serving the first access node and/or one or more wireless devices served by the parent access node). In an example, the parent access node may transmit/receive, to/from a wireless device (e.g., comprising the first access node), downlink/uplink transport blocks via the flexible resources (e.g. on a cell served by the parent access node).

The parent access node may determine, based on the first resource configuration parameters of the at least one first message received from the second access node, to activate (or deactivate) the flexible resources for at least one of the first cell (of the first access node), the first access node, the beam of the first cell, the BWP of the first cell, the uplink of the first cell, and/or the downlink of the first cell. Based on the determination, the parent access node may transmit, to the first access node, an activation indication (or a deactivation indication) of the flexible resources for the at least one of the first cell (of the first access node), the first access node, the beam of the first cell, the BWP of the first cell, the uplink of the first cell, and/or the downlink of the first cell.

The first access node may receive, from the parent access node (e.g., via a physical downlink control channel (PDCCH)), a downlink control information (e.g. the activation indication) (e.g., DCI, MAC CE, and/or other physical or MAC layer indication) indicating activation of the flexible resources for the cell. The downlink control information may indicate/comprise at least one of: the resource index of the flexible resources and/or the cell index (e.g., carrier index, carrier indication field) of the cell (e.g., served by the first access node; the first cell and/or the one or more first child cells). In an example, the first access node may receive the downlink control information via a physical layer (e.g., DCI), a MAC layer (e.g., MAC CE), and/or an RRC layer (e.g., RRC message). In an example, the first access node may receive, from the parent access node, the downlink control information via a cell (e.g. a parent cell of the first access node) served by the parent access node.

In an example, the parent access node may transmit, to the first child access node, the downlink control information (e.g. the activation indication) to activate the flexible resources for at least one of: a BWP of the cell, a beam of the cell, an uplink of the cell, a downlink of the cell, the cell, the first access node, and/or the like.

In an example, the downlink control information (e.g. the activation indication) may further comprise at least one of: a beam index indicating a beam of the cell for the flexible resources to activate the flexible resources for the beam; a bandwidth part (BWP) index indicating a bandwidth part of the cell to activate the flexible resources for the bandwidth part; a field (e.g., uplink indicator) indicating an uplink of the cell to activate the flexible resources for the uplink; and/or a field (e.g., downlink indicator) indicating a downlink of the cell to activate the flexible resources for the downlink. In an example, the downlink control information may further comprise a field (e.g., 1 bit) indicating that the activation (or the deactivation) of the flexible resources is for a child link of the first access node. In an example, the cell index of the downlink control information may be a carrier indicator field (e.g. 3bits) indicating the cell. In an example, the cell index of the downlink control information may be at least one of a cell identifier (e.g. physical cell identifier, PCI, global cell identifier, CGI, GCI), a carrier index, a carrier indicator field (e.g. a cell index uniquely assigned in a scheduling group associated with a cell via which the downlink control information is transmitted from the parent access node to the first access node), a scrambling code employed to scramble the downlink control information, and/or the like.

In an example, the downlink control information may be scrambled with at least one of: the resource index of the flexible resources; the cell index (e.g., carrier index, carrier indicator field) of the cell; the beam index of the beam for the flexible resources; and/or the BWP index of the bandwidth part for the flexible resources. In an example, the resource index may comprise a scrambling code (e.g. RNTI) employed to scramble the activation indication or a deactivation indication. In an example, at least one of the cell index, the beam index, or the bandwidth part index may comprise a scrambling code (e.g. RNTI) employed to scramble the activation indication or a deactivation indication.

When receiving the downlink control information (e.g. the activation indication) comprising the resource index (e.g. and/or when receiving the downlink control information scrambled with the resource index (the scrambling code)) for the flexible resources, the first access node may activate the flexible resources for the cell, the BWP of the cell, the beam of the cell, the uplink of the cell, the downlink of the cell, and/or for the first access node (e.g., based on the configuration parameters received via the at least one message comprising the resource index and/or based on the cell index of the cell, the beam index of the beam, the BWP index of the BWP, the uplink indicator of the uplink, the downlink indicator of the downlink included in the configuration parameters of the at least one message).

The first access node may transmit, to a wireless device, transport blocks (e.g. downlink transport blocks) via the flexible resources of the cell. The downlink control information indicating activation (and/or deactivation) of the flexible resources may comprise at least one of a PDCCH DCI, MAC CE, and/or other physical or MAC layer indication field. The first access node may transmit, to a wireless device, transport blocks (e.g., downlink transport blocks) via the flexible resources of the beam, the BWP, and/or the downlink of the cell (e.g., as indicated via the downlink control information).

In an example, the first access node may transmit, to a wireless device, a resource grant indication (e.g., uplink resource grant indication) indicating uplink resources (e.g., of the cell, the beam, the BWP, and/or the uplink of the cell (e.g., as indicated via the downlink control information)). The flexible resources may comprise the uplink resources. In an example, the first access node may transmit, to a wireless device, a resource activation indication indicating configured grant resources (e.g., grant free resources, periodic resources, semi-persistent resource, configured grant type1/ type2) (e.g., of the cell, the beam, the BWP, and/or the uplink of the cell (e.g. as indicated via the downlink control information)). The flexible resources may comprise the configured grant resources. The first access node may receive, from the wireless device, transport blocks via the uplink resources and/or the configured grant resources.

In an example, the first access node may receive, from the parent access node, a second downlink control information indicating deactivation of the flexible resources. The second downlink control information may comprise at least one of: the resource index of the flexible resources; the cell index (e.g., carrier index, carrier indication field) of the cell; a beam index of a beam for the flexible resources; and/or a bandwidth part index of a bandwidth part for the flexible resources. In an example, the first access node may receive, from the parent access node, the second downlink control information via a parent cell controlled by the parent access node to serve the first access node.

The first access node may receive, from the parent access node (e.g., via a physical downlink control channel (PDCCH)), a second downlink control information (e.g. the deactivation indication) (e.g., DCI, MAC CE, and/or other physical or MAC layer indication) indicating deactivation of the flexible resources for the cell. The second downlink control information may indicate/comprise at least one of: the resource index of the flexible resources and/or the cell index (e.g., carrier index, carrier indication field) of the cell (e.g., served by the first access node; the first cell and/or the one or more first child cells). In an example, the first access node may receive the second downlink control information via a physical layer (e.g., DCI), a MAC layer (e.g., MAC CE), and/or an RRC layer (e.g., RRC message). In an example, the first access node may receive, from the parent access node, the second downlink control information (e.g. the deactivation indication) via a cell (e.g. a parent cell of the first access node) served by the parent access node.

In an example, the second downlink control information may further comprise at least one of: a beam index indicating a beam of the cell for the flexible resources to deactivate the flexible resources for the beam; a bandwidth part (BWP) index indicating a bandwidth part of the cell to deactivate the flexible resources for the bandwidth part; a field (e.g., uplink indicator) indicating an uplink of the cell to deactivate the flexible resources for the uplink; and/or a field (e.g., downlink indicator) indicating a downlink of the cell to deactivate the flexible resources for the downlink. In an example, the second downlink control information may further comprise a field (e.g., 1 bit) indicating that the deactivation of the flexible resources is for a child link of the first access node. In an example, the cell index of the second downlink control information may be a carrier indicator field (e.g. 3bits) indicating the cell. In an example, the cell index of the second downlink control information may be at least one of a cell identifier (e.g. physical cell identifier, PCI, global cell identifier, CGI, GCI), a carrier index, a carrier indicator field (e.g. a cell index uniquely assigned in a scheduling group associated with a cell via which the second downlink control information is transmitted from the parent access node to the first access node), a scrambling code employed to scramble the second downlink control information, and/or the like.

In an example, the second downlink control information may be scrambled with at least one of: the resource index of the flexible resources; the cell index (e.g., carrier index, carrier indicator field) of the cell; the beam index of the beam for the flexible resources; and/or the BWP index of the bandwidth part for the flexible resources. In an example, the resource index may comprise a scrambling code (e.g. RNTI) employed to scramble the deactivation indication. In an example, at least one of the cell index, the beam index, or the bandwidth part index may comprise a scrambling code (e.g. RNTI) employed to scramble the deactivation indication.

In an example, the deactivation indication transmitted by the first access node to deactivate the flexible resources may further comprise the resource index (e.g., and/or may be scrambled with the resource index) for the flexible resources. When receiving the deactivation indication comprising the resource index (e.g. and/or when receiving the deactivation indication scrambled with the resource index (the scrambling code)) for the flexible resources, the first access node may deactivate the flexible resources (e.g., based on the configuration parameters received via the at least one message comprising the resource index and/or based on the cell index of the cell, the beam index of the beam, the BWP index of the BWP, the uplink indicator of the uplink, the downlink indicator of the downlink included in the configuration parameters of the at least one message). Based on deactivating the flexible resources, the first access node may stop transmitting transport block via the flexible resources of the cell, the BWP, the beam, and/or the downlink corresponding to the deactivation indication. Based on deactivating the flexible resources, the first access node may stop allocating uplink/sidelink resources on the flexible resources of the cell, the BWP, the beam, and/or the uplink corresponding to the deactivation indication.

In an example, a first access node may receive, from a second access node, at least one message comprising configuration parameters indicating flexible resources for the first access node. The configuration parameters may comprise at least one of: a resource index (e.g., uniquely assigned for multiple cells of the first access node) of the flexible resources; and/or a cell index(s) (e.g., carrier index, carrier indication field, BWP index of BWP, beam index of beam, indication of uplink/downlink) of a cell(s) configured with the flexible resources. The first access node may receive, from a parent access node (e.g. via a physical downlink control channel), a downlink control information indicating activation of the flexible resources for the cell (e.g. the BWP, the beam, the uplink, the downlink). The downlink control information may indicate the resource index of the flexible resources. The first access node may transmit, to a wireless device, transport blocks via the flexible resources of the cell. In an example, the parent access node may receive, from the second access node, at least one message comprising second configuration parameters indicating the flexible resources for the first access node. The second configuration parameters may comprise at least one of: the resource index of the flexible resources; the cell index (e.g., carrier index, carrier indication field, BWP index of BWP, beam index of beam, indication of uplink/downlink) of a cell configured with the flexible resources; and/or an identifier of the first access node. The first access node may further receive, from the parent access node (e.g. via a physical downlink control channel), a second downlink control information indicating deactivation of the flexible resources for the cell (e.g. the BWP, the beam, the uplink, the downlink). The second downlink control information may comprise the resource index. The first access node may stop employing/using the flexible resources in response to receiving the second downlink control information.

In an example, a parent access node may receive, from a second access node, at least one message comprising configuration parameters indicating flexible resources for a first access node. The configuration parameters may comprise at least one of: a resource index of the flexible resources; and/or a cell index (e.g., carrier index, carrier indication field, BWP index of BWP, beam index of beam, indication of uplink/downlink) of a cell configured with the flexible resources. The parent access node may transmit, to the first access node (e.g., via a physical downlink control channel), a downlink control information indicating activation of the flexible resources for the cell. The downlink control information may indicate the resource index of the flexible resources. The first access node may transmit, to a wireless device, transport blocks via the flexible resources of the cell.

Figure 50:
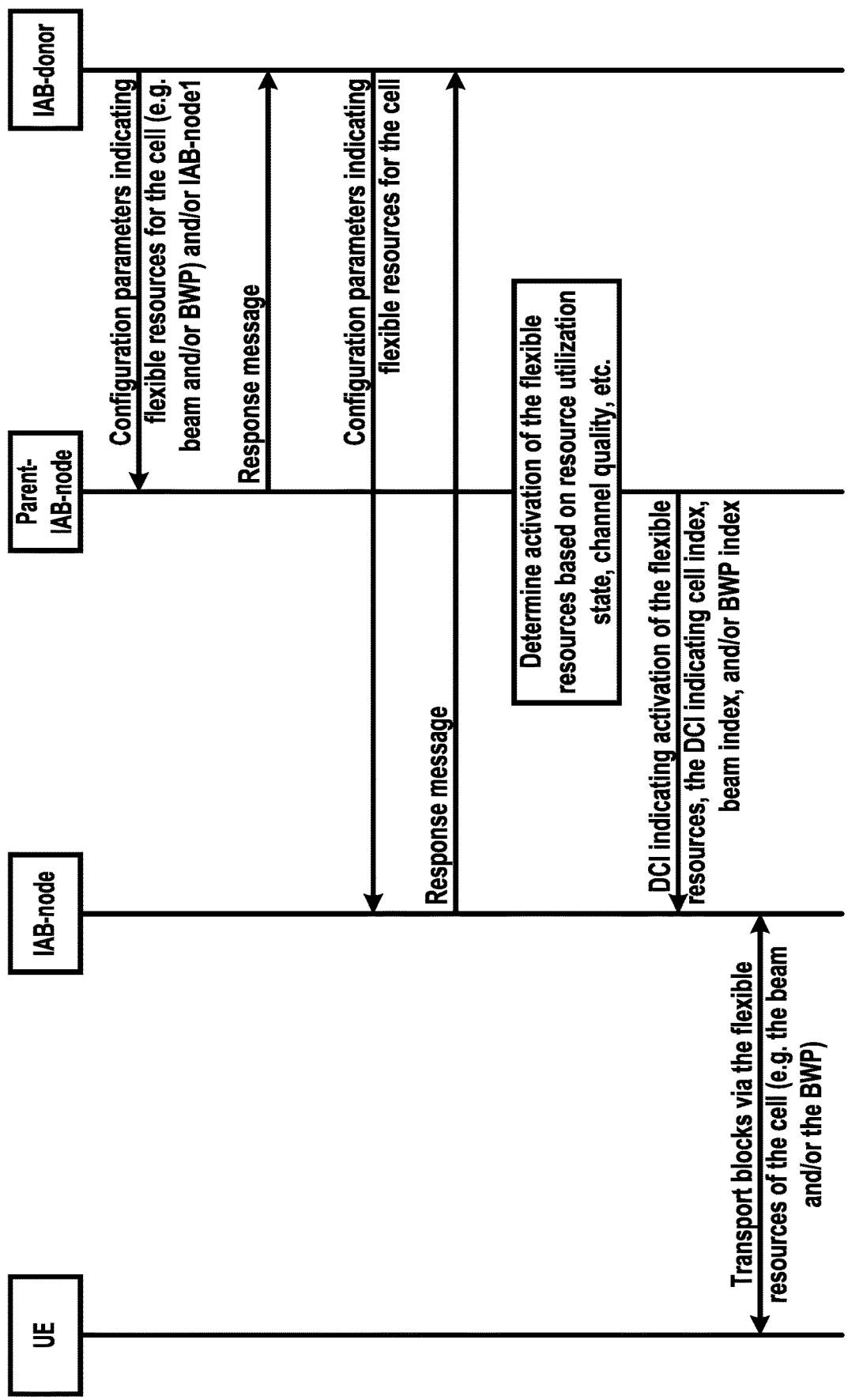
FIG. 50 is an example diagram of an aspect of an embodiment of the present disclosure.
Figure 51:
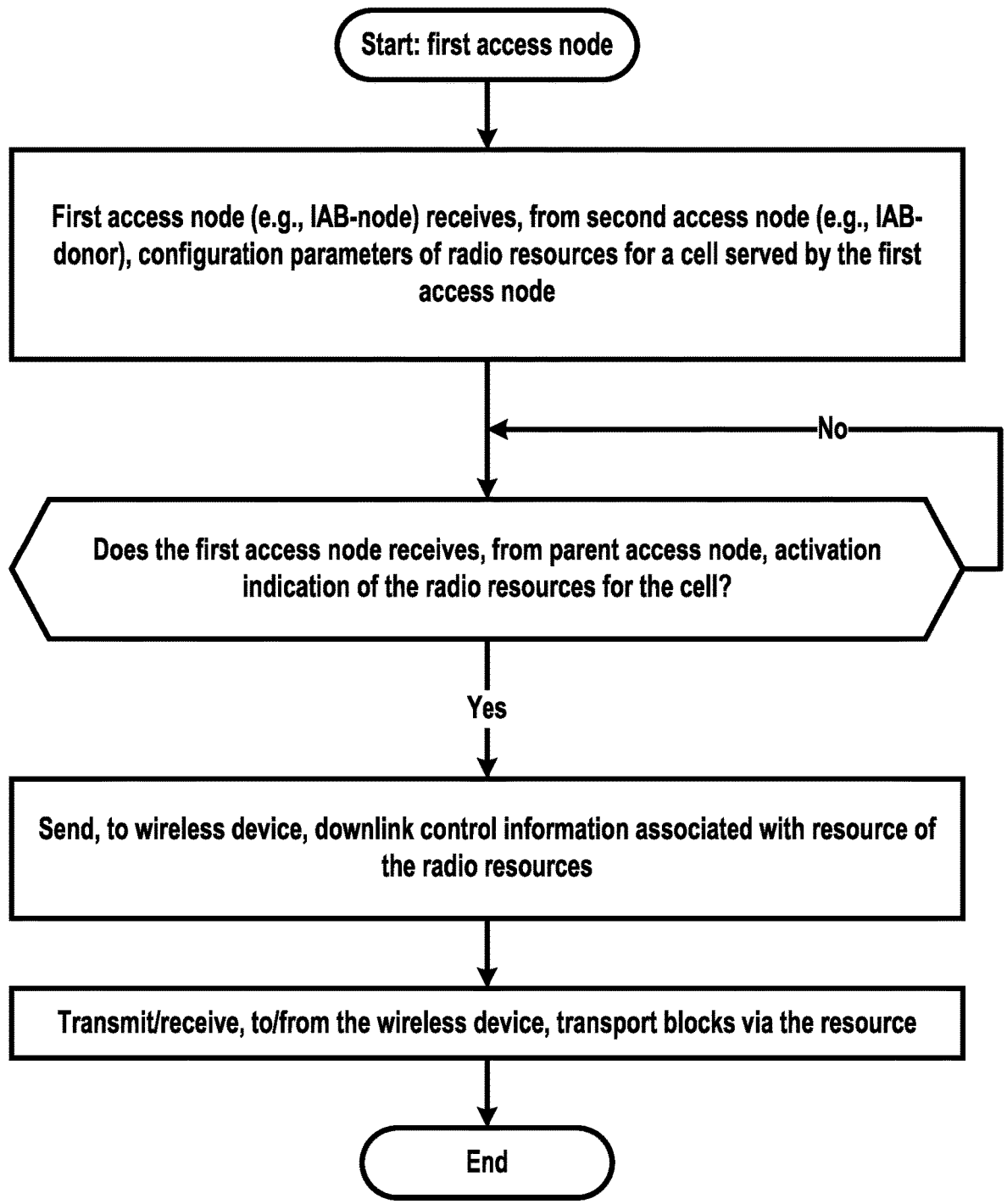
FIG. 51 is an example diagram of an aspect of an embodiment of the present disclosure.
Figure 52:
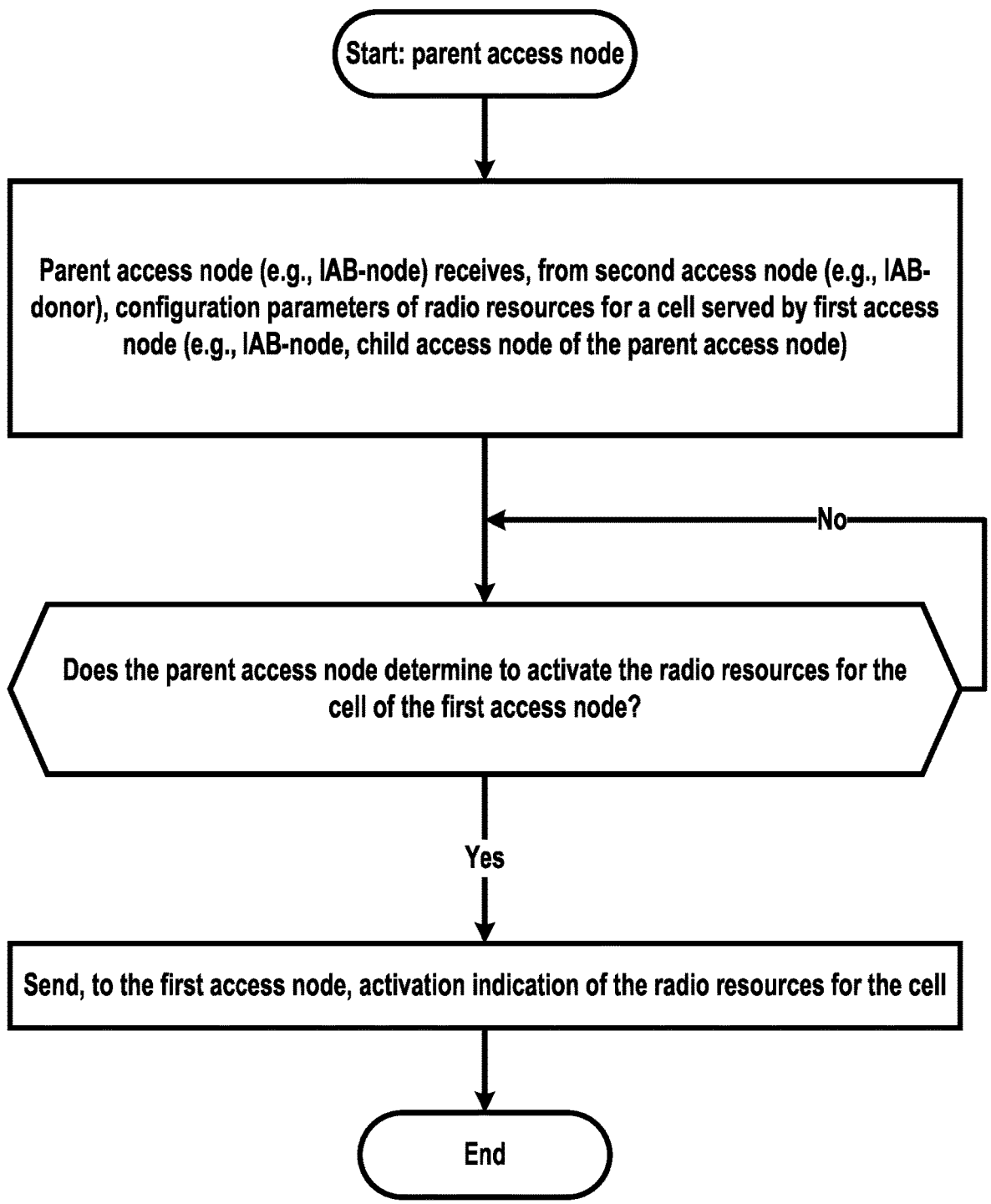
FIG. 52 is an example diagram of an aspect of an embodiment of the present disclosure.

In an example, as shown in FIG. 50, FIG. 51, and/or FIG. 52, a first access node may receive, from a second access node, at least one message comprising configuration parameters indicating flexible resources for a cell served (e.g. controlled, operated, managed) by the first access node. The first access node may receive, from a parent access node (e.g., via a physical downlink control channel (PDCCH)), a downlink control information (DCI) indicating activation of the flexible resources for the cell. The downlink control information may indicate at least one of: a resource index of the flexible resources and/or a cell index (e.g., carrier index, carrier indication field) of the cell. The first access node may transmit, to a wireless device, transport blocks via the flexible resources of the cell.

In an example, the configuration parameters may further comprise resource parameters of the flexible resources. The resource parameters of the flexible resources may comprise at least one of: a time offset; a subframe index; a slot index; a time duration; a time period; a frequency offset; a subcarrier index; a bandwidth; a bandwidth part; and/or a beam index of a beam.

In an example, the configuration parameters may further comprise at least one of: a cell identifier of the cell; the cell index of the cell; a carrier indicator field (e.g. 3bits) of the cell; mapping information of the cell identifier and the cell index; mapping information of the carrier indicator field and the cell index; and/or mapping information of the cell identifier and the carrier indicator field.

In an example, as shown in FIG. 47, FIG. 48, and/or FIG. 49, the configuration parameters may further comprise at least one of: a cell index (identifier) of a parent cell served by the parent access node; one or more cell indexes (index, identifier, carrier indicator field) of one or more cells of the first access node; mapping information between the parent cell and the one or more cells; and/or the like. The one or more cells may be a scheduling group for the flexible resources. The scheduling group may be scheduled by the parent cell for the flexible resources. The one or more cells may be activated/deactivated with the flexible resources by the parent cell. The one or more cell indexes may be identifiable/unique in the scheduling group. In an example, if the first access node receives an activation/deactivation indication comprising a cell index (e.g., uniquely assigned in the scheduling group) via the parent cell, the first access node may activate/deactivate the flexible resources for a cell determined in the scheduling group, which is scheduled by the parent cell, based on the cell index (e.g., the cell index uniquely assigned in the scheduling group)). In an example, if the number of child cells in the scheduling group is 8, the size of the cell index for the scheduling group may be 3bits.

In an example, the configuration parameters may further indicate at least one of: a beam index indicating a beam of the cell for the flexible resources; a bandwidth part index indicating a bandwidth part of the cell for the flexible resources; an uplink of the cell for the flexible resources; and/or a downlink of the cell for the flexible resources.

In an example, the downlink control information may further comprise at least one of: a beam index indicating a beam of the cell for the flexible resources to activate the flexible resources for the beam; a bandwidth part index indicating a bandwidth part of the cell to activate the flexible resources for the bandwidth part; a field indicating an uplink of the cell to activate the flexible resources for the uplink; and/or a field indicating a downlink of the cell to activate the flexible resources for the downlink. In an example, the downlink control information may further comprise a field (e.g., 1 bit) indicating that the activation/deactivation of the flexible resources is for a child link of the first access node. In an example, the cell index of the downlink control information may be a carrier indicator field (e.g. 3bits) indicating the cell.

In an example, the first access node may receive the at least one message via the parent access node.

In an example, the first access node may transmit, to a wireless device, at least one of: a resource grant indication indicating uplink resources, wherein the flexible resources may comprise the uplink resources; and/or a resource activation indication indicating configured grant resources, wherein the flexible resources may comprise the configured grant resources. The first access node may receive, from the wireless device, transport blocks via the uplink resources and/or the configured grant resources.

In an example, the first access node may be an IAB-node. The second access node may be an IAB-donor. The parent access node may be an IAB-node. The first access node may be a child node (e.g., child IAB-node) of the parent access node. The first access node may be a base station distributed unit (e.g., gNB-DU) for the wireless device. The second access node may be a base station central unit (e.g., gNB-CU) for at least one of the first access node, the parent access node, and/or the wireless device. The parent access node may be a base station distributed unit (e.g., gNB-DU) for the first access node.

In an example, the at least one message may comprise at least one of: an F1 interface message; a radio resource control message; an N2 interface message; an S1 interface message; an Xn interface message; and/or an X2 interface message.

In an example, the parent access node may receive, from the second access node, at least one first message comprising first resource configuration parameters indicating the flexible resources for the cell served by the first access node. The parent access node may transmit, to the first access node, the downlink control information based on the at least one first message. The first resource configuration parameters of the at least one first message may further comprise at least one of: the resource index of the flexible resources; the cell index (e.g., carrier index, carrier indication field) of the cell configured with the flexible resources; an identifier of the first access node; a beam index of a beam for the flexible resources; and/or a bandwidth part index of a bandwidth part for the flexible resources. In an example, the at least one first message may comprise at least one of: an F1 interface message; a radio resource control message; an N2 interface message; an S1 interface message; an Xn interface message; and/or an X2 interface message.

In an example, the first access node may receive, from the parent access node, the downlink control information via a first cell (e.g. parent cell of the first access node) served by the parent access node.

In an example, the parent access node may transmit/receive, to/from one or more wireless devices, transport blocks via the flexible resources on a first cell served by the parent access node.

In an example, the downlink control information may be scrambled with at least one of: the resource index of the flexible resources; the cell index (e.g., carrier index, carrier indication field) of the cell; a beam index of a beam for the flexible resources; and/or a bandwidth part index of a bandwidth part for the flexible resources. In an example, the resource index may comprise a scrambling code (e.g. RNTI) employed to scramble the activation indication or a deactivation indication. In an example, at least one of the cell index, the beam index, or the bandwidth part index may comprise a scrambling code (e.g. RNTI) employed to scramble the activation indication or a deactivation indication.

In an example, the first access node may receive, from the parent access node, a second downlink control information indicating deactivation of the flexible resources. The second downlink control information may comprise at least one of: the resource index of the flexible resources; the cell index (e.g., carrier index, carrier indication field) of the cell; a beam index of a beam for the flexible resources; and/or a bandwidth part index of a bandwidth part for the flexible resources.

In an example, the first access node may receive, from the parent access node, the downlink control information via a parent cell controlled by the parent access node to serve the first access node.

In an example, a parent access node may receive, from a second access node, at least one message comprising configuration parameters indicating flexible resources for a cell served by a first access node. The parent access node may transmit, to the first access node (e.g. via a physical downlink control channel), a downlink control information indicating activation/deactivation of the flexible resources for the cell. The downlink control information may indicate at least one of: a resource index of the flexible resources; and/or a cell index (e.g., carrier index, carrier indication field) of the cell. The first access node may transmit, to a wireless device, transport blocks via the flexible resources of the cell.

In an example, a first access node may receive, from a second access node, at least one message comprising configuration parameters indicating flexible resources for the first access node. The configuration parameters may comprise at least one of: a resource index of the flexible resources; and/or a cell index (e.g., carrier index, carrier indication field, BWP index of BWP, beam index of beam, indication of uplink/downlink) of a cell configured with the flexible resources. The first access node may receive, from a parent access node (e.g. via a physical downlink control channel), a downlink control information indicating activation of the flexible resources for the cell (e.g. the BWP, the beam, the uplink, the downlink). The downlink control information may indicate the resource index of the flexible resources. The first access node may transmit, to a wireless device, transport blocks via the flexible resources of the cell. In an example, the parent access node may receive, from the second access node, at least one message comprising second configuration parameters indicating the flexible resources for the first access node. The second configuration parameters may comprise at least one of: the resource index of the flexible resources; the cell index (e.g., carrier index, carrier indication field, BWP index of BWP, beam index of beam, indication of uplink/downlink) of a cell configured with the flexible resources; and/or an identifier of the first access node.

In an example, a parent access node may receive, from a second access node, at least one message comprising configuration parameters indicating flexible resources for a first access node. The configuration parameters may comprise at least one of: a resource index of the flexible resources; and/or a cell index (e.g., carrier index, carrier indication field, BWP index of BWP, beam index of beam, indication of uplink/downlink) of a cell configured with the flexible resources. The parent access node may transmit, to the first access node (e.g., via a physical downlink control channel), a downlink control information indicating activation of the flexible resources for the cell. The downlink control information may indicate the resource index of the flexible resources. The first access node may transmit, to a wireless device, transport blocks via the flexible resources of the cell.

In an example, as shown in FIG. 53, a first access node may receive, from a second access node, at least one message. A first child access node of the first access node may comprise a first cell. A second child access node of the first access node may comprise a second cell. The at least one message may comprise configuration parameters indicating whether radio resources are allowed to be used for the first cell and the second cell at a same time. The first access node may determine, based on the configuration parameters, to activate the radio resources for at least one of the first cell and the second cell. The first access node may transmit, to at least one of the first child access node and the second child access node and based on the determining, an activation indication of the radio resources for the at least one of the first cell and the second cell. The at least one of the first child access node and the second child access node may transmit, to at least one wireless device and based on the activation indication, transport blocks via the radio resources via the at least one of the first cell and the second cell.

In an example, if the radio resources are allowed to be used for the first cell and the second cell at the same time (e.g., simultaneously, in an overlapping time duration, etc.), the first access node may transmit, to one of the first child node and the second child node, the activation indication of the radio resources for one of the first cell and the second cell that is associated with the one of the first child node and the second child node, and may not transmit, to the other one of the first child node and the second child node, the activation indication.

In an example, the at least one of the first child access node and the second child access node may transmit/send, to at least one wireless device and based on the activation indication, at least one of: a resource grant indication indicating uplink resources; a resource activation indication indicating configured grant resources; and/or the like. The radio resources may comprise the uplink resources. The radio resources may comprise the configured grant resources. The at least one of the first child access node and the second child access node may receive, from the at least one wireless device, transport blocks via the uplink resources and/or the configured grant resources. The first access node may transmit, to the at least one of the first child access node and the second child access node, a deactivation indication of the radio resources for the at least one of the first cell and the second cell.

In an example, the first access node may be an integrated access and backhaul node. The second access node may be an integrated access and backhaul donor. The first child access node and/or the second child access node may be an integrated access and backhaul node. The first access node may be a parent node of at least one of: the first child access node; the second child access node; and/or the like. The first access node may be a base station distributed unit for at least one of: the first child access node; the second child access node; and/or the like. The second access node may be a base station central unit for at least one of: the first access node; the first child access node; the second child access node; at least one wireless device served by at least one of the first child access node or the second child access node; and/or the like. The first child access node and/or the second child access node may be a base station distributed unit for a wireless device served by at least one of the first child access node and/or the second child access node.

In an example, the configuration parameters may comprise resource parameters of the radio resources. The resource parameters of the radio resources may comprise at least one of: a time offset; a subframe index; a slot index; a time duration; a time period; a frequency offset; a subcarrier index; a bandwidth; a bandwidth part; a beam index of a beam; and/or the like.

In an example, the configuration parameters may indicate at least one of: whether the radio resources are allowed to be activated for a first bandwidth part of the first cell and for a second bandwidth part of the second cell in an overlapping time duration; whether the radio resources are allowed to be activated for a first bandwidth part of the first cell and for the second cell in an overlapping time duration; whether the radio resources are allowed to be activated for the first cell and for a second bandwidth part of the second cell in an overlapping time duration; whether the radio resources are allowed to be activated for a first beam of the first cell and for a second beam of the second cell in an overlapping time duration; whether the radio resources are allowed to be activated for a first beam of the first cell and for the second cell in an overlapping time duration; whether the radio resources are allowed to be activated for the first cell and for a second beam of the second cell in an overlapping time duration; and/or the like.

In an example, the configuration parameters may indicate that the first cell and the second cell are neighboring to each other. The configuration parameters may indicate that a first beam of the first cell and a second beam of the second cell are neighboring to each other. The configuration parameters may indicate at least one of: the first cell and a second beam of the second cell are neighboring to each other; a first beam of the first cell and the second cell are neighboring to each other; and/or the like.

In an example, the at least one message may be at least one of: an F1 interface message; a radio resource control message; an N2 interface message; an S1 interface message; an Xn interface message; an X2 interface message; and/or the like. The first access node may transmit, to the at least one of the first child access node and the second child access node, the activation indication via at least one of: a physical layer indication; a physical downlink control channel; downlink control information; a medium access control control element; and/or the like.

In an example, the first access node may receive, from the second access node, at least one first message comprising first resource configuration parameters indicating the radio resources for the first cell. The first access node may send, to the first child access node, the at least one first message. The at least one first message may be at least one of: an F1 interface message transmitted from the second access node to the first child access node; a radio resource control message transmitted from the second access node to the first child access node; an Xn interface message transmitted from the second access node to the first child access node; and/or the like. The first child access node may communicate, with a wireless device, transport blocks based on the activation indication and/or the at least one first message.

In an example, the first access node may receive, from the second access node, at least one second message comprising second resource configuration parameters indicating the radio resources for the second cell. The first access node may send, to the second child access node, the at least one second message. The at least one second message may be at least one of: an F1 interface message transmitted from the second access node to the second child access node; a radio resource control message transmitted from the second access node to the second child access node; an Xn interface message transmitted from the second access node to the second child access node; and/or the like. The second child access node may communicate, with a wireless device, transport blocks based on the activation indication and/or the at least one second message.

In an example, the transmitting the activation indication may comprise at least one of: transmitting, by the first access node to the first child access node via a third cell of the first access node, a first activation indication of the radio resources for the first cell; transmitting, by the first access node to the second child access node via a fourth cell of the first access node, a second activation indication of the radio resources for the second cell; and/or the like. In an example, the third cell may the fourth cell. The first access node may communicate, with a wireless device, transport blocks via the radio resources.

In an example, the configuration parameters may indicate at least one of: whether the radio resources are allowed to be activated for an uplink of the first cell and for an uplink of the second cell in an overlapping time duration; whether the radio resources are allowed to be activated for a downlink of the first cell and for a downlink of the second cell in an overlapping time duration; whether the radio resources are allowed to be activated for an uplink of the first cell and for a downlink of the second cell in an overlapping time duration; whether the radio resources are allowed to be activated for a downlink of the first cell and for an uplink of the second cell in an overlapping time duration; and/or the like.

In an example, the activation indication of the radio resources may be for at least one of: at least one of a first bandwidth part of the first cell and a second bandwidth part of the second cell; at least one of a first beam of the first cell and a second beam of the second cell; at least one of an uplink of the first cell and an uplink of the second cell; at least one of a downlink of the first cell and a downlink of the second cell; and/or the like.

In an example, the configuration parameters may comprise a resource index indicating the radio resources. The activation indication may comprise the resource index for the radio resources. A deactivation indication to deactivate the radio resources may comprise the resource index for the radio resources. The configuration parameters may comprise a resource index indicating the radio resources. The activation indication may be scrambled with the resource index for the radio resources. A deactivation indication to deactivate the radio resources may be scrambled with the resource index for the radio resources. The resource index may comprise a scrambling code employed to scramble the activation indication or the deactivation indication.

In an example, a first access node may receive, from a second access node, at least one message comprising configuration parameters indicating whether radio resources are allowed to be used for a first cell and a second cell in an overlapping time duration. A first child access node of the first access node may comprise the first cell. A second child access node of the first access node may comprise the second cell. The first access node may determine, based on the configuration parameters, to activate the radio resources for at least one of the first cell and the second cell. The first access node may transmit to at least one of the first child access node and the second child access node and based on the determining, an activation indication of the radio resources for the at least one of the first cell and the second cell.

In an example, a first access node may receive, from a second access node, at least one message. A first child access node of the first access node may comprise a first cell. A second child access node of the first access node may comprise a second cell. The at least one message may comprise configuration parameters indicating whether the first cell and the second cell are neighboring to each other. The first access node may determine, based on the configuration parameters, to activate radio resources for at least one of the first cell and the second cell. The first access node may transmit, to at least one of the first child access node and the second child access node and based on the determining, an activation indication of the radio resources for the at least one of the first cell and the second cell.

In an example, if the first cell and the second cell are neighboring to each other, the first access node may transmit, to one of the first child node and the second child node, the activation indication of the radio resources for one of the first cell and the second cell, which is associated with the one of the first child node and the second child node, and may not transmit, to the other one of the first child node and the second child node, the activation indication. In an example, the configuration parameters may indicate at least one of: whether a first beam of the first cell and a second beam of the second cell are neighboring to each other; whether the first cell and a second beam of the second cell are neighboring to each other; whether a first beam of the first cell and the second cell are neighboring to each other; and/or the like.

In an example, at 5310, a first access node may receive, from a second access node, configuration parameters indicating whether radio resources are allowed to be activated for a first area of a first child access node and a second area of a second child access node in an overlapping time duration. At 5320, the first access node may transmit, to at least one of the first child access node and the second child access node and based on the configuration parameters, an activation indication of the radio resources for the first area or the second area. The first area may comprise a first cell. The second area may comprise a second cell.

In an example, if the radio resources are allowed to be activated/used for the first area and the second area in an overlapping time duration (e.g., at the same time, simultaneously, etc.), the first access node may transmit, to one of the first child node and the second child node, the activation indication of the radio resources for one of the first area and the second area, which is associated with the one of the first child node and the second child node, and may not transmit, to the other one of the first child node and the second child node, the activation indication.

In an example, a first access node may receive, from a second access node, configuration parameters indicating whether radio resources are prevented to be used in a first area and a second area of at least one child node of the first access node in an overlapping time duration. The first access node may transmit, to the at least one child node and based on the configuration parameters, an activation indication of the radio resources for the first area or the second area.

Figure 54:
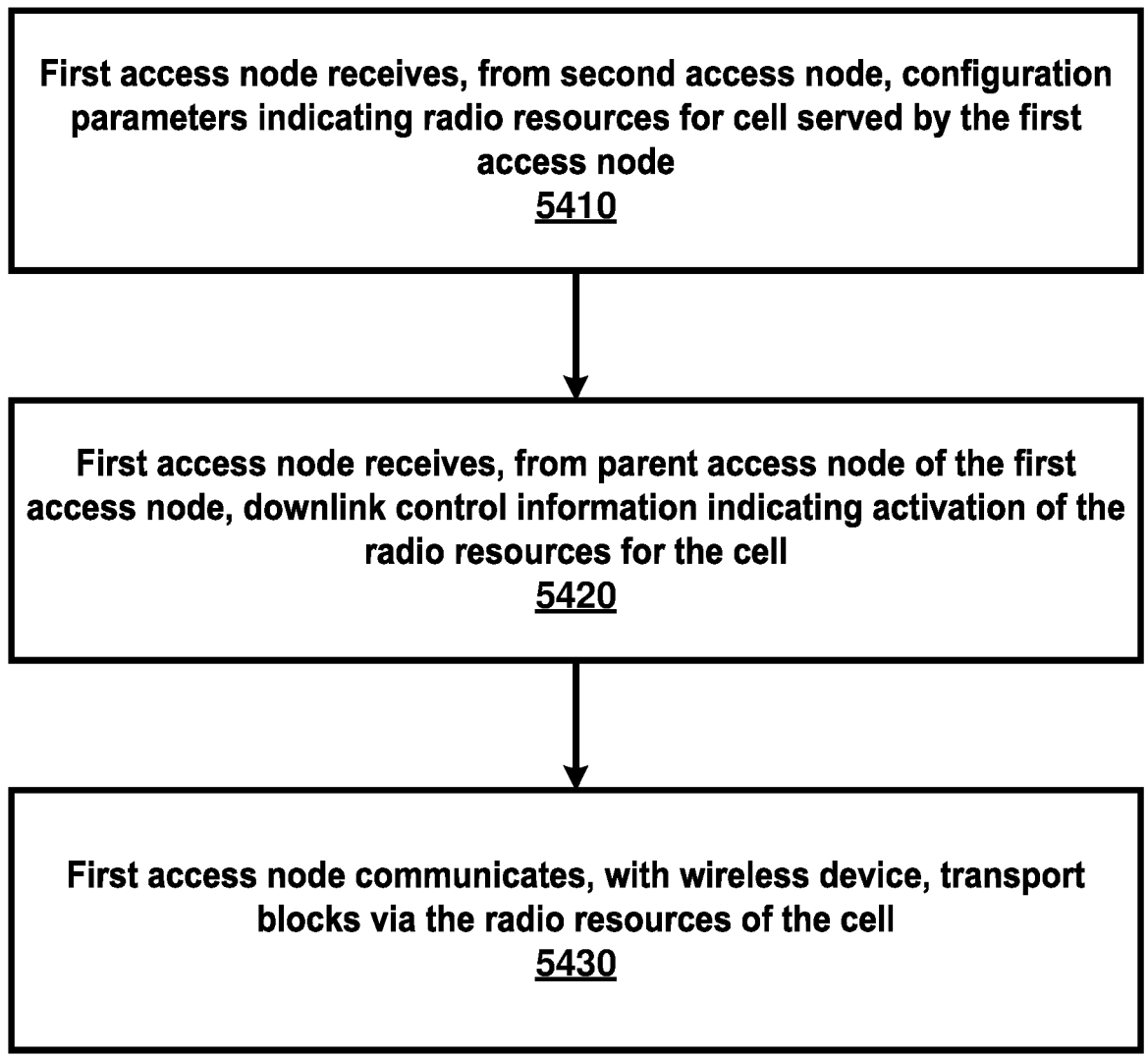
FIG. 54 is an example diagram of an aspect of an embodiment of the present disclosure.

In an example, as shown in FIG. 54, a first access node may receive, from a second access node, at least one message comprising configuration parameters indicating radio resources for a cell served by the first access node. The first access node may receive, from a parent access node via a physical downlink control channel, first downlink control information indicating activation of the radio resources for the cell. The first access node may transmit, to a wireless device, second downlink control information comprising a downlink resource assignment indicating a resource of the radio resources. The first access node may transmit, to the wireless device, a transport block via the resource of the radio resources. The first downlink control information may indicate at least one of: a resource index of the radio resources; a cell index of the cell; and/or the like.

In an example, the configuration parameters may comprise resource parameters of the radio resources. The resource parameters of the radio resources may comprise at least one of: a time offset; a subframe index; a slot index; a time duration; a time period; a frequency offset; a subcarrier index; a bandwidth; a bandwidth part; a beam index of a beam; and/or the like. The configuration parameters may comprise at least one of: a cell identifier of the cell; a cell index of the cell; a carrier indicator field of the cell; mapping information of the cell identifier and the cell index; mapping information of the carrier indicator field and the cell index; mapping information of the cell identifier and the carrier indicator field; and/or the like. The configuration parameters may comprise at least one of: a cell index of a parent cell served by the parent access node; one or more cell indexes of one or more cells of the first access node; and/or the like. The configuration parameters may comprise mapping information between the parent cell and the one or more cells. The one or more cells may be a scheduling group for the radio resources. The scheduling group may be scheduled by the parent cell for the radio resources. The one or more cells may be activated with the radio resources by the parent cell. The one or more cell indexes may be identifiable in the scheduling group. The configuration parameters may indicate at least one of: a beam index indicating a beam of the cell for the radio resources; a bandwidth part index indicating a bandwidth part of the cell for the radio resources; an uplink of the cell for the radio resources; a downlink of the cell for the radio resources; and/or the like. The first downlink control information may comprise at least one of: a beam index indicating a beam of the cell for the radio resources to activate the radio resources for the beam; a bandwidth part index indicating a bandwidth part of the cell to activate the radio resources for the bandwidth part; a field indicating an uplink of the cell to activate the radio resources for the uplink; a field indicating a downlink of the cell to activate the radio resources for the downlink; and/or the like.

In an example, the first downlink control information may comprise a field indicating that the activation is for a child link of the first access node. The first downlink control information may comprise a carrier indicator field indicating a carrier of the cell. The receiving the at least one message may comprise receiving the at least one message via the parent access node. The first access node may transmit, to the wireless device, at least one of: a resource grant indication indicating uplink resources (e.g., the radio resources may comprise the uplink resources); and/or
a resource activation indication indicating configured grant resources (e.g., the radio resources may comprise the configured grant resources). The first access node may receive, from the wireless device, transport blocks via the uplink resources and/or the configured grant resources.

In an example, the first access node may be an integrated access and backhaul node. The second access node may be an integrated access and backhaul donor. The parent access node may be an integrated access and backhaul node. The first access node may be a child node of the parent access node. The first access node may be a base station distributed unit for the wireless device. The second access node may be a base station central unit for at least one of: the first access node; the parent access node; the wireless device; and/or the like. The parent access node may be a base station distributed unit for the first access node. The second access node may be the parent access node. The at least one message may be at least one of: an F1 interface message; a radio resource control message; an N2 interface message; an S1 interface message; an Xn interface message; an X2 interface message; and/or the like.

In an example, the parent access node may receive, from the second access node, at least one first message comprising first resource configuration parameters indicating the radio resources for the cell served by the first access node. The parent access node may transmit, to the first access node, the first downlink control information based on the at least one first message. The first resource configuration parameters of the at least one first message may comprise at least one of: a resource index of the radio resources; a cell index of the cell configured with the radio resources; an identifier of the first access node; a beam index of a beam for the radio resources; a bandwidth part index of a bandwidth part for the radio resources; and/or the like. The at least one first message may be at least one of: an F1 interface message; a radio resource control message; an N2 interface message; an S1 interface message; an Xn interface message; an X2 interface message; and/or the like.

In an example, the first access node may receive, from the parent access node, the first downlink control information via a first cell served by the parent access node. The parent access node may communicate, with one or more wireless devices, transport blocks via the radio resources of a first cell served by the parent access node. The first downlink control information may scrambled with at least one of: a resource index of the radio resources; a cell index of the cell; a beam index of a beam for the radio resources; a bandwidth part index of a bandwidth part for the radio resources; a wireless device identifier of the first access node; and/or the like. The resource index may comprise a scrambling code employed to scramble indication of the activation or deactivation. At least one of the cell index, the beam index, or the bandwidth part index may comprise a scrambling code employed to scramble indication of the activation or deactivation.

In an example, the first access node may receive, from the parent access node, third downlink control information indicating deactivation of the radio resources. The third downlink control information may comprise at least one of: a resource index of the radio resources; a cell index of the cell; a beam index of a beam for the radio resources; a bandwidth part index of a bandwidth part for the radio resources; and/or the like. The receiving the first downlink control information may comprise receiving the first downlink control information via a parent cell controlled by the parent access node to serve the first access node. The configuration parameters of the at least one message may indicate an activation of the radio resources for the cell.

In an example, at 5410, a first access node may receive, from a second access node, configuration parameters indicating radio resources for a cell served by the first access node. At 5420, the first access node may receive, from a parent access node of the first access node, a downlink control information indicating activation of the radio resources for the cell. At 5430, the first access node may communicate, with a wireless device, transport blocks via the radio resources of the cell. The receiving the downlink control information may comprise receiving the downlink control information via at least one of: a medium access control control element (MAC CE); a physical downlink control channel (PDCCH); a radio resource control (RRC) message; an F1 message; and/or the like. The first access node may be a base station distributed unit for the wireless device. The second access node may be an integrated access and backhaul donor. The second access node may be a base station central unit for at least one of: the first access node; the parent access node; the wireless device; and/or the like. The parent access node may be a base station distributed unit for the first access node.

In an example, a parent access node may receive, from a second access node, at least one message comprising configuration parameters indicating radio resources for a cell served by a first access node. The parent access node may transmit, to the first access node, a downlink control information indicating activation of the radio resources for the cell. The first access node may communicate, with a wireless device, transport blocks via the radio resources of the cell. The parent access node may receive, from the second access node, at least one second message comprising second configuration parameters indicating the radio resources for the cell served by the first access node. The parent access node may transmit/forward, to the first access node, the at least one second message.

The receiving the at least one message may comprise receiving the at least one message via at least one of: a medium access control control element (MAC CE); a physical downlink control channel (PDCCH); a radio resource control (RRC) message; an F1 message; and/or the like. The transmitting the downlink control information may comprise transmitting the downlink control information via at least one of: a medium access control control element (MAC CE); a physical downlink control channel (PDCCH); a radio resource control (RRC) message; an F1 message; and/or the like. The first access node may be a base station distributed unit for the wireless device. The second access node may be an integrated access and backhaul donor. The second access node may be a base station central unit for at least one of: the first access node; the parent access node; the wireless device; and/or the like. The parent access node may be a base station distributed unit for the first access node.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C. C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   receiving, by a first child access node from a second access node, a first message comprising configuration parameters indicating radio resources for a cell served by the first child access node, wherein the first child access node receives the first message from the second access node via a first parent access node of the first child access node;
   receiving, by the first child access node from the first parent access node, a downlink control information comprising an activation indication of the radio resources for the cell; and
   communicating, by the first child access node with a wireless device, transport blocks via the radio resources of the cell based on the activation indication and the first message.

2. The method of claim 1, wherein the configuration parameters comprise at least one of:
   a field indicating an uplink of the cell for the radio resources;
   a field indicating a downlink of the cell for the radio resources; or
   a beam index indicating a beam of the cell for the radio resources.

3. The method of claim 1, wherein the downlink control information comprises at least one of:
   a field indicating the cell;
   a field indicating an uplink of the cell for the radio resources;
   a field indicating a downlink of the cell for the radio resources; or
   a field indicating a beam of the cell for the radio resources.

4. The method of claim 1, wherein the receiving the downlink control information is based on a radio network temporary identifier, RNTI, that is used to indicate the radio resources.

5. The method of claim 1, wherein the first child access node comprises an integrated access and backhaul, IAB, node.

6. The method of claim 1, wherein the first child access node comprises a base station distributed unit for the wireless device.

7. The method of claim 1, further comprising receiving, by the first child access node from the first parent access node, a second downlink control information comprising a deactivation indication of the radio resources for the cell.

8. The method of claim 1, wherein the configuration parameters comprise a beam index indicating a beam associated with a synchronization signal block of the cell for the radio resources.

9. The method of claim 1, wherein the downlink control information comprises a field indicating a beam associated with a synchronization signal block of the cell for the radio resources.

10. The method of claim 1, wherein the radio resources are flexible radio resources.

11. A first child access node comprising:
   one or more processors; and
   memory storing instructions that, when executed by the one or more processors, cause the first child access node to:
   receive, from a second access node, a first message comprising configuration parameters indicating radio resources for a cell served by the first child access node, wherein the first child access node receives the first message from the second access node via a first parent access node of the first child access node;

receive, from the first parent access node, a downlink control information comprising an activation indication of the radio resources for the cell; and communicate, with a wireless device, transport blocks via the radio resources of the cell based on the activation indication and the first message.

12. The first child access node of claim 11, wherein the configuration parameters comprise at least one of:
a field indicating an uplink of the cell for the radio resources;
a field indicating a downlink of the cell for the radio resources; or
a beam index indicating a beam of the cell for the radio resources.

13. The first child access node of claim 11, wherein the downlink control information comprises at least one of:
a field indicating the cell;
a field indicating an uplink of the cell for the radio resources;
a field indicating a downlink of the cell for the radio resources; or
a field indicating a beam of the cell for the radio resources.

14. The first child access node of claim 11, wherein the downlink control information is received based on a radio network temporary identifier, RNTI, that is used to indicate the radio resources.

15. The first child access node of claim 11, wherein the first child access node comprises an integrated access and backhaul, IAB, node.

16. The first child access node of claim 11, wherein the first child access node comprises a base station distributed unit for the wireless device.

17. The first child access node of claim 11, wherein the instructions, when executed by the one or more processors, further cause the first child access node to receive, from the first parent access node, a second downlink control information comprising a deactivation indication of the radio resources for the cell.

18. The first child access node of claim 11, wherein the configuration parameters comprise a beam index indicating a beam associated with a synchronization signal block of the cell for the radio resources.

19. The first child access node of claim 11, wherein the downlink control information comprises a field indicating a beam associated with a synchronization signal block of the cell for the radio resources.

20. The first child access node of claim 11, wherein the radio resources are flexible radio resources.

* * * * *